United States Patent
Karagiannidis et al.

(10) Patent No.: US 10,906,814 B2
(45) Date of Patent: Feb. 2, 2021

(54) LAYERED MATERIALS AND METHODS FOR THEIR PROCESSING

(71) Applicant: Cambridge Enterprise Limited, Cambridge (GB)

(72) Inventors: Panagiotis Karagiannidis, Cambridge (GB); Stephen Anthony Hodge, Cambridge (GB); Andrea Carlo Ferrari, Cambridge (GB); Felice Torrisi, Cambridge (GB)

(73) Assignee: CAMBRIDGE ENTERPRISE LIMITED, Cambridgeshire (GB)

( * ) Notice: Subject to any disclaimer, the term of this patent is extended or adjusted under 35 U.S.C. 154(b) by 161 days.

(21) Appl. No.: 15/766,676

(22) PCT Filed: Oct. 7, 2016

(86) PCT No.: PCT/EP2016/074106
§ 371 (c)(1),
(2) Date: Apr. 6, 2018

(87) PCT Pub. No.: WO2017/060497
PCT Pub. Date: Apr. 13, 2017

(65) Prior Publication Data
US 2018/0312404 A1    Nov. 1, 2018

(30) Foreign Application Priority Data
Oct. 7, 2015    (GB) .................................. 1517737.1

(51) Int. Cl.
*C01B 32/19* (2017.01)
*C09D 11/52* (2014.01)
(Continued)

(52) U.S. Cl.
CPC .............. *C01B 32/19* (2017.08); *C01B 32/22* (2017.08); *C09D 11/52* (2013.01); *B82Y 30/00* (2013.01);
(Continued)

(58) Field of Classification Search
CPC ......... C01B 32/19; C01B 32/20; C01B 32/22; C01B 2204/02; C01B 2204/04;
(Continued)

(56) References Cited

U.S. PATENT DOCUMENTS

2014/0212656 A1    7/2014 Rudhardt et al.
2014/0225026 A1    8/2014 Park et al.
(Continued)

FOREIGN PATENT DOCUMENTS

CN    104508056 A    4/2015
EP    3056469 A1     8/2016
(Continued)

OTHER PUBLICATIONS

Bonaccorso et al—Graphene Photonics and Optoelectronics. Nat. Photonics 2010, 4, 611-622.
(Continued)

*Primary Examiner* — Daniel C. McCracken
(74) *Attorney, Agent, or Firm* — Adsero IP

(57) ABSTRACT

A method for producing nanoplates derived from a layered material, includes the steps: (a) mixing particles of said layered material with a carrier liquid to form a dispersion of said particles in said carrier liquid; (b) pressurizing the dispersion to a pressure of at least 10 kpsi; and (c) forcing the dispersion along a microfluidic channel under said pressure, to apply a shear rate of at least $10^5$ $s^{-1}$ to said particles in the dispersion. Exfoliation of nanoplates from said particles is thereby caused. The nanoplates may be graphene nanoplates, for example. Steps (b) and (c) may be
(Continued)

repeated for a number of cycles in order to promote exfoliation. The method may be carried out using a microfluidizer.

19 Claims, 33 Drawing Sheets

(51) Int. Cl.
    C01B 32/22    (2017.01)
    B82Y 30/00    (2011.01)
(52) U.S. Cl.
    CPC ...... C01B 2204/02 (2013.01); C01B 2204/04 (2013.01); C01B 2204/32 (2013.01); C01P 2004/61 (2013.01)
(58) Field of Classification Search
    CPC . C01B 2204/32; C01B 32/182; C01B 32/198; C01B 2204/00; C01B 2204/06; C01B 2204/065; C01B 2204/20; C01B 2204/22; C01B 2204/24; C01B 2204/26; C01B 2204/28; C01B 2204/30; C01B 32/205; C01B 32/21; C01B 32/215; C01B 32/225; C01B 32/23; C09D 11/52; B82Y 30/00; C01P 2004/61
    See application file for complete search history.

(56)                References Cited

U.S. PATENT DOCUMENTS

| 2015/0076105 A1 | 3/2015 | Sato et al. | |
| 2015/0279506 A1 | 10/2015 | Wolfrum et al. | |
| 2017/0166449 A1* | 6/2017 | Yoo | C01B 32/184 |
| 2018/0214888 A1* | 8/2018 | Yoo | B01J 19/10 |

FOREIGN PATENT DOCUMENTS

| EP | 3312141 A1 | | 4/2018 | |
| JP | 2014-525981 A | | 2/2014 | |
| JP | 2014-24739 A | | 6/2014 | |
| KR | 2015-0076105 A | | 7/2015 | |
| WO | WO 2013-191809 A1 | | 12/2013 | |
| WO | WO-2013-191809 A1 | | 12/2013 | |
| WO | WO 2015/099457 | * | 7/2015 | ............. C01B 31/04 |
| WO | WO-2015-099457 A1 | | 7/2015 | |
| WO | WO 2015-193268 A1 | | 12/2015 | |

OTHER PUBLICATIONS

Casiraghi, A. Hartschuh, H. Qian, S. Piscanec, C. Georgi, A. Fasoli, K. S. Novoselov, D. M. Basko and A. C. Ferrari, Nano Letters, 9, (2009), 1433-1441.
Chakraborty "Physics and modeling of turbulent transport", Chapter 18, pp. 749-833, in Microfluidics and Nanofluidics Handbook—Chemistry, Physics and Life Science Principles, edited by S.K. Mitra and S. Chakraborty, CRC Press, Taylor & Francis Group, (2012) (14111985).
Ferrari and J. Robertson, Phys. Rev. B, 61, 14095-14107, (2000).
Ferrari et al. Science and technology roadmap for graphene, related two dimensional crystals, and hybrid systems, Nanoscale, 7 (2015) 4598-4810.
Ferrari, J. C. Meyer, V. Scardaci, C. Casiraghi, M. Lazzeri, F. Mauri, S. Piscanec, D. Jiang, K. S. Novoselov, S. Roth and A. K. Geim, Phys. Rev. Lett., 97, (2006), 187401.
Hasan, T.; Torrisi, F.; Nicolosi, V.; Privitera, G.; Bonaccorso, F.; Ferrari, A. C. Solution-Phase Exfoliation of Graphite for Ultrafast Photonics. Phys. Status Solidi B 2010, 247, 2953.
Hernandez, Y.; Nicolosi, V.; Lotya, M.; Blighe, F. M.; Sun, Z.; De, S.; McGovern, I. T.; Holland, B.; Byrne, M.; Gun'Ko, Y. K.; et al. High-Yield Production of Graphene by Liquid-Phase Exfoliation of Graphite. Nat. Nanotechnol. 2008, 3, 563-568.
Hyun, et al., High-Resolution Patterning of Graphene, Adv. Mater. 27 (2015) 109-115.
Jafari, et al., Production of sub-micron emulsions by ultrasound and microuidization techniques, Journal of Food Engineering 82 (2007) 478-488.
Launder and Spalding, The numerical computation of turbulent flows, Computer Methods in Applied Mechanics Anr Engineering 3 (1974) 269-289.Li, W.-H. Zhong, Review on polymer/graphite nanoplatelet nanocomposites, J Mater Sci 46 (2011) 5595-5614. (14111983).
Lotya Mustafa et al., Liquid Phase Production of Graphene by Exfoliation of Graphite in Surfactant/Water Solutions. J. Am. Chem. Soc. 2009, 131, 3611-3620.
Novoselov et al., Two-Dimensional Atomic Crystals. Proc. Natl. Acad. Sci. U. S. A. 2005, 102, 10451-10453.
Paton, Keith R. et al., Scalable production of large quantities of defect-free few-layer graphene by shear exfoliation in liquids, Nature Materials 13 (2014) 624-630.
Roff, J.R. Scott, Fibres, Films, Plastics and Rubbers: A Handbook of Common Polymers, Butterworths, 1971 (14089564 + 14089565, 14111981, 14111979).
Secor et al., Inkjet Printing of High Conductivity, Flexible Graphene Patterns, J. Phys. Chem. Lett. 4 (2013) 1347-1351.
Singh et al, Inkjet Printing—Process and its Applications, Adv. Mater. 2010, 22, 673-685.
Torrisi et al., Inkjet-Printed Graphene Electronics ACS Nano, 6 (4), (2012) 2992-3006.
Tuinstra and J. L. Koenig, J. Chem. Phys., 53, (1970), 1126-1130.
Valles, C.; Drummond, C.; Saadaoui, H.; Furtado, C. A.; He, M.; Roubeau, O.; Ortolani, L.; Monthioux, M.; Penicaud, A. Solutions of Negatively Charged Graphene Sheets and Ribbons. J. Am. Chem. Soc. 2008, 130, 15802-15804.
Varrla et al, Turbulence-assisted shear exfoliation of graphene using household detergent and a kitchen blender, Nanoscale, 6 (2014) 11810-11819.
Nascentes et al, Use of Ultrasonic Baths for Analytical Applications: A new approach for optimisation conditions, J. Braz. Chem. Soc., vol. 12, No. 1, 57-63, 2001.
Chivate and Pandit, Quantification of cavitation intensity in fluid bulk, Ultrasonics Sonochemistry 1995 vol. 2 No. 1.
McClements, Food Emulsions: principles, practices, and techniques. $3_{rd}$ Edition 2016, CRC Press.
Wang et al, High-Yield Synthesis of Few-Layer Graphene Flakes through Electrochemical Expansion of Graphite in Propylene Carbonate Electrolyte, J. Am. Chem. Soc. 2011, 133, 8888-8891.
Panagiotou et al, Production of Polymer Nanosuspensions Using Microfluidizer® Processor Based Technologies, (2008) https://www.researchgate.net/publication/322603785.
Methods in Molecular Biology 424, 2D PAGE: Sample preparation and fractionation, vol. 1, Humana Press, 2008.
Dimiev et al, Chemical Mass Production of Graphene Nanoplatelets in ~100% Yield, ACS Nano 2016, 10, 274-279.
Siddiqui et al, Characteristics of a Confined Impinging Jet Reactor: Energy Dissipation, Homogeneous and Heterogeneous Reaction Products, and Effect of Unequal Flow, Ind. Eng. Chem. Res. 2009, 48, 7945-7958.
Kouroupis-Agalou et al, Fragmentation and exfoliation of 2-dimensional materials: a statistical approach, Nanoscale, 2014, 6, 5926.
Khan et al, High-Concentration Solvent Exfoliation of Graphene, Small Nano Micro 2010, 6, No. 7, 864-871.
Hernandez et al, Measurement of Multicomponent Solubility Parameters for Graphene Facilitates Solvent Discovery, Langmuir 2010, 26(5), 3208-3213.
Bourlinos et al, Liquid-Phase Exfoliation of Graphite Towards Solubilized Graphenes, Small Nano Micro 2009, 5, No. 16, 1841-1845.
Bonaccorso et al, Production and processing of graphene and 2d crystals, Materials Today Dec. 2012, vol. 15, No. 12.

(56) References Cited

OTHER PUBLICATIONS

Folke Johannes Tolle et al: "Emulsifier-Free Graphene Dispersions with High Graphene Content for Printed Electronics and Freestanding Graphene Films", Advanced Functional Materials, dated Mar. 21, 2012, 9 pages.
T. J. Nacken et al: "Delamination of graphite in a high pressure homogenizer", vol. 5, No. 71, dated Jun. 23, 2015, 11 pages.
Peicheng Luo et al: "Dispersion of single-walled carbon nanotubes by intense turbulent shear in micro-channels", Carbon., vol. 68, dated Nov. 25, 2013, 9 pages.
International Search and Written Opinion, PCT/EP2016/074106, dated Dec. 7, 2016, 19 pages.
International Preliminary Report on Patentability, PCT/EP2016/074106, dated Apr. 19, 2018, 14 pages.
EP Application No. 16,781,722.0, Examination Report—Communication pursuant to Article 94(3) EPC, dated Aug. 20, 2020, 11 pages.
T. J. Nacken et al., Delamination of Graphite in a High-Pressure Homogenizer, RSC Advances, May 9, 2015, 12 pages.
Japanese Office Action (JP Application No. 2018-517852) dated Oct. 13, 2020, provided with English Translation, 17 pages.

\* cited by examiner

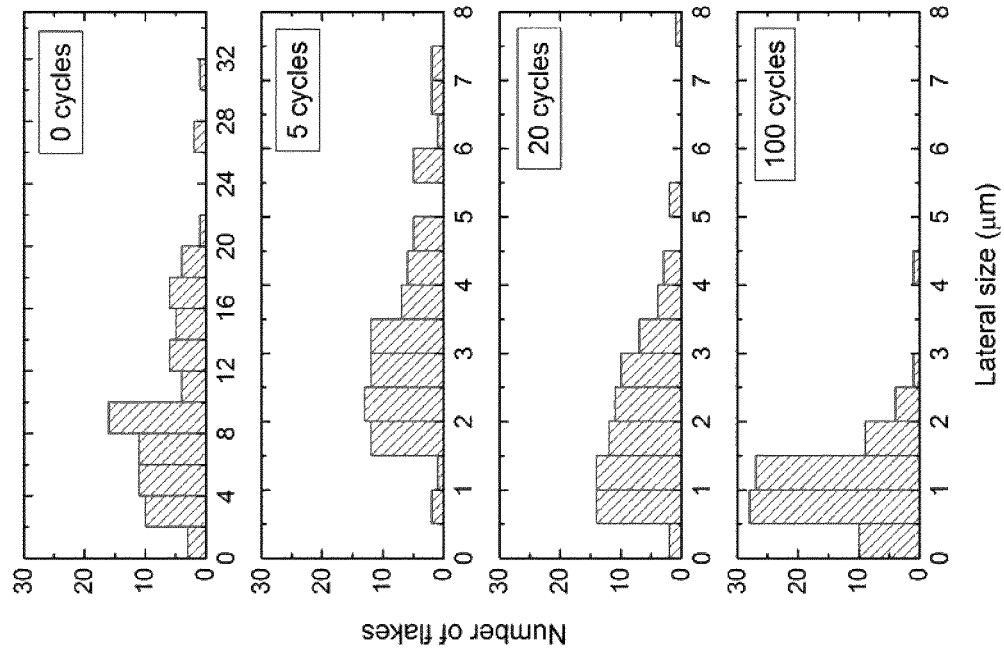
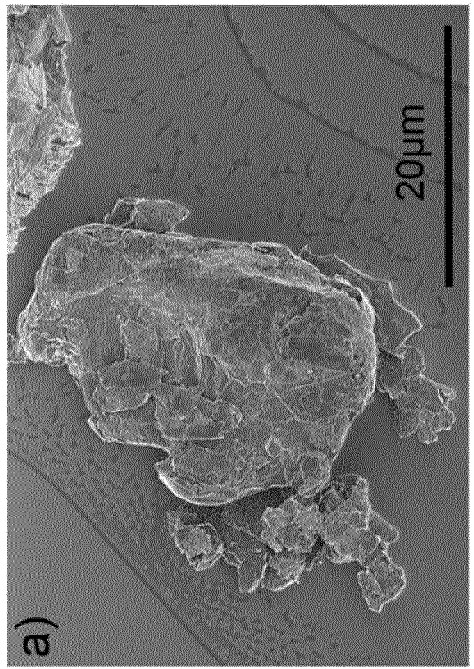
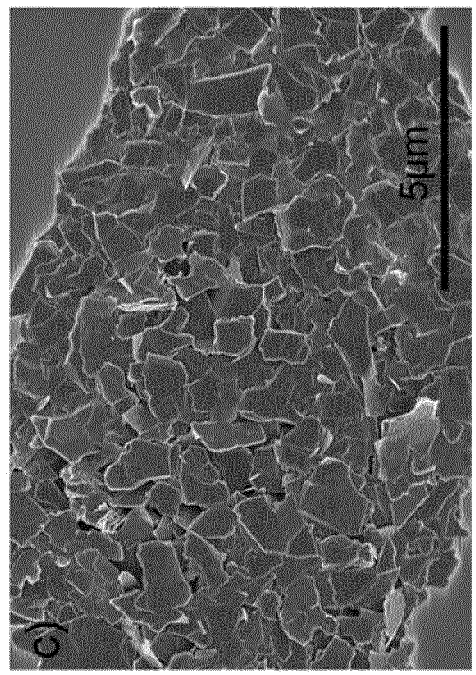
Fig. 2(a)
Fig. 2(b)
Fig. 2(c)

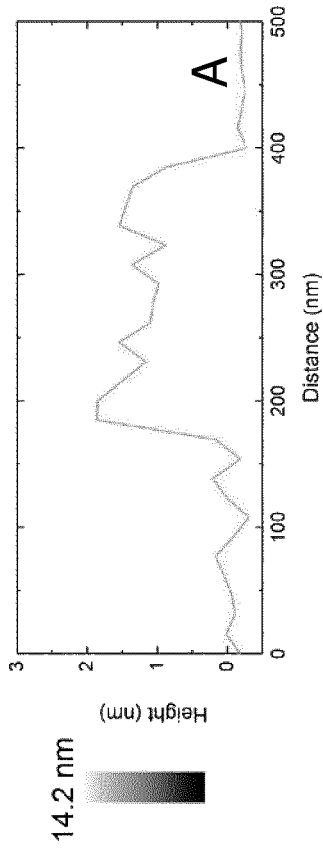
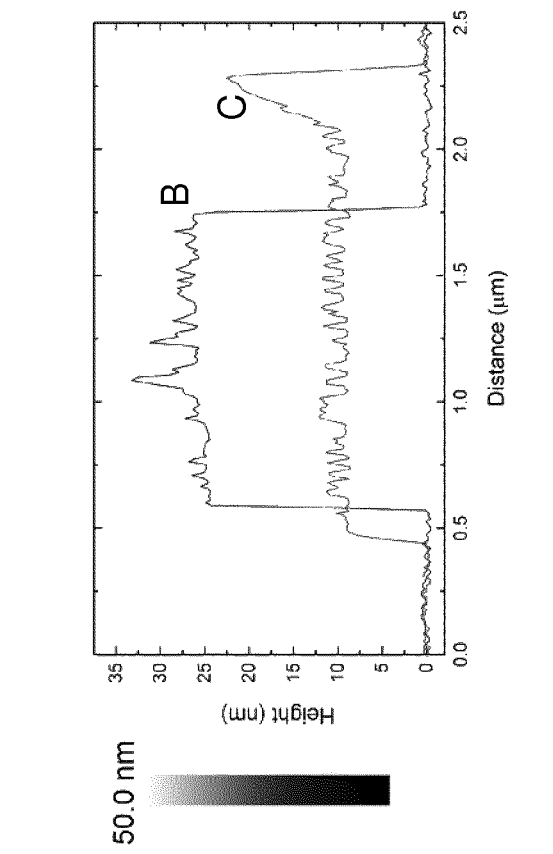
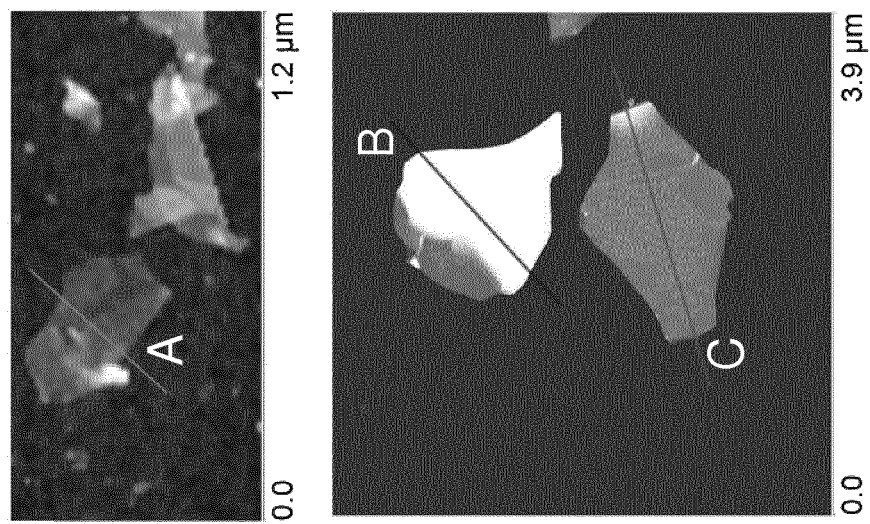

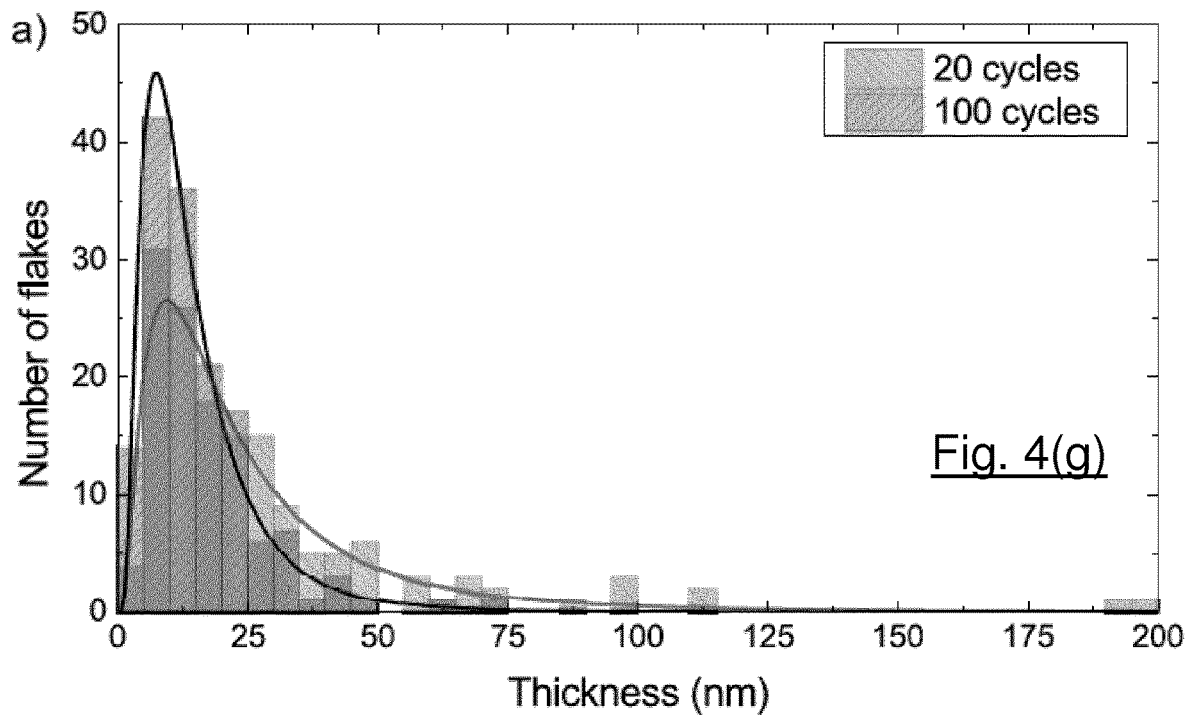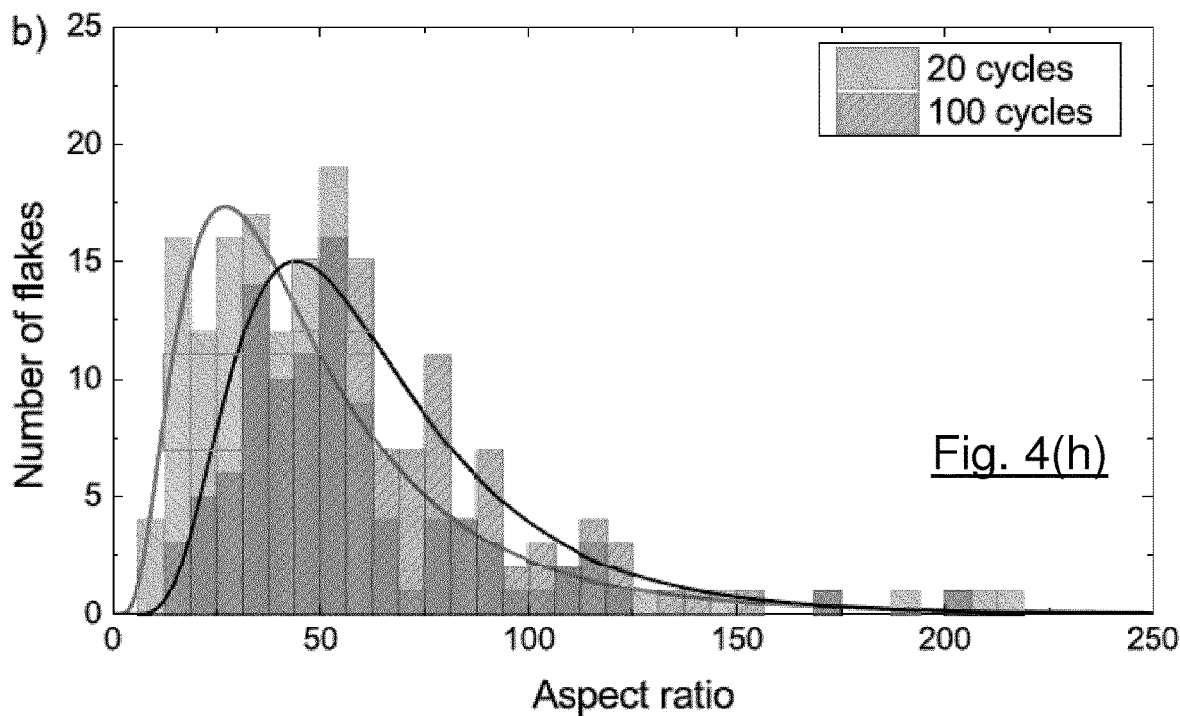

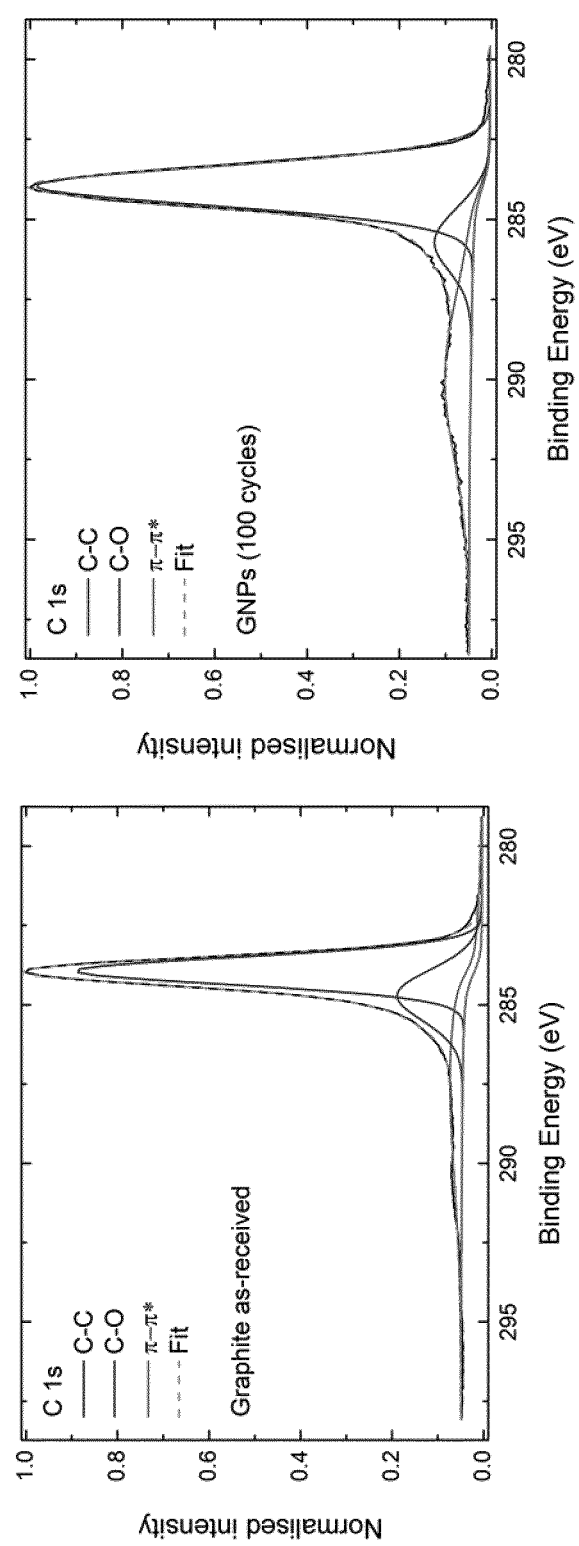

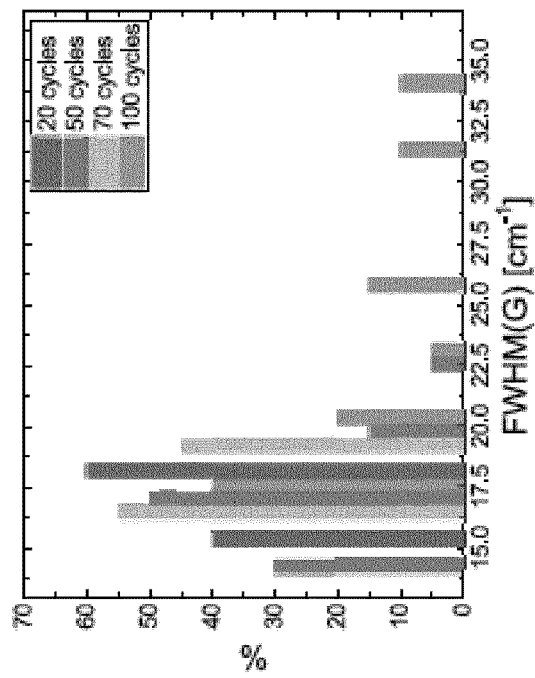
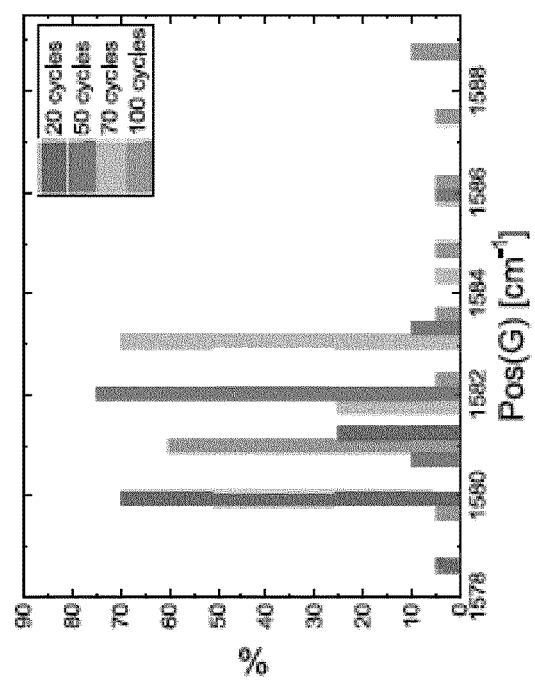
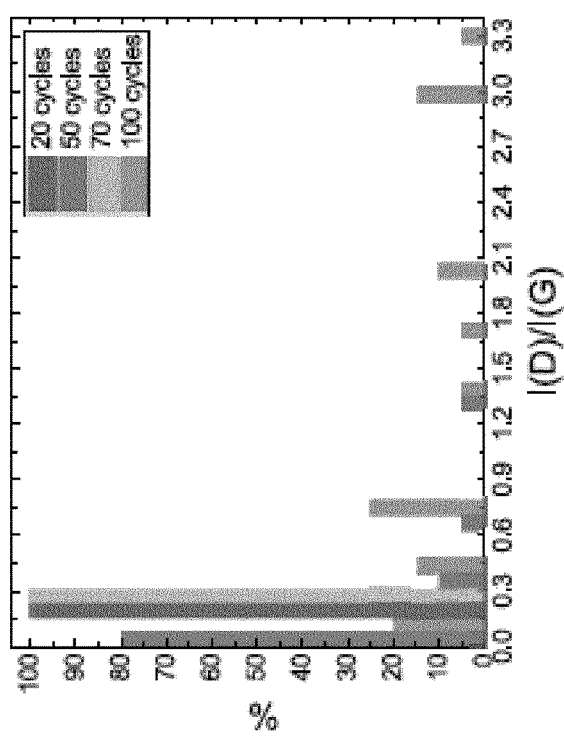
Fig. 7(b)
Fig. 7(c)
Fig. 7(d)

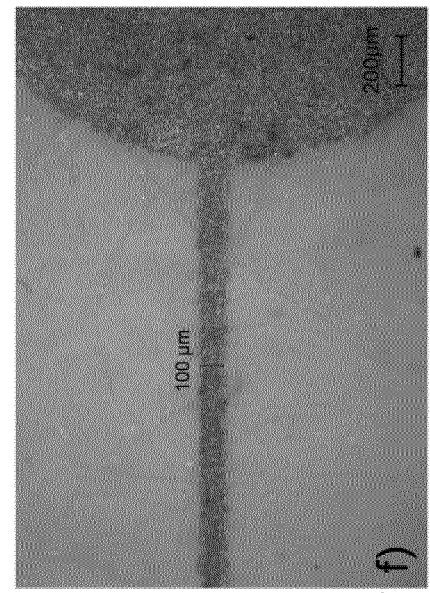
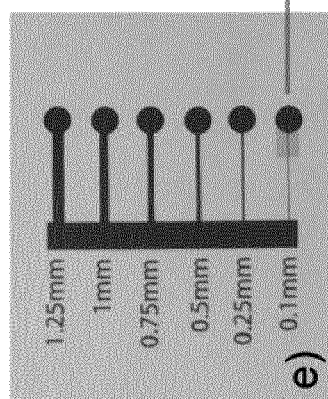
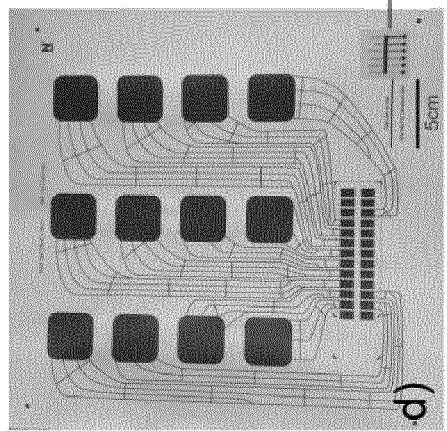
Fig. 15(f)
Fig. 15(e)
Fig. 15(d)

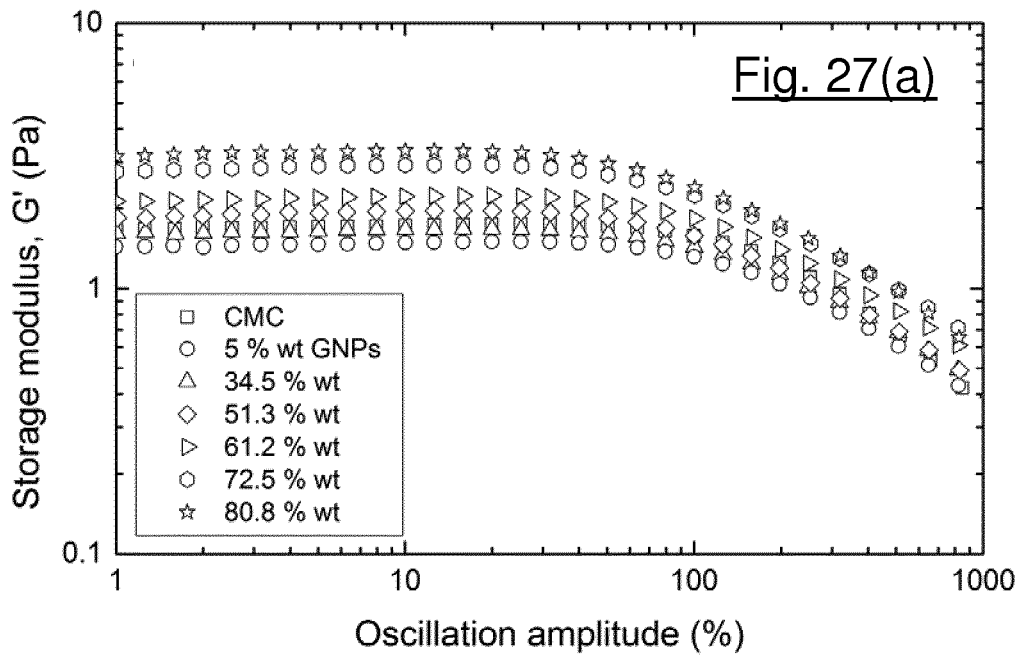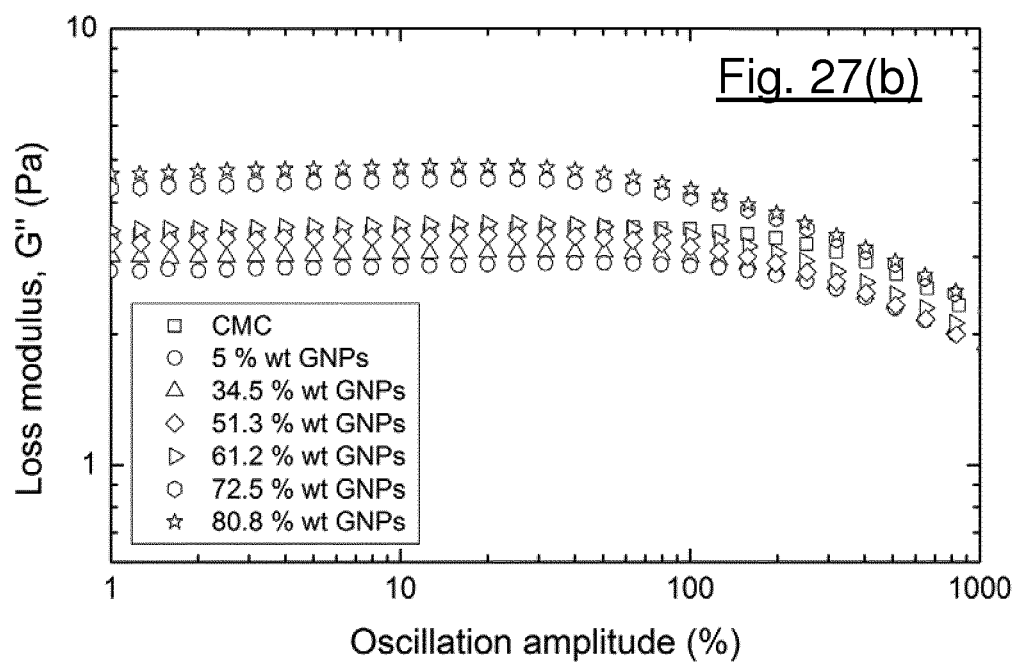

LAYERED MATERIALS AND METHODS FOR THEIR PROCESSING

RELATED APPLICATIONS

This application is a 35 U.S.C. § 371 national phase application of PCT/EP2016/074106 (WO2017/060497), filed on Oct. 7, 2016, entitled "LAYERED MATERIALS AND METHODS FOR THEIR PROCESSING", which application claims the benefit of GB Patent Application No. 1517737.1, filed Oct. 7, 2015, which is incorporated herein by reference in its entirety.

The work leading to this invention has received funding from the European Union's Seventh Framework Programme (FP7/2007-2013) under grant agreement no 604391.

BACKGROUND TO THE INVENTION

Field of the Invention

The present invention relates to methods for the processing of layered materials and the products of such processing. The invention has particular applicability to the processing of graphite to produce graphene and graphite nanoplates, but the present invention also has applicability to other layered materials. Of particular, but not exclusive, interest in the present invention are inks based on layered materials.

Related Art

Flexible electronics is a rapidly expanding research area. Applications include touch screens, electronic paper (e-paper), sensors, radio frequency tags, photovoltaic cells, light-emitting diodes and electronic textiles.

Roll to roll printing or coating processes (screen, inkjet, gravure and flexo printing, web or slot die coating) are promising techniques for large-area fabrication of flexible electronics. A range of components can be printed, such as conductive tracks, transistors, capacitors, and electrodes in devices such as photovoltaic cells, batteries, organic light-emitting diodes (OLEDs), and displays. Roll to roll printing processes are versatile, involve a limited number of process steps, are amenable for mass production, and can deposit controlled amounts of material. Currently in devices where transparent conducting electrodes are required, indium tin oxide (ITO) is used. However, due to the brittle nature of ITO, flexible devices are difficult to achieve. Indium is also a rare material and is very expensive.

For components such as conductive tracks where materials are not required to be transparent, metal nanoparticle inks are employed. Metal nanoparticle inks are considered not to be stable in ordinary solvents, such as deionized (DI) water, acetone, isopropyl alcohol, N-methylpyrrolidone (NMP), or tetrahydrofuran [Singh et al (2010) and Luechinger et al (2008)]. Therefore they need to be chemically modified in order to be dispersed via the use of stabilizers. Metal nanoparticles also tend to oxidize after the printing process [Singh et al (2010)].

Graphene is the two-dimensional (2d) building block for $sp^2$ carbon allotropes. Near-ballistic transport and high mobility make it an ideal material for nanoelectronics, especially for high frequency applications. Furthermore, its optical and mechanical properties are ideal for micro- and nanomechanical systems, thin-film transistors, transparent and conductive composites, electrodes, and photonics. A review of graphene photonics and optoelectronics is set out in Bonaccorso et al. (2010).

It is known that graphene can be isolated by micromechanical exfoliation of graphite [Novoselov et al (2005)]. This technique gives good results in terms of purity, defects, mobility, and optoelectronic properties. However, large scale production approaches are needed for widespread application. Attempts have been made to provide large-scale production methods by chemical vapour deposition (CVD) [Li et al. (2009)], sublimation of Si atoms by heat treatment of silicon carbide [Berger et al. (2004)], segregation from metal substrates and liquid phase exfoliation (LPE) [Hernandez et al (2008), Lotya, et al (2009), Valles et al (2008) and Hasan et al (2010)]. Previous work has identified LPE as a suitable candidate for producing printable inks, e.g. in WO 2014/064432, which is discussed below.

Graphite can be exfoliated by chemical wet dispersion followed by ultrasonication, both in aqueous and nonaqueous solvents. Dispersions can be achieved by mild sonication of graphite in water with dispersants (e.g. surfactants, polymers etc), followed by sedimentation based ultracentrifugation [Hernandez et al. (2008), Hasan et al (2010) and Marago et al (2010)]. In particular, bile salt surfactants are reported to allow the isolation of flakes with controlled thickness, when combined with density gradient ultracentrifugation [Green and Hersam (2009)]. Exfoliation of graphite-intercalated compounds and expandable graphite has also been reported.

LPE was first achieved through sonication of graphite oxide, following the Hummers method [Hummers and Offeman (1958)]. The oxidation of graphite in the presence of acids and oxidants disrupts the $sp^2$ network and introduces hydroxyl or epoxide groups, with carboxylic or carbonyl groups attached to the edge. These make graphene oxide (GO) sheets readily dispersible in water and several other solvents. Although large GO flakes can be produced, these are intrinsically defective and electrically insulating. Despite attempts by several workers, reduced GO (RGO) does not fully regain the properties of pristine graphene, including electrical conductivity. It is thus important to distinguish between dispersion-processed graphene flakes retaining the electronic properties of graphene, and insulating GO dispersions. Several groups have reported GO-based inks. Dua et al (2010) reported inkjet printed RGO films for sensor applications, while Luechinger et al (2008) produced RGO-stabilized Cu nanoparticles as low temperature metal colloids, to replace standard metal nanoparticle inks, which require high-temperature sintering post-processing.

US 2010/0000441 discloses a conductive ink based on nano graphene platelets. The nano graphene platelets are formed by dispersing graphite in a liquid medium such as water, alcohol or acetone, adding a dispersing agent or surfactant and subjecting the suspension to direct ultrasonication. The ink was used for printing using an inkjet printer. A resistivity for a single print layer of as low as 75 kΩ/square was measured.

US 2008/0279756 provides a similar disclosure to US 2010/0000441, but additionally suggests the processing of other layered materials than graphite, such as transition metal dichalcogenides.

WO 2014/064432 discloses a method for the production of nanoplates from layered materials. In particular, WO 2014/064432 focuses on the production of graphene from graphite. This is done by sonication of graphite particles in an appropriate solvent, followed by ultracentrifugation in order to isolate the most useful graphene platelets for the intended purpose. WO 2014/064432 contains details of layered material characterization techniques, particularly suited for graphene characterization, that are incorporated herein by reference.

SUMMARY OF THE INVENTION

The present invention builds in particular on the work reported in WO 2014/064432, in which the production of graphite nanoplates materials is disclosed. In this disclosure, the term "nanoplates" is used based on the proposed nomenclature of Bianco et al (2013). The expression "single/few layer graphene" is also used, to identify graphene materials typically having 10 or fewer layers (measured by AFM this corresponds to a thickness of 5 nm or less or 4 nm or less). The populations of nanoplates produced in WO 2014/064432 have advantageous properties in terms of thickness (number of layers) and diameter. However, the process of exfoliation by sonication and subsequent size selection by centrifugation is not readily scalable. This is a major limitation on the industrial scale commercialization of layered material nanoplates. Accordingly, the present inventors have sought a new approach to exfoliation which can provide suitable nanoplatelet dimensions and properties, without necessarily including a size selection step such as centrifugation, although such a step may additionally be included where desired. In some preferred embodiments, a centrifugation step may be omitted.

The present invention has been devised in order to address at least one of the above problems. Preferably, the present invention reduces, ameliorates, avoids or overcomes at least one of the above problems.

Accordingly, in a first preferred aspect, the present invention provides a method for producing nanoplates derived from a layered material, including the steps:
  (a) mixing particles of said layered material with a carrier liquid to form a dispersion of said particles in said carrier liquid;
  (b) pressurizing the dispersion to a pressure of at least 10 kpsi (69 MPa, 690 bar); and
  (c) forcing the dispersion along a microfluidic channel under said pressure, to apply a shear rate of at least $10^5$ $s^{-1}$ to said particles in the dispersion, thereby causing exfoliation of nanoplates from said particles.

In a second preferred aspect, the present invention provides a method for producing nanoplates derived from a layered material, including the steps:
  (a) mixing particles of said layered material with a carrier liquid to form a dispersion of said particles in said carrier liquid;
  (b) pressurizing the dispersion to a pressure of at least 8 kpsi (55 MPa, 550 bar); and
  (c) forcing the dispersion along a microfluidic channel under said pressure, to apply a shear rate of at least $10^5$ $s^{-1}$ to said particles in the dispersion, thereby causing exfoliation of nanoplates from said particles,
wherein the dispersion subjected to step (c) is subjected to steps (b) and (c) repeatedly, either via the same or different microfluidic channels, according to a number of cycles, wherein the number of cycles is at least 10.

In a third preferred aspect, the present invention provides a dispersion of nanoplates in a carrier liquid, obtained or obtainable by the method of the first or second aspect.

In a fourth preferred aspect, the present invention provides a water-based ink with a specific functionality, e.g. electrically and/or thermally conductive or insulating, comprising a dispersion of nanoplates according to the third aspect.

A "nanoplate" is defined herein as a high aspect ratio structure (i.e. length/thickness >10) with typical thickness <100 nm and length >500 nm.

The present invention allows the production of nanoplates from a layered material via high shear microfluidic processing, without the need for filtration or centrifugation steps, although such steps can be included if desired. Surprisingly, the nanoplates can be exfoliated via high shear microfluidic processing to produce relatively defect-free nanoplates, even from pristine starting materials, with relatively tight diameter and thickness distributions. This opens the way for industrial scale manufacture of nanoplates.

The first, second, third and/or fourth aspect of the invention may have any one or, to the extent that they are compatible, any combination of the following optional features.

Preferably, the dispersion is pressurised to a pressure of at least 15 kpsi. More preferably, the dispersion is pressurised to a pressure of at least 20 kpsi, at least 25 kpsi or at least 30 kpsi. It is found that using too low a pressure leads to insufficient exfoliation. The pressure can be generated and measured in a known manner, for example using an intensifier pump along a flow line, between a reservoir holding the dispersion of particles in the carrier liquid and the microfluidic channel.

Taking the exfoliation of graphite as an example, it is found that the minimum pressure to exfoliate graphite to graphite nanoplates depends to some extent on the graphite particle size and concentration, and so routine experimentation can be carried out to assess the suitable operating pressure based on these parameters. For example, where high graphite loadings are used (e.g. 50-100 mg/mL), a pressure of at least 15 kpsi is suitable.

Lower pressures can be used to exfoliate graphite to graphite nanoplates for lower graphite loadings (e.g. <10 mg/mL). However, it should be noted that these lower concentrations are not preferred for applications where high concentration of nanoplates is required. For example, for high viscosity conductive inks used in screen printing, the loading of conductive material should be higher than 30 mg/mL (i.e. 3% wt).

Where it is desired to form nanoplates with a very small thickness (e.g. single/few layers graphene, less than 10 layers thick), to achieve useful concentrations of single/few layers graphene (>0.1 mg/mL) with low graphite loadings (<10 mg/mL), a pressure of at least 30 kpsi may be needed with a large number of processing cycles (at least 100 processing cycles—see below). However, higher starting graphite loadings at lower pressures and a lower number of processing cycles will also produce useful concentrations.

An explanation is now provided of the shear rate applied in the preferred embodiments of the invention. The Reynolds number (Re) is a parameter that can be used to determine the type of flow inside the microchannel, given by $\rho UD/\mu$, where $\rho$ is the liquid density (which for water is 1000 kg/m$^3$, U is the mean channel velocity (calculated at about 300 m/s), D the pipe diameter (87 um for a G10Z microchannel used in the preferred embodiments) and $\mu$ is the dynamic viscosity ($1\times10^{-3}$ N s/m$^2$). The calculated Reynolds number, $2.6\times10^4$, indicates that there is fully developed turbulent flow inside the microchannel (Re>>4000). The turbulent shear rate can be estimated by the equation) $\dot{\gamma}=(\varepsilon/\nu)^{1/2}$ where $\varepsilon$ is the turbulent energy dissipation rate ($1\times10^{10}$ W/kg or m$^2$/s$^3$) and $\nu$ the kinematic viscosity ($1\times10^{-8}$ m$^2$/s). The turbulent energy dissipation rate is determined by computational fluid dynamics (CFD) simulations. Determination of the turbulent energy dissipation rate is discussed, for example, in Launder and Spalding (1974) and by Chakraborty (2012), and may be determined for a particular microfluidic channel following the guidance disclosed in those references. The computed mean turbulent shear rate inside the microchannel used in the preferred embodiments is $1 \times 10^8$ s$^{-1}$, which is 4 orders of magnitude higher than the minimum shear rate required to initiate graphite exfoliation [Paton (2014)]. Thus, the exfoliation of the graphite flakes is considered to be primarily due to turbulent shear and stress generated by the turbulent fluctuations. Such shear rates can be applied by probe sonicators or shear mixers only in the vicinity of the probe or the rotor-stator but cannot be applied in the entire batch uniformly. In contrast, forcing the dispersion along the microfluidic channel in the present invention allows suitable shear rates to be applied uniformly to the entire batch of the dispersion.

Thus, preferably, the shear rate applied to the particles in the dispersion is at least $5 \times 10^5$ s$^{-1}$. More preferably, the shear rate applied to the particles in the dispersion is at least $10^6$ s$^{-1}$, at least $5 \times 10^6$ s$^{-1}$, or at least $10^7$ s$^{-1}$. The shear rate applied to the particles gives rise to useful exfoliation, as explained above. Where the shear rate is too low, the degree of exfoliation is not sufficient, even with multiple processing cycles.

The nanoplates may be selected from one or more of elemental materials such as graphene (typically derived from pristine graphite), metals (e.g., NiTe$_2$, VSe$_2$), semimetals (e.g., WTe$_2$, TcS$_2$), semiconductors (e.g., WS$_2$, WSe$_2$, MoS$_2$, MoTe$_2$, TaS$_2$, RhTe$_2$, PdTe$_2$), insulators (e.g., h-BN, HfS$_2$), superconductors (e.g., NbS$_2$, NbSe$_2$, NbTe$_2$, TaSe$_2$) and topological insulators and thermo-electrics (e.g., Bi$_2$Se$_3$, Bi$_2$Te$_3$).

Preferably, the layered material is graphite and the nanoplates are graphene nanoplates. Most preferably, the layered material is pristine graphite and the nanoplates are graphite nanoplates.

It is preferred that the layered material is present in the carrier liquid in an amount of at least 10 mg per mL of dispersion. Note that the amount of layered material here is expressed in terms of mass per unit volume of the dispersion, the dispersion including the carrier liquid and the layered material. This distinction becomes particularly significant at high loading amounts of layered material. More preferably, the layered material is present in the carrier liquid in an amount of at least 20 mg per mL of dispersion, at least 30 mg per mL of dispersion, at least 40 mg per mL of dispersion, at least 50 mg per mL of dispersion, at least 60 mg per mL of dispersion, at least 70 mg per mL of dispersion, at least 80 mg per mL of dispersion or at least 90 mg per mL of dispersion. Typically, for example, the layered material is present in the carrier liquid in an amount 100 mg per mL of dispersion. Higher loading amounts are preferred in order to generate high concentrations of nanoplates in the dispersion. Higher loading amounts provide greater utility, for example in the case of conductive inks, because this reduces or avoids the need to remove any of the carrier liquid by a subsequent concentration or filtration step.

Preferably, the method produces a concentration of nanoplates in the dispersion of at least 0.1 mg per mL of dispersion. More preferably, the method produces a concentration of nanoplates in the dispersion of at least 0.5 mg per mL of dispersion, at least 1 mg per mL of dispersion, at least 2 mg per mL of dispersion, at least 5 mg per mL of dispersion, or at least 10 mg per mL of dispersion. Concentrations of about 80 mg per mL of dispersion are produced without difficulty, for example.

In some preferred embodiments, the dispersion subjected to step (c) is subjected to steps (b) and (c) repeatedly, either via the same or different microfluidic channels, according to a number of cycles. This repetition is expressed also in the second aspect of the invention. Preferably, the number of cycles is at least 5. The number of cycles may be higher, for example at least 10, at least 20 or at least 50. About 100 cycles may be particularly suitable in some embodiments. Preferably, the dispersion is subjected to step (c) for a time of up to 1 second, per cycle. More preferably, the dispersion is subjected to step (c) for a time of up to 0.5 second, per cycle. Still more preferably, the dispersion is subjected to step (c) for a time of up to 0.2 second, up to 0.1 second, up to 0.01 second, up to 0.005 second, or up to 0.001 second, per cycle. The dispersion may be subjected to step (c) for a cumulative time of up to 200 seconds, for example.

Microfluidic processing is utilized in pharmaceutical and food industry due to fact that it can have the same results as homogenizers but at small number of passes. Too many processing cycles e.g. above 20, are not usually considered in the industries which use microfluidization processing. In the preferred embodiments of the present invention, the layered material particles are processed for a limited amount of time (in some cases for a time of only about $10^{-4}$ second, per cycle [Jafari et al (2007)]) as they pass along the microfluidic channel. Increasing the number of passes increase the exposure time of the material to the energy of the system. Thus high shear is effective for efficient exfoliation in such a short period of time (30 kpsi corresponds to a shear rate of $>10^8$ s$^{-1}$ for a G10Z chamber (microfluidic channel). However energy dissipation is much better controlled and consistent shear gives repeatable batch-to-batch results in comparison to any other exfoliation technique.

An auxiliary processing module can be placed upstream of the microfluidic channel to assist in a pre-process of the sample before it enters the smaller geometry chamber or in line downstream of the chamber to add backpressure. Further details of the features of the apparatus can be seen at http://www.microfluidicscorp.com/microfluidizer-processors/m-110p [accessed 10 Aug. 2015] and from the Microfluidics Corp M-110P user guide.

In microfluidization it can be assumed that the energy density E/V (J/m$^3$) is equal to the pressure differential due to low volumes and very short residence times in the microchannel [Jafari et al (2007)]. Therefore, for processing pressure 30 kpsi, E/V=207 MPa=$2.07 \times 10^8$J/m$^3$. At this level of total energy input per unit volume, a concentration of single/few layers graphene of C=1 mg/mL (with the concentration of starting graphite particles $C_i$=50 mg/mL) was obtained and a production rate ($P_r$=VC/t) for a typical batch of V=180 ml and t=2.77 h (100 processing cycles) of Pr=65 mg/h is derived. This production rate is higher than the reported values for the same energy input for sonication or high shear mixer [Paton (2014)]. Scaling up microfluidic processing is easily achieved by increasing the flow rate, Q, thus, decreasing the time required to process a given volume, V, for n cycles (Q=nV/t). Thus, the production rate increases (Pr=CQ/n). Large scale microfluidizers can achieve flow rates as high as 12 L/min which corresponds to a production rate of Pr=7.2 g/h (C=1 mg/mL, Ci=50 mg/mL). The production rate of the GNPs is 5.2 g/h (for $C_i$=80 mg/mL) using the lab-scale system reported in this disclosure. This can be scaled, for example, to 576 g/h (>5 tonnes per year, >60,000 litres of ink per year) in an industrial system using 100 process cycles. The present invention therefore provides a readily-scalable process suitable for industrial-scale manufacture of nanoplates derived from layered materials.

Preferably, the microfluidic channel has a transverse dimension (e.g. diameter) in the range 1-1000 μm. More preferably, the microfluidic channel has a transverse dimension (e.g. diameter) of at most 300 μm. The microfluidic channel preferably has a transverse dimension (e.g. diameter) of at least 50 μm. These dimensions allow a suitably high shear rate along with acceptable flow rates. Preferably, the microfluidic channel is substantially equi-axed. For example, the cross sectional shape of the microfluidic channel may be circular, oval, square or near-square.

Preferably, the microfluidic channel provides a tortuous flow path. However, it is preferred that the microfluidic channel does not have flow splitting paths or flow recombination paths. In the field of microfluidic processing, microfluidic channels with flow splitting paths and/or flow recombination paths are referred to as Y-type channels. In contrast, the preferred embodiments of the present invention use Z-type channels, to refer to the tortuous flow path but absence of flow splitting paths and flow recombination paths.

Preferably, the carrier liquid is aqueous. This is particularly convenient for low-cost, environmentally friendly processing, and also provides compatibility with water-based ink formulations.

More generally, the carrier liquid may be selected from one or more of water, alcohols (e.g. ethanol, iso-propanol), ethers, esters, amides (DMF, NMP, CHP, DMEU), amines (e.g. hexylamine), halogenated (e.g. chloroform, dichlorobenzene), carbon disulphide, carbonates (e.g. ethylene carbonate, propylene carbonate), hydrocarbons (e.g. hexane, benzene, toluene), or neat polymers (e.g. acrylates, epoxies), in particular for composite inks. Preferably, the carrier liquid is selected from one or more of water, alcohol, N-methylpyrrolidone, chloroform, benzene, toluene, di-chlorobenzene, iso-propyl alcohol, ethanol and/or other organic solvents. Most preferably, the carrier liquid includes an amide.

The dispersion may include one or more stabilising agents. Suitable stabilising agents may be polymers or surfactants (anionic, cationic, non-ionic, Zwitterionic, biosurfactants, etc.).

In a further development of the invention, the inventors have devised a modification of the method defined above, in order to provide functionalization of the nanoplatelets. In the disclosure set out above, preferably the nanoplates are chemically unmodified as characterised by Raman spectroscopy, thermogravimetric analysis (TGA) and X-ray photoelectron spectroscopy (XPS). However, in addition to the production of nanplates that are chemically unmodified, there is also significant interest if nanoplates (such as graphene or other nanomaterials) can be produced which are functionalized with specific chemical functional groups. This provides a large "toolkit" for adapting nanomaterials to a desired function.

Where the objective is to utilise the 'novel' properties of fundamentally modified nanomaterials, the versatility and ease of grafting chemistry is of significant importance; the degree of functionalisation should be adapted to the end-application, whether the goal is, for example, solubility, structural matrix compatibility, fluorescence, or catalytic activity, etc. It may often be desirable to introduce higher molecular weight or branched species that maximise the required property with minimal modification of the nanomaterial structure.

Some specific benefits of chemical modification are, for example, the improved solubility of nanomaterials and compatibility with composite matrices, allowing the improvement of mechanical, thermal and electrical properties [Hodge et al. (2012)].

Accordingly, the first aspect of the invention may be modified to include the step of adding a nanoplate functionalization reagent to the dispersion, the nanoplates being functionalized by reaction with the nanoplate functionalization reagent during step (c).

Similarly, the second aspect of the invention may be modified to include the step of adding a nanoplate functionalization reagent to the dispersion, the nanoplates being functionalized by reaction with the nanoplate functionalization reagent during step (c). In this case, the nanoplate functionalization reagent may be added to the dispersion before step (c) is carried out for the first time for the dispersion. Alternatively, or additionally, the nanoplate functionalization reagent may be added to the dispersion after at least one cycle of subjecting the dispersion to step (b) and (c).

It is considered that adding the nanoplate functionalization reagent after the initiation of exfoliation may provide more homogeneous functionalization as the nanomaterial surface becomes more accessible to reaction.

Thus, it may be preferred for more than one step of addition of the nanoplate functionalization reagent to the dispersion, between cycles of subjecting the dispersion to step (b) and (c).

Although the concept of functionalization of nanoplates is known, the inventors consider that the functionalization can be provided with comparative ease and highly efficiently in the microfluidization process used for exfoliation. The chemical modification process benefits greatly from the confinement and uniform mixing of nanomaterial and chemical functionalization reagent within the microfluidic processor interaction chamber.

Additionally, heat generated in the interaction chamber can be used to initiate reactions. Depending on the reaction of choice, the heat generated by such high energy processing can be used to perform harsh reactions that would typically otherwise require boiling mixtures for several days.

Alternatively, cooling to the interaction chamber can be provided if required for a particular reaction.

The modifications may include covalent modifications such as, but not necessarily limited to, diazonium salt additions, 1,3-dipolar cycloadditions, silylations, oxidations, radical based reactions, reductions, polymer grafting reactions, thiol/sulphur functionalizations, etc. Suitable modifications are set out, for example, in: Hodge et al. (2012); Georgakilas et al. (2012); Presolski and Pumera (2016); Knirsch et al. (2015), the contents of which documents are hereby incorporated by reference.

The microfluidizer apparatus may be adapted to the reactions of interest by selecting materials for contact with the dispersion which are inert to the materials and reactions to be hosted in the microfluidizer apparatus.

In this way, the modified process provides an industrially scalable methodology for the simultaneous dispersion and chemical modification of nanomaterials. Such materials can be used as inks, coatings or composites, to name a few suitable applications. In more detail, suitable applications include but are not necessarily limited to structural composites, components in optoelectronics devices (organic solar cells, organic light emitting diodes, liquid crystal displays, touchscreens, bus bars), communication (RF-ID tags and antennas), energy storage (batteries and supercapacitors), sensing (gas, health and food sensors), printed circuit lines (solar cell grid lines, interconnections, printed circuit boards) and smart textiles (wearable electronics, conductive tracks on textiles). Further optional features of the invention are set out below.

BRIEF DESCRIPTION OF THE DRAWINGS

Embodiments of the invention will now be described by way of example with reference to the accompanying drawings in which:

FIG. 2(a) shows an SEM image of the graphitic particles before processing.

FIG. 2(b) shows histograms of lateral flake size of the starting material (0 cycles) and after 5, 20 and 100 processing cycles.

FIG. 2(c) shows an SEM image of the graphitic particles after 100 processing cycles.

FIGS. 3(a) and 3(c) show AFM images of GNPs produced after 100 cycles and 20 cycles, respectively. In FIG. 3(a), graphene sheets are shown with 1 nm thickness. In FIG. 3(c) there are shown typical GPNs.

FIGS. 3(b) and 3(d) show AFM profiles for the lines indicated in FIGS. 3(a) and 3(c), respectively.

FIGS. 4(b) and 4(e) show flake diameter as a function of thickness for 20 and 100 processing cycles, respectively.

FIG. 4(g) shows a superposition of FIGS. 4(a) and 4(d) with trend lines.

FIG. 4(h) shows a superposition of FIGS. 4(c) and 4(f) with trend lines.

FIGS. 5(a.i) to 5(d.ii) show representative diffraction patterns and virtual dark-field images acquired respectively from:

FIGS. 5(a.i) and 5(a.ii) a single crystal flake,
FIGS. 5(b.i) and 5(b.ii) a polycrystalline flake,
FIGS. 5(c.i), 5(c.ii), 5(d.i) and 5(d.ii) a polycrystalline flake comprising three crystals overlapping one another. The scale bar is 1 μm.

FIGS. 6(a)-(e) illustrate the chemical structure characterization of the as-produced graphite nanoplates (GNPs).

FIG. 6(a) shows the results of thermogravimetric analysis of as-received and microfluidized graphite in an inert atmosphere ($N_2$). Different washing procedures were used to remove the sodium deoxycholate (SDC) surfactant. The inset shows the thermogram for SDC in an inert atmosphere, decomposing to produce sodium oxide ash.

FIG. 6(b) shows ATR-FTIR of the graphite and microfluidized GNPs (100 cycles). Peaks arising from the diamond ATR crystal are shown in the wavenumber range of about 2400-1800 $cm^{-1}$.

FIG. 6(c) shows XPS survey spectra of the graphite and microfluidized GNPs (100 cycles).

FIGS. 6(d)-(e) show high resolution C 1s spectra of the graphite and microfluidized GNPs (100 cycles), respectively. Red curves (lowermost curves) represent the Shirley background.

FIG. 7(b) shows distribution of Pos(G)
FIG. 7(c) shows FWHM(G)
FIG. 7(d) shows I(D)/I(G) and
FIG. 7(e) shows distribution of I(D)/I(G) as a function of Disp(G)
FIG. 7(f) shows distribution of I(D)/I(G) as a function of FWHM(G)

All samples demonstrated in FIGS. 10(a)-(d) were annealed for 10 min at 100° C.

Figure 11A:
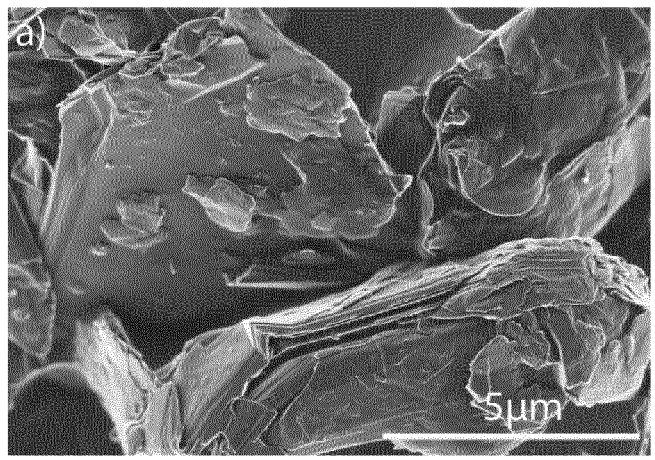
Figure 11B:
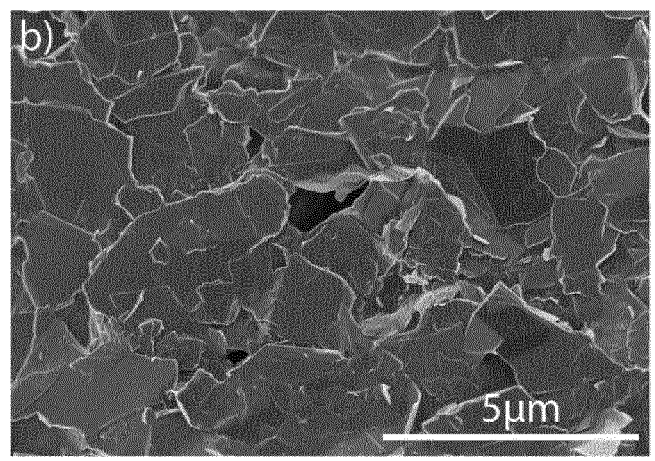
Figure 11C:
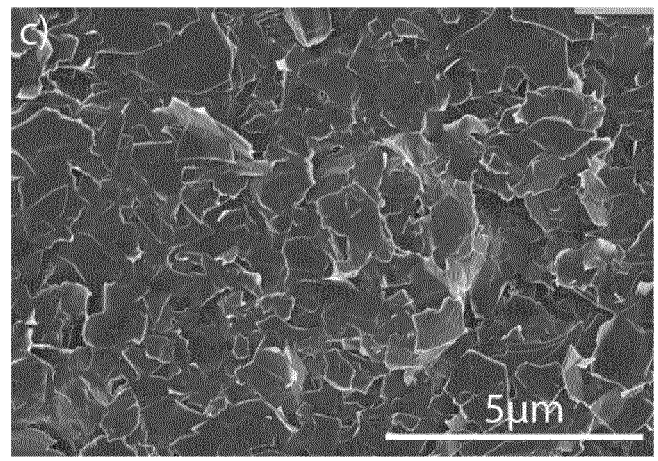

FIGS. 11(a)-(c) show SEM images taken from coatings comprising of the starting graphite, after 5 processing cycles and after 100 processing cycles, respectively.

Figure 12:
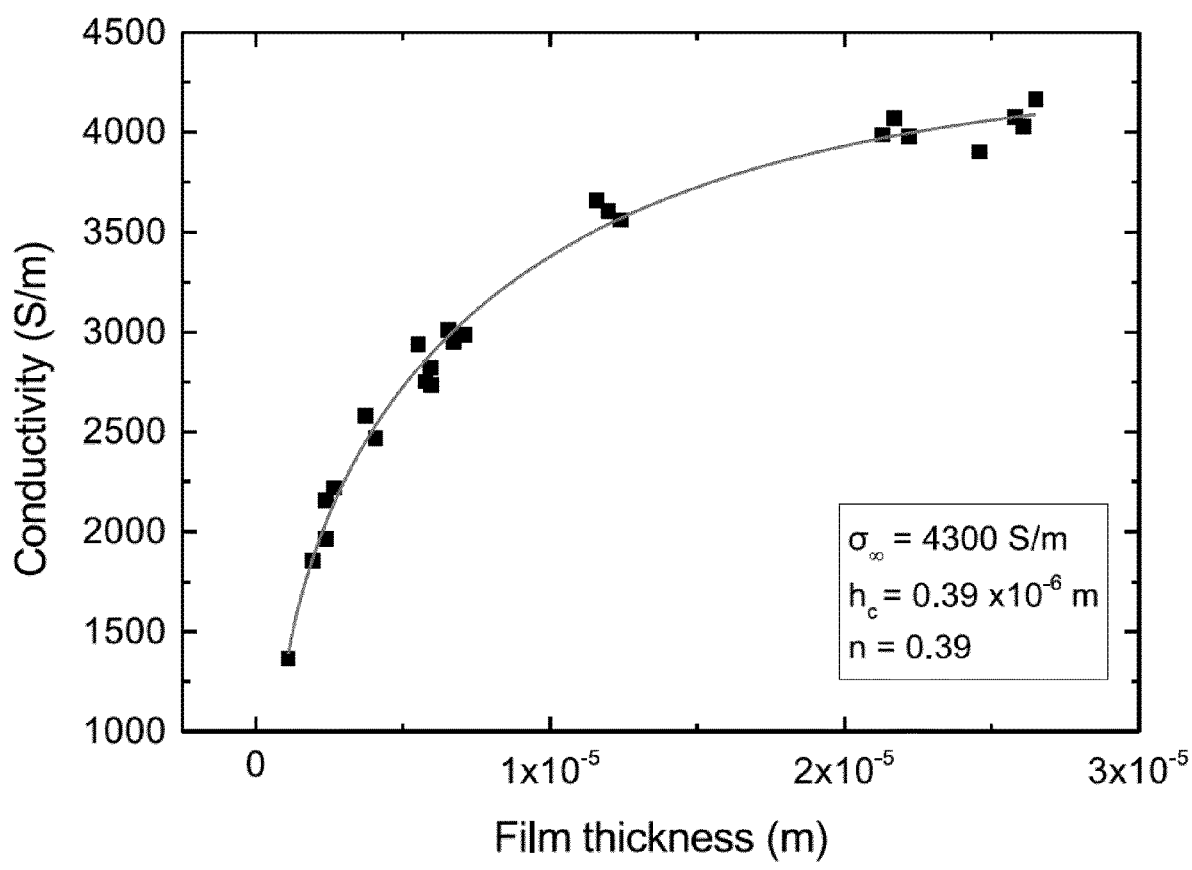

FIG. 12 shows fit of the conductivity as a function of film thickness for 72.5 wt % flakes.

Figure 13A:
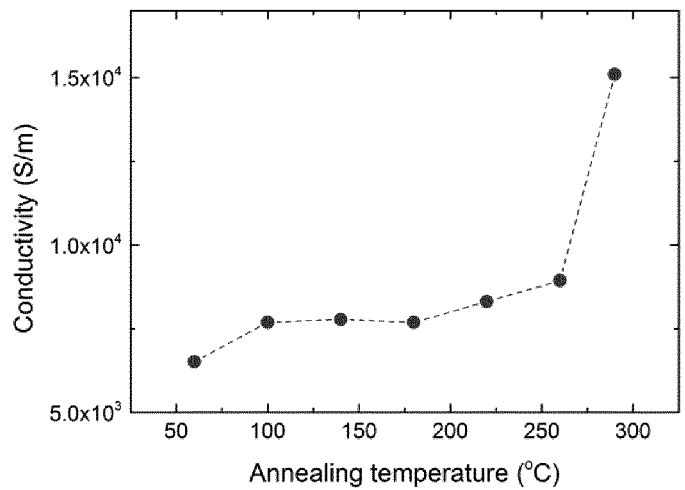

FIG. 13(a) shows conductivity as a function of annealing temperature, for inks according to embodiments of the invention.

Figure 13B:
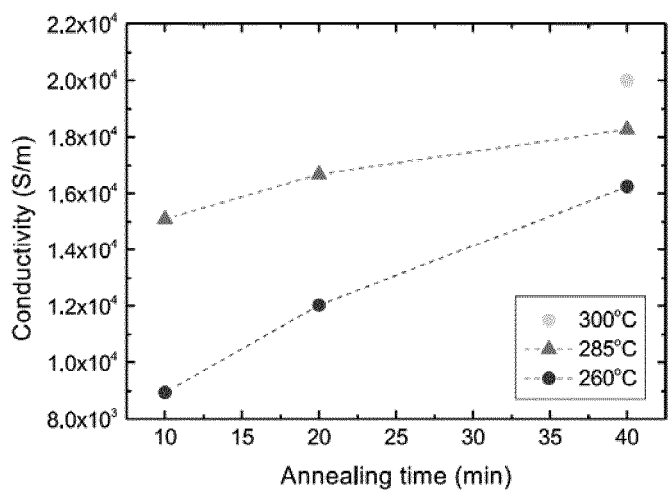

FIG. 13(b) shows conductivity as a function of annealing time, for inks according to embodiments of the invention.

Figure 13C:
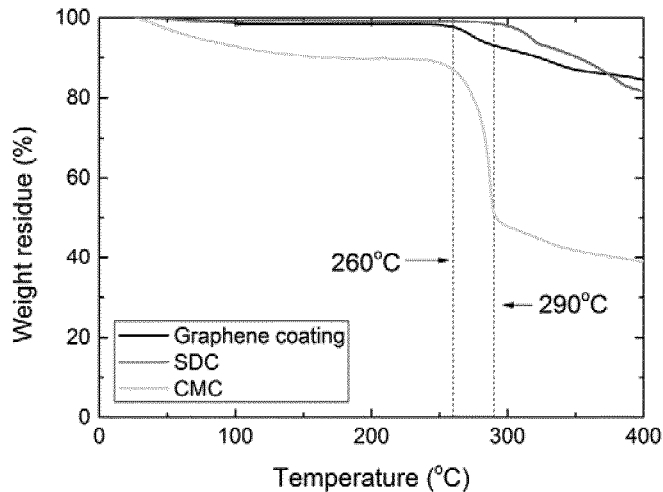

FIG. 13(c) shows TGA thermograms of the GNP coatings along with the SDC and the CMC components.

Figure 14B:
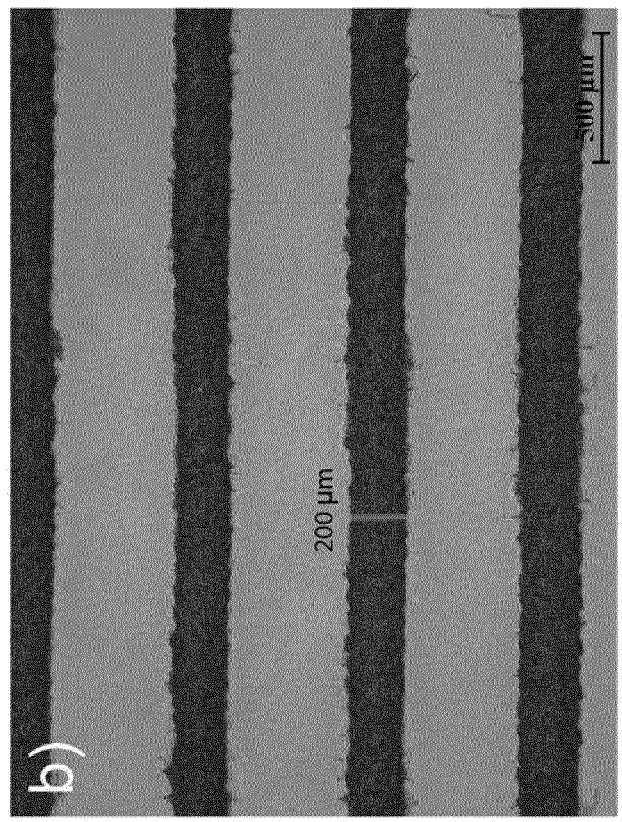
Figure 14A:
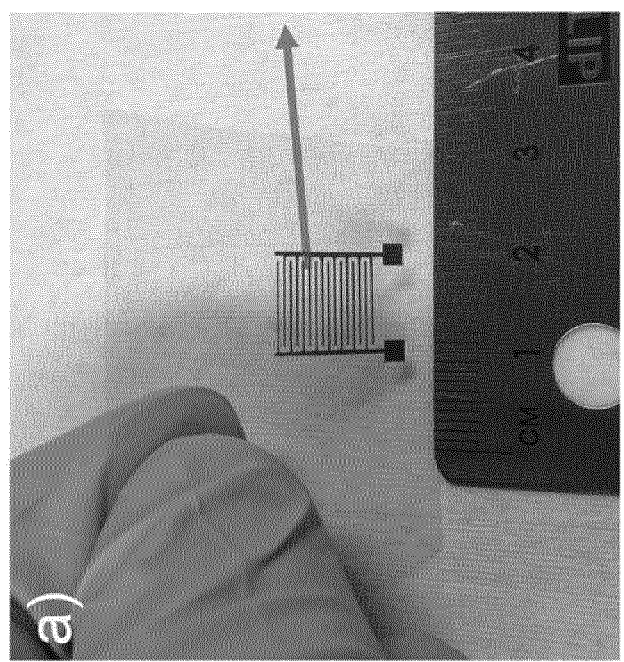

FIG. 14(a) shows a view of an interdigitated electrode structure deposited by screen printing on a polymer sheet.

FIG. 14(b) shows a micrograph of the tracks of the electrode structure.

Figure 15A:
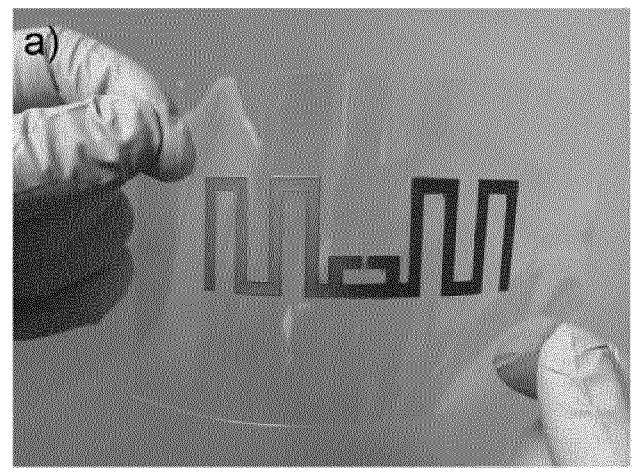

FIG. 15(a) shows a view of an alternative conducting structure deposited on a polymer sheet.

Figure 15B:
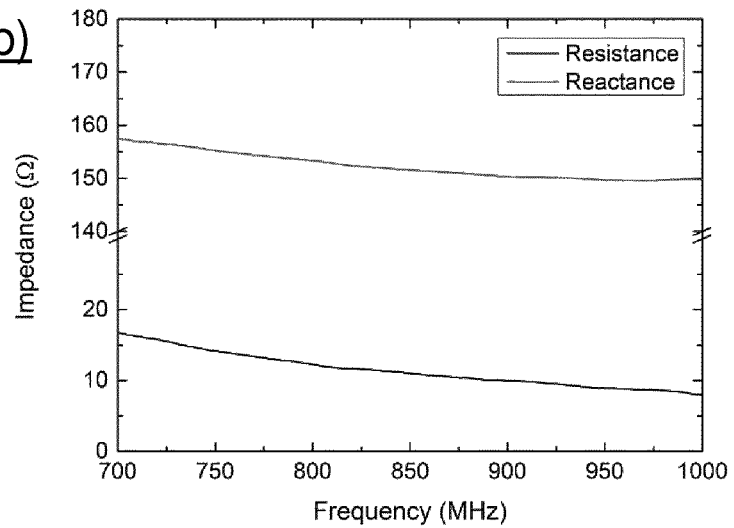

FIG. 15(b) shows the frequency dependence of the impedance of the structure of FIG. 15(a).

Figure 15C:
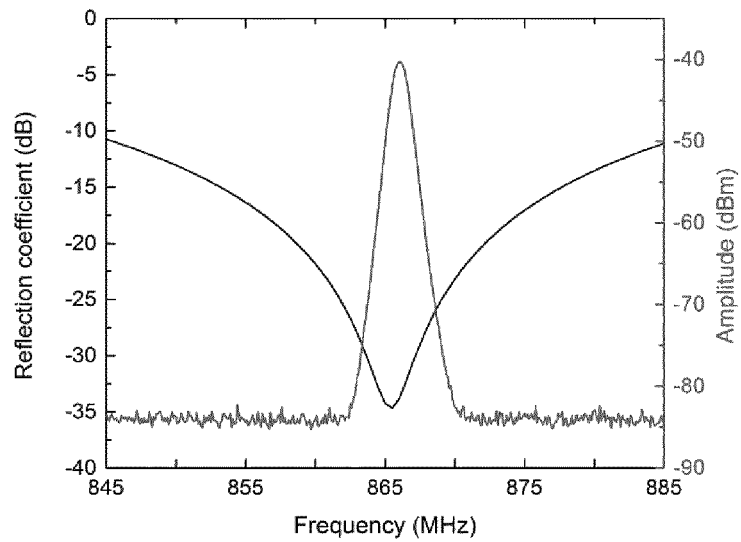

FIG. 15(c) shows the frequency response of the structure of FIG. 15(a).

FIG. 15(d) shows a view of a capacitive touchpad design (29 cm×29 cm) printed on paper.

FIGS. 15(e) and (f) show magnified views of the printed design of FIG. 15(d), indicating that the line resolution is at or better than 100 μm.

Figure 16:
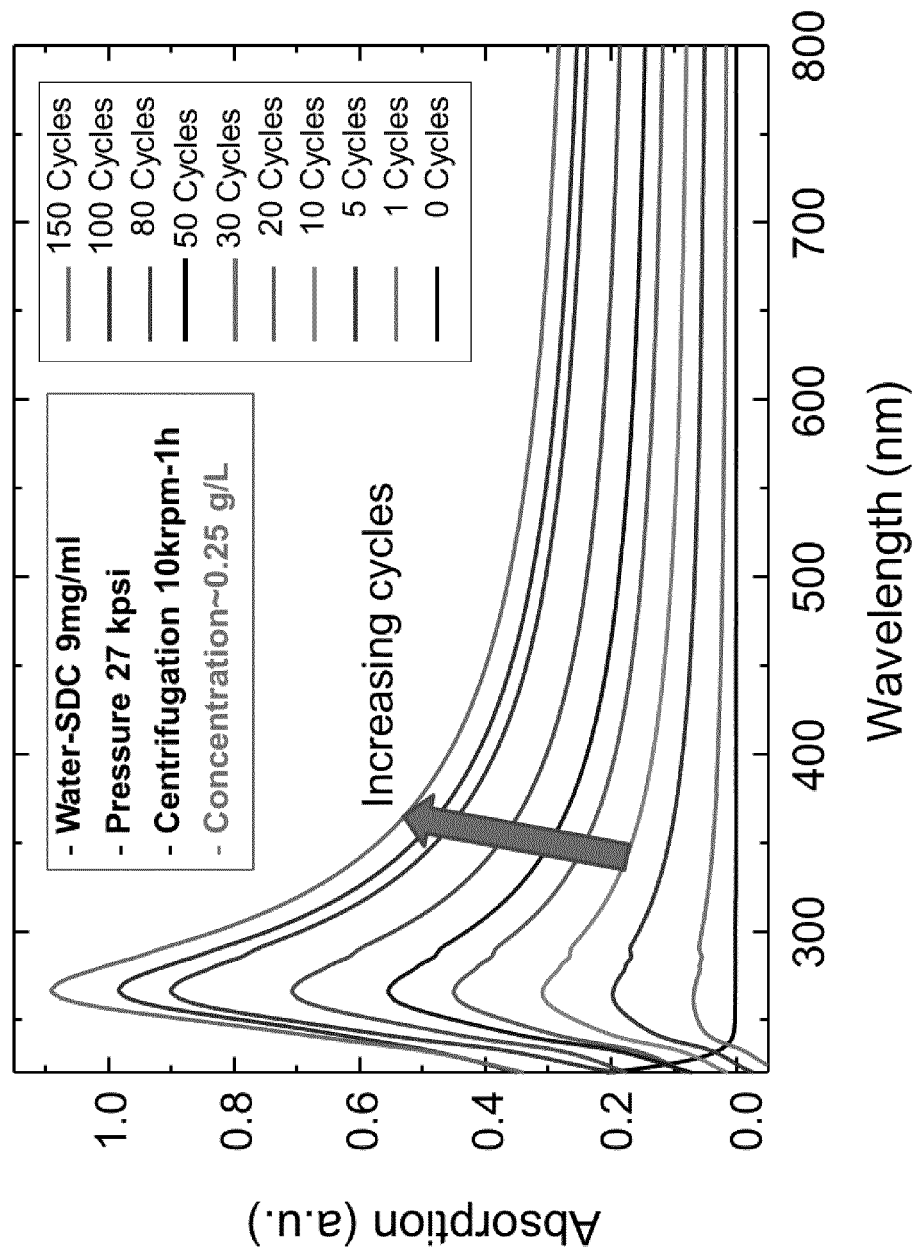

FIG. 16 illustrates that with increasing number of process cycles, the GNP concentration increases, the graphene concentration determined by light absorption.

FIGS. 17(a)-(f) show the effect of process variables on GNP concentration.

Figure 18:
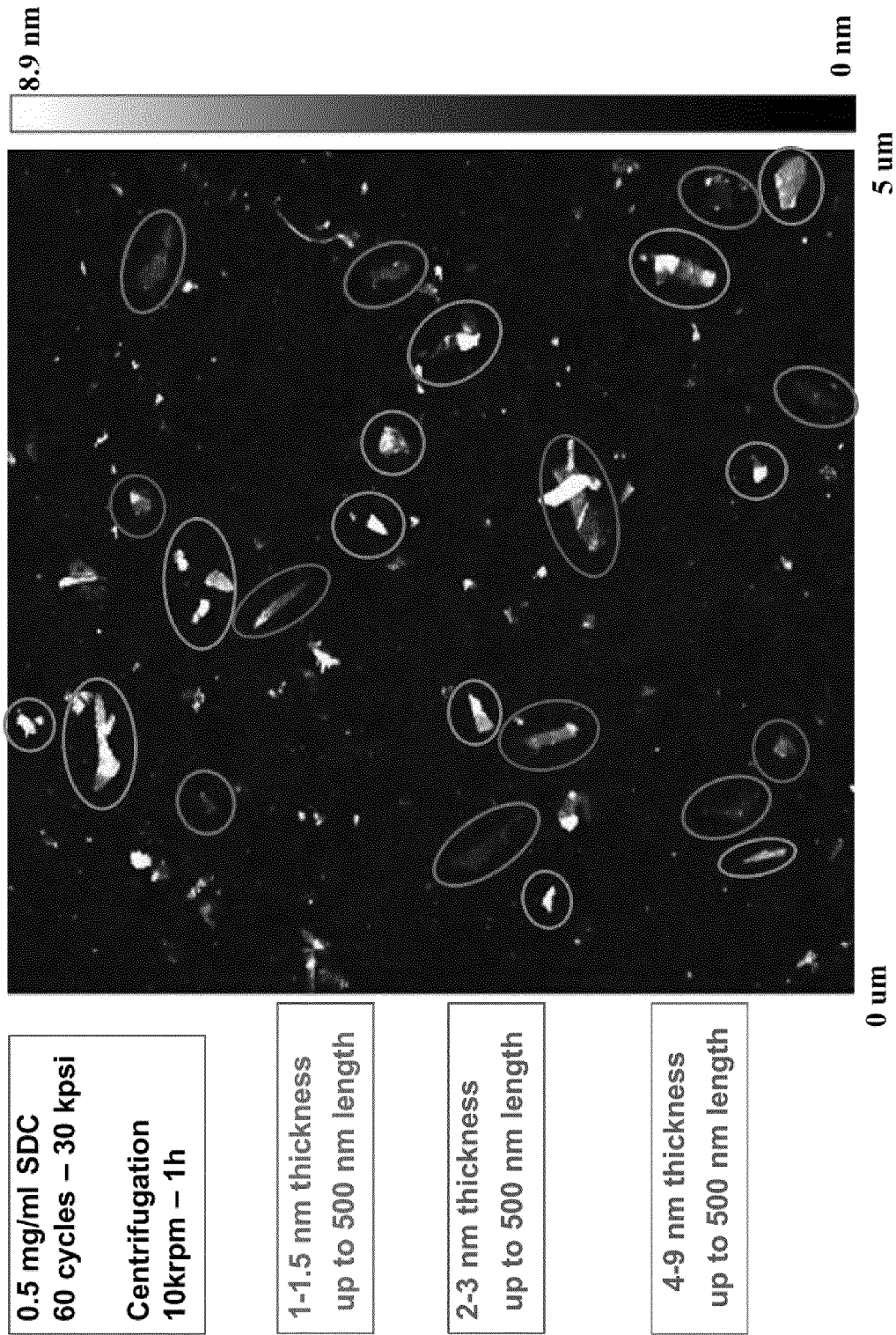

FIG. 18 shows an AFM image of flakes after microfluidic shear processing and centrifugation.

Figure 19:
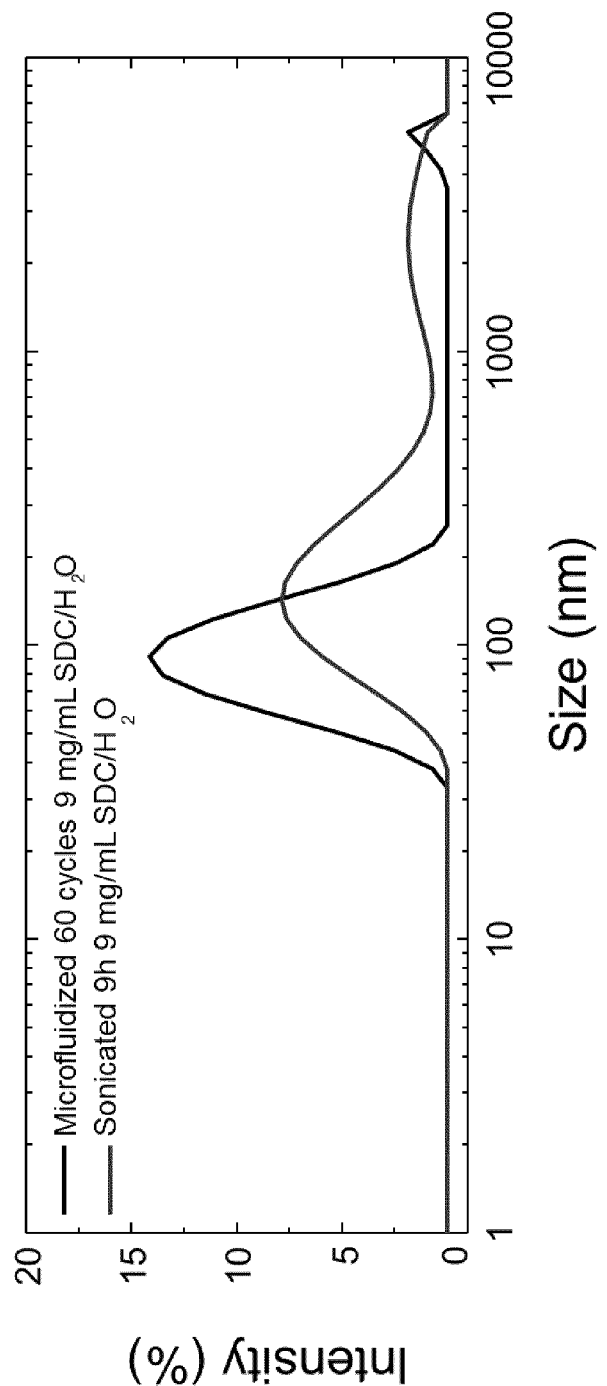

FIG. 19 shows the results of particle size analysis of a GNP dispersion produced according to an embodiment of the invention.

FIGS. 20(a)-(d) show particle size analysis in more detail.

Figure 21:
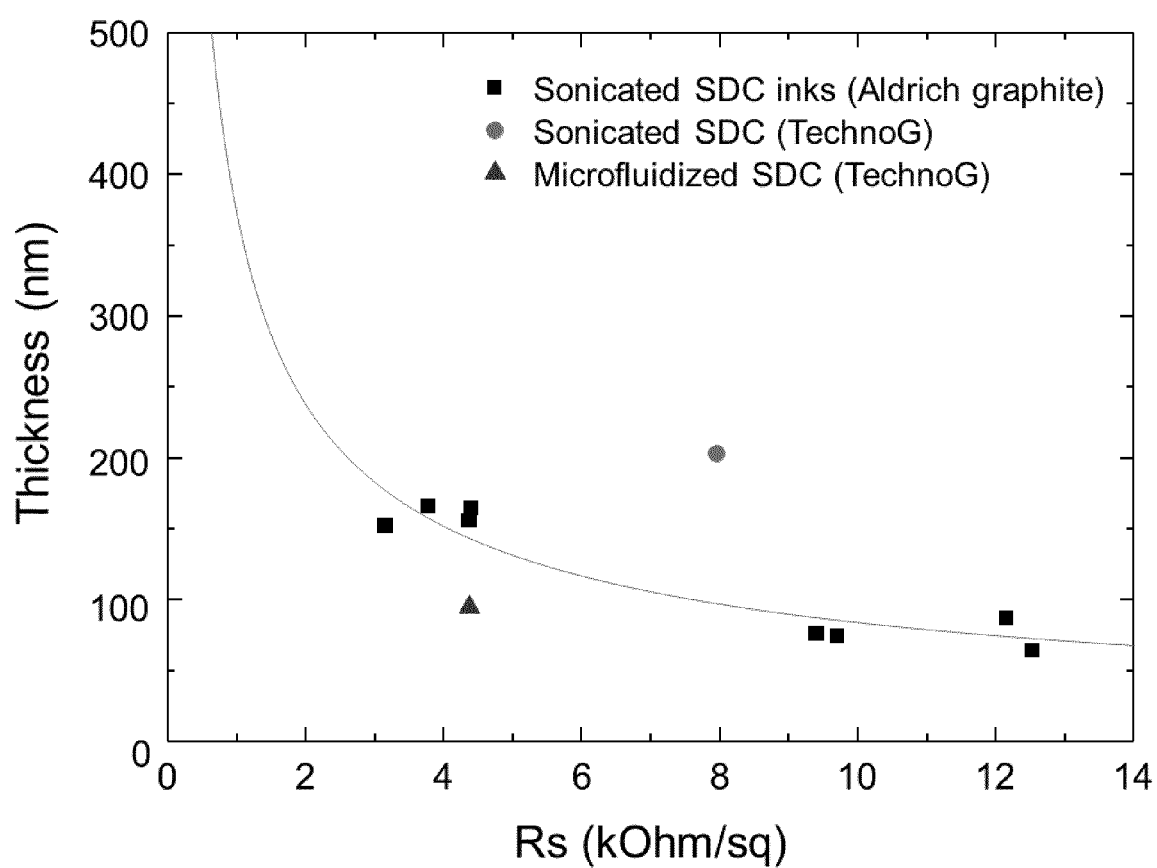

FIG. 21 compares the sheet resistance (Rs) of transparent conductive films (TCFs) formed using an ink according to an embodiment of the invention with TCFs formed using sonication processing.

Figure 22:
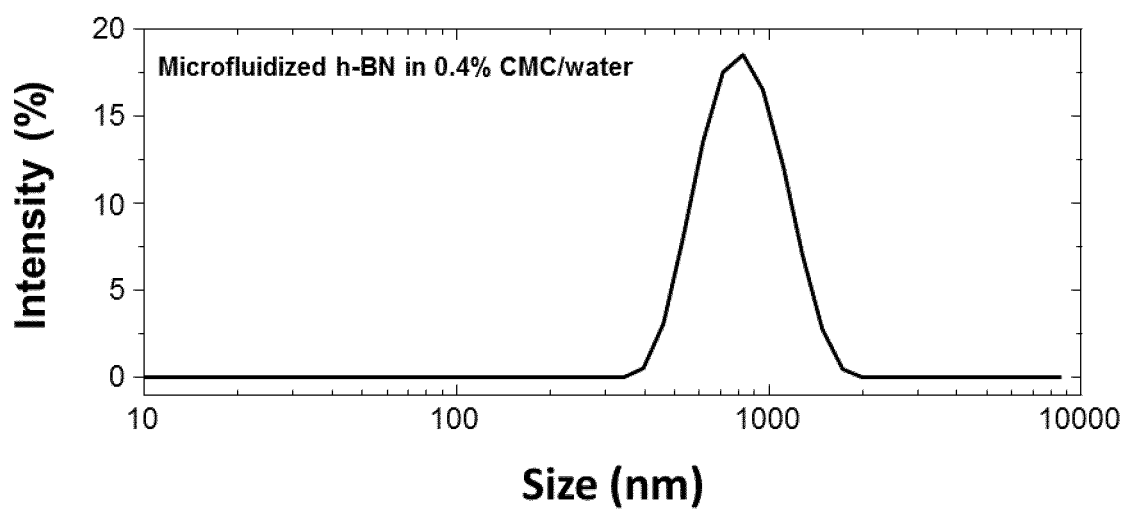

FIG. 22 illustrates the lateral size of h-BN flakes, as determined by DLS, according to an embodiment of the invention.

Figure 23:
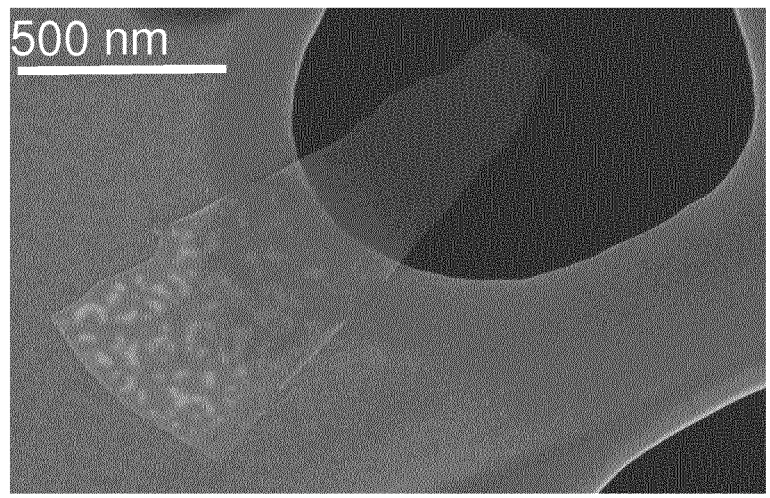
Figure 24:
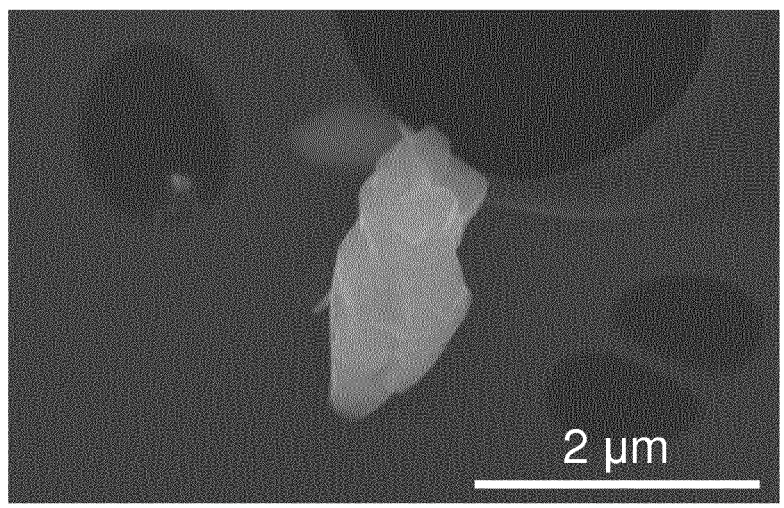

FIGS. 23 and 24 show scanning transmission electron microscopy (STEM) images of h-BN flakes formed according to an embodiment of the invention.

Figure 25:
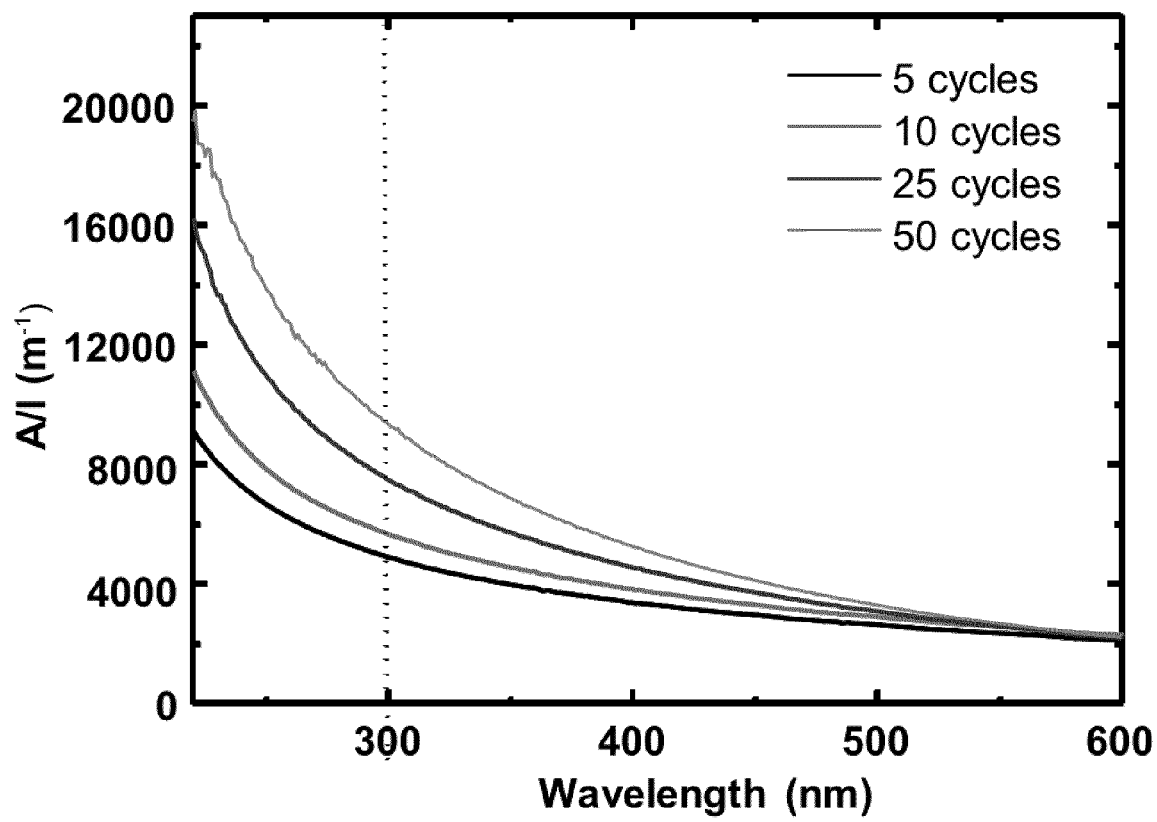

FIG. 25 shows the absorbance of h-BN flakes formed according to embodiments of the invention for different numbers of microfluidization process cycles.

Figure 26:
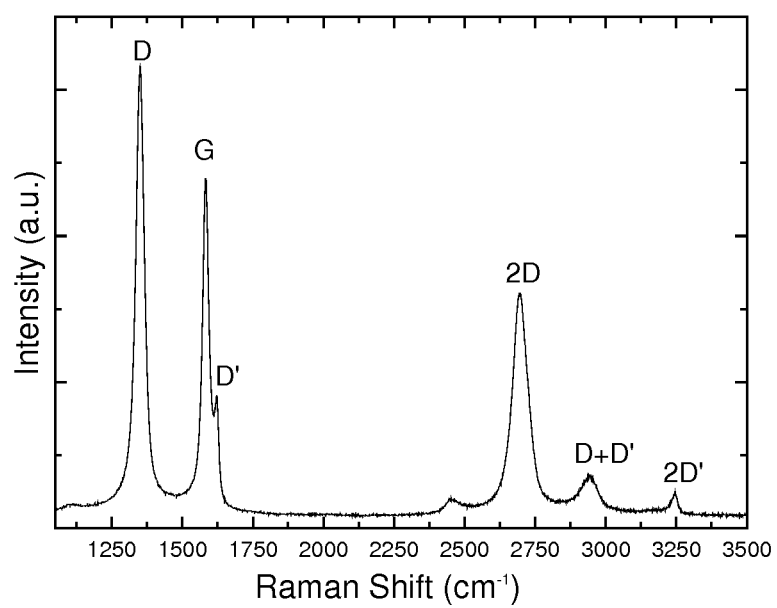

FIG. 26 shows typical Raman spectra at 514 nm of GNPs produced after 30 cycles at 20 kspi in deionized water dispersions.

FIGS. 27(a) and 27(b) show variation in storage modulus and loss modulus for films having different wt % GNPs.

DETAILED DESCRIPTION OF THE PREFERRED EMBODIMENTS, AND FURTHER OPTIONAL FEATURES OF THE INVENTION

The preferred embodiments of the present invention demonstrate a simple and efficient route to exfoliate graphite into graphene and graphite nanoplates (GNPs) using a high shear microfluidic processor. Depending on the processing conditions, nanoplates with different geometrical characteristics can be produced in aqueous solutions. These can be combined with carboxymethyl cellulose as a rheology modifier, in order to formulate conductive inks with high viscosity. Films prepared by blade coating or screen printing are shown to present a sheet resistance as low as 2 Ω/sq at thickness 25 μm (conductivity $2 \times 10^4$ S/m) after thermal annealing at 300° C. for 40 min. The processes disclosed here are simple, scalable and cost effective. The production yield of GNPs is 100%. Preferably, lengthy centrifugation steps are avoided. Indeed, it is preferred that no centrifugation is used. In more detail, the present inventors prefer not to use centrifugation for the formulation of the GNPs (thicker flakes) as it is a step that can be avoided. Centrifugation is only required to isolate the few layer graphene (FLG)/thinner flakes if it is necessary.

It is shown that five processing cycles of microfluidic treatment are sufficient for conductivity enhancement. The replacement of expensive metal inks such as silver or copper is demonstrated with the printing of radio frequency identification (RFID) tags onto cheap flexible plastic substrates, although as will be clear, a wide range of other applications exist for these conductive inks.

Introduction

Conductive components, such as electrodes in (opto) electronic devices (organic photovoltaics, organic light-emitting diodes), radio frequency identification (RFID) antennas, current collector grids for inorganic thin film photovoltaics etc. are only some applications which currently utilize silver or copper nanoparticle inks due to their high conductivity ($>10^7$ S/m) [Dearden et al (2005), Grouchko et al (2011), Chen et al (2013), Choi et al (2015)]. However, for mass produced flexible electronic devices, silver inks are not an ideal choice since they impart high device cost [dos Reis Benatto et al (2014)] and can have negative environmental impact if not disposed properly [Søndergaard et al (2014)]. Regarding copper or aluminum inks, oxidation after printing degrades their performance [Khan et al (2015), Kamyshny and Magdassi (2014)]. Therefore, there is a need for cheaper and stable alternatives; abundant graphite is a promising solution to these issues. Although monocrystal graphite can reach an in-plane conductivity as high as $2.3 \times 10^6$ S/m [Uher et al (1987)], coatings made from graphite inks typically exhibit conductivities in the order of $10^3$ S/m [http://www.gwent.org/ (accessed 21 September 2015)]. Thus, graphite inks have been used in applications such as EMI (electromagnetic wave interference) [Wu and Chung (2005)], RFI (radio frequency interference) [Chung (2001)], electrochemical sensors [Wang et al (1998)], lithium batteries [Nitta et al (2015)], biosensors [Gorton (1995)] and many others. Nevertheless, graphite has the potential to expand its application scope by being exfoliated into single atomic sheets, known as graphene. Graphene demonstrates exceptional electrical, optical, mechanical and thermal properties and has the potential to reshape the electronics market, especially in the flexible and printed electronics sector [Ferrari et al (2015)].

Progress towards graphene applications is reliant upon the production volumes as well as the resulting nanomaterial properties. For cheap, scalable processing, graphite is typically exfoliated into thinner stacks using liquid phase exfoliation (LPE) techniques [Hernandez et al 2008]. However, it was demonstrated that sonicated graphene may not be defect free [Bracamonte et al (2014), Polyakova et al (2011), Yi et al (2013)], the power distribution and intensity of the sonication-induced cavitation are highly dependent on the vessel size and shape and will vary upon production scaling. Most importantly, the production rate does not scale with V/t which is a significant limit to scalability.

Recently reported shear mixing has been used to demonstrate an increased production rate of few-layer graphenes (5.3 g/hr) [Paton et al 2014]. However, the rather low concentrations (C≤0.1 mg/mL) limit the overall application space [Varrla et al (2014)]. There is still a necessity for a method that will produce graphene in a more controllable way with on-demand geometrical characteristics. In addition, centrifugation to remove unexfoliated particles is another time consuming process that further limits scaling.

Graphite can be exfoliated into graphene by LPE providing stable dispersions in an appropriate solvent whose surface tension matches the surface energy of graphene. Alternatively, surfactants or polymer molecules are used to stabilize the flakes against restacking and sedimentation [Coleman et al 2009]. The resulting exfoliated flakes can be formulated into conductive inks for printing. Depending on the printing process, inks should meet specific requirements to achieve good printing quality. Key properties of inks viable for printing are viscosity, density and surface tension [Woo et al (2013)]. Low viscosity inks (1-40 mPas) are suitable for inkjet printing or bar coating, while higher viscosities are required for high throughput printing techniques like gravure (10-200 mPas), flexographic (50-500 mPas) and screen printing (>500 mPas) [Tobjork and Osterbacka (2011)]. The viability of inkjet printed graphene was first demonstrated by Torrisi et al [2012] who demonstrated thin film transistors with mobilities up to 95 $cm^1$ $V^{-1}$ $s^{-1}$ using graphene exfoliated by sonication in N-methylpyrrolidone while Secor et al [2013] reported conductivity in inkjet printed graphene patterns up to $2.5 \times 10^4$ S/m after annealing at 250° C. for 30 min. However, in the latter case, the graphene production by tip sonication as well as the repeated and complicated process of salt flocculation and redispersion in a solvent to obtain a graphene/ethyl cellulose powder limits scalability. A different approach was reported by Gao et al [2014] who exfoliate graphite using ultrasound-assisted supercritical $CO_2$; then formulated inks using cyclohexanone and ethyl cellulose as solvent and stabilizing agent, respectively. Inkjet-printed stripes with a conductivity of $9.24 \times 10^3$ S/m were achieved. Both of these aforementioned approaches include organic solvents and high temperature annealing to achieve high conductivity.

In this work, a simple, scalable and cost-effective LPE technique is proposed, namely microfluidic processing to exfoliate graphite in a highly controllable and scalable way. The resulting exfoliated flakes are formulated into new water-based conductive inks suitable for printing, coating or brushing.

EXPERIMENTAL

A. Materials

Graphite flakes (Timrex KS25, D90 <27.2 μm) (Imerys Graphite Carbon, Switzerland Ltd.) were used in conjunction with sodium deoxycholate (SDC) (Aldrich No. 30970) surfactant and carboxymethylcellulose sodium salt (CMC) (Mw=700.000, Aldrich No. 419338) as a rheology modifier. Some experiments were performed with natural graphite (Technografit GmbH, Germany with a D90 of less than 25 μm) and gave similar results with the synthetic one.

B. Methods

Microfluidic Processing

Aqueous graphite/SDC mixtures were processed with a high shear fluid processor (M-110P, Microfluidics Corporation, Newton, Mass., USA) equipped with a Z-type interaction chamber with a pipe diameter of 87 μm (G10Z). Mixtures were processed at 30 kpsi with varying process cycles. A homemade cooling system was installed after the interaction chamber to maintain the temperature of the dispersion at 20° C.

Washing

Prior to chemical structure characterisation the produced flakes were washed to remove the SDC surfactant, with two procedures tested:

(i) Centrifugal washing: 10 mL IPA was added to 5 mL of the GNP dispersion used to precipitate the GNPs. The dispersion was diluted with water to 250 mL in a polycarbonate centrifuge bottle (250 mL, 62×120 mm) and was centrifuged using an Avanti J-26S XP (Beckman Coulter) with a J-LITE JLA-16.250 fixed angle rotor at 14,000 rpm (30,000 g) for 30 min to sediment the GNPs. The water/SDC supernatant was discarded and more water added to wash the GNPs. This process was repeated 3 times for water and a further 4 times using ethanol.

(ii) Büchner filtration washing: 10 mL IPA was added to 5 mL of the GNP dispersion used to precipitate the GNPs. The suspension was filtered through a Whatman No. 1 70 mm diameter filter paper and washed with 500 mL water followed by 500 mL ethanol.

The GNP powder was dried under vacuum and gently scraped from the filter paper, or with the aid of mild sonication in ethanol, followed by solvent evaporation and drying in an oven at 70° C.

Centrifugation

Samples were centrifuged using a Sorvall WX-100 ultracentrifuge with TH-641 swinging bucket rotor in at 10000 rpm (about 15000 g) for 1 h.

Rheology Modification

Following the production of GNP inks, CMC was slowly added to the dispersion at room temperature to a final concentration of 10 mg/mL over 3 h. The mixture was continuously stirred until complete dissolution was observed.

Printing

Inks were blade coated onto glass microscope slides (25×75 mm) using a spacer that defined the wet film thickness. The films were dried at 100° C. for 10 min to remove water. Screen printing was performed using a commercial semi-automatic flatbed screen printer (Kippax kpx 2012) equipped with screens with 120 mesh count per inch. Striped patterns were printed onto rigid (glass microscope slides), flexible (PET, 125 μm thickness, PMX729 HiFi Industrial Film Ltd) and porous (nitrocellulose, 0.2 μm pore size) substrates by pushing the ink through the opening in the screen using a polyurethane squeegee at a speed of 0.1 m/s. The films were dried at 100° C. for 10 min to remove water.

C. Characterization

Optical Absorption Spectroscopy

A Perkin-Elmer Lambda 950 spectrometer was utilized for optical absorption spectroscopy measurements of GNP dispersions following centrifugation. GNP concentrations were estimated using an absorption coefficient of 1390 L g$^{-1}$ m$^{-1}$ at 660 nm, as for Hasan et al (2010) and Lotya et al (2009).

Microscopy

Scanning electron microscopy (SEM) was performed using a Hitachi S-5500 system. Multiple images were taken at different positions and magnifications across each sample. For SEM characterization, dispersions were diluted and drop-cast onto Si-wafers with 300 nm thermally grown $SiO_2$ (LDB Technologies Ltd) and further washed to remove the SDC surfactant. The same samples were characterized by atomic force microscopy (AFM) in peakforce mode using a Dimension Icon atomic force microscope from Bruker. A Nikon optical microscope was utilized to assess the quality of the printed patterns.

X-ray Photoelectron Spectroscopy (XPS)

Powdered samples were adhered to copper foil substrates and analysed by XPS using an Escalab 250Xi instrument (Thermo Scientific) with a pass energy for normal scans of 50 eV and energy step size 0.1 eV. The scan mode for the analyser was Constant Analyser Energy (CAE). The binding energies were referenced to the sp$^2$ C 1s peak of graphite at 284 eV. Data fitting and analysis was performed using CasaXPS software.

Scanning Electron Diffraction (SED)

SED experiments were carried out using a Philips CM300 field emission gun transmission electron microscope (FEGTEM) operated at 50 kV with a NanoMegas Digistar system. This enabled simultaneous scan and acquisition of electron diffraction patterns with an external optical charge-coupled device (CCD) camera imaging the phosphor viewing screen of the microscope.

Thermogravimetric Analysis (TGA)

TGA experiments were carried out using a TA Q50 instrument (TA Instruments, USA). Samples were heated from 25 to 100° C. at 10° C./min, and then held isothermally at 100° C. for 10 min to remove residual moisture. The temperature was then ramped to 1000° C. at 10° C./min.

Attenuated Total Reflectance Fourier Transform Infrared Spectroscopy (ATR-FTIR)

ATR-FTIR spectra were collected using a Frontier FTIR with UATR module (Perkin Elmer). Spectra recorded over the range 4000-550 cm$^{-1}$, represent an average of 32 individual scans with 2 cm$^{-1}$ spectral resolution.

Raman Spectroscopy

Raman spectra were acquired at 457, 514, 633 nm excitation wavelengths using a Renishaw InVia micro-Raman spectrometer equipped with a 50× objective (N.A.=0.85). The power was kept below 1 mW on the sample to avoid thermal damage and overheating.

Rheological Characterization

The flow behavior of the inks was investigated using a Discovery HR-1 rheometer from TA Instruments utilizing the parallel-plate (40 mm diameter) setup. Flow curves were carried out by increasing the shear rate from 1 to 1000s$^{-1}$ at a gap of 0.5 mm. Dynamic amplitude sweeps were carried out from 0.1 to 1000% strain at a frequency of 1 rad/s. All rheology measurements were performed at 25° C.

Electrical Characterization

The sheet resistance of the coatings was measured in four different locations per sample using a four-point probe (Jandel). The film thickness for each corresponding point was determined using a profilometer (DektakXT, Bruker).

Radio Frequency (RF) Characterization

RFID antennas were designed using commercial Electromagnetic Simulation Software (CST-Microwave Studio). To characterize the antennas, a Keysight Technologies PNA-X N5245 vector network analyser and a Keysight Technologies N9030A spectrum analyser were used. The maximum input power given to the RFID tag for the input impedance as well as the transmission measurements, was limited to 0 dBm. All measurements have been performed after calibration using the N4692A Electronic Calibration Kit. The receiving antenna for the spectrum analyser measurements was a double-ridged ETS-3115 antenna, with operation frequency from 750 MHz to 18 GHz. The gain of the antenna at UHF (865-868 MHz) frequencies was approximately 5 dBi. The RFID tag was connected to the PNA-X and fed with a continuous wave, covering the UHF bandwidth, and acting as a transmitter. The receiving horn antenna was then attached to the spectrum analyser and placed 1 m away from the RFID tag. From the power level transmitted to the horn and Friis equation, the read range was calculated.

Results and Discussion

A. Graphite Exfoliation

Figure 1:
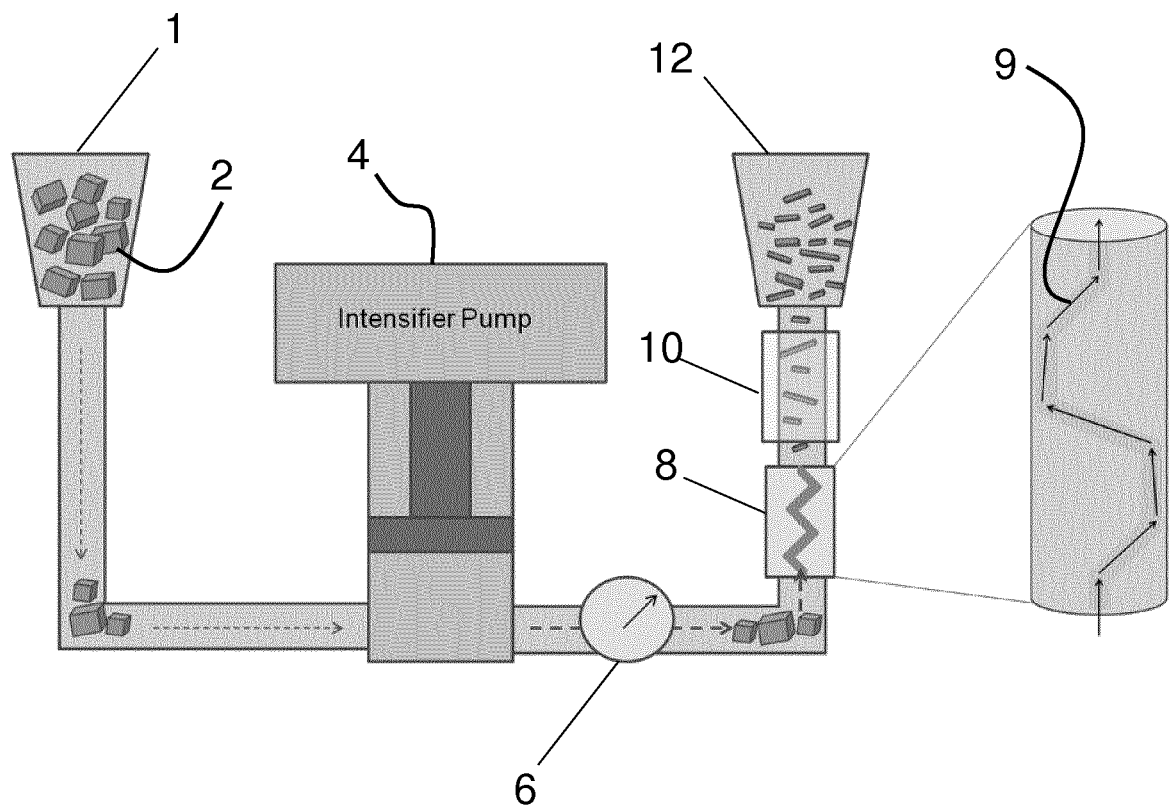
FIG. 1 shows a schematic drawing of a microfluidic process used for the exfoliation of graphite in a preferred embodiment of the invention.

In a typical process, graphite flakes (Timrex KS25, D90 <27.2 µm) were mixed in deionized water at a concentration of 50 mg/ml with 9 mg/ml of sodium deoxycholate (SDC) surfactant as a dispersing agent. The mixture was processed with a high shear fluid processor (M-110P, Microfluidics Corp.) equipped with a Z-type, zig-zag geometry, interaction chamber 5 (G10Z). The microfluidization process is illustrated in FIG. 1, which shows inlet reservoir 1 for the introduction of a dispersion of graphite flakes 2. The dispersion is subjected to pressurization by intensifier pump 4, as measured by pressure gauge 6. By virtue of the pressurization of the dispersion, the dispersion is forced through the interaction chamber 8, which is shown in simplified form as having a meandering microfluidic channel 9. After the interaction chamber 8, the dispersion is optionally subjected to cooling by cooling system 10, before reaching outlet reservoir 12.

The process therefore involves the continuous flow of liquid-liquid or solid-liquid mixtures at high pressure (up to 30 kpsi) through the interaction chamber that consists of micron-sized channels with varying process cycles (1-100). The fluid velocity inside the channels can reach 500 m/s and the produced shear rates exceed 10$^6$ s$^{-1}$ which is orders of magnitude higher than conventional homogenizers, rotor stator mixers, or colloid mills [Panagiotou et al]. The temperature increases from 20 to 55° C. after the liquid passes through the interaction chamber 8. A cooling system 10 after the interaction chamber 8 reduces the temperature of the dispersion to about 20° C. This is important because otherwise the temperature will keep increasing after several cycles and the solvent will start to boil. Microfluidization is an industrially proven technology and has been widely used in pharmaceutical and food industry. In this work, the graphite-SDC mixtures with increasing graphite loading (1-100 g/L) and 9 g/L SDC in DI water were processed for multiple cycles (1, 5, 10, 20, 30, 50, 70, 100); considering one processing cycle each pass of the mixture through the interaction chamber.

FIG. 2(*a*) shows typical scanning electron microscopy (SEM) images taken from the starting graphitic particles which presented an isometric, irregular spheroid morphology. The exfoliated flakes were characterized as received from the microfluidizer (no centrifugation step is applied). Dispersions were diluted (1000 times, from 50 g/L to 0.05 g/L) to avoid aggregation after they were drop casted onto Si/SiO$_2$ substrates. The samples were further washed with five drops of a mixture of water and ethanol (50:50 in volume) to remove the surfactant. Three different magnifications were used; for each magnification, images were taken at 10 positions across each sample. According to the manufacturing company, 90% of these particles have a diameter less than 27.2 µm which is in good agreement with our SEM statistics shown FIG. 2(*b*) (0 cycles). A statistical analysis of over 80 particles reveals a diameter of up to about 32 µm. FIG. 2(*b*) also shows the size of the exfoliated flakes after 5, 20 and 100 cycles (50 g/L loading of graphite). A gradual diameter reduction is shown accompanied by a narrowing of the full width at half maximum (FWHM) with increasing the processing cycles. Note the change in the abscissa scale in the sequence shown in FIG. 2(*b*). After 100 cycles the mean flake size is around 1 µm. The size reduction is due to exfoliation and fragmentation, as discussed above in relation to the calculation of the Reynolds number and turbulent shear.

Figure 4A:
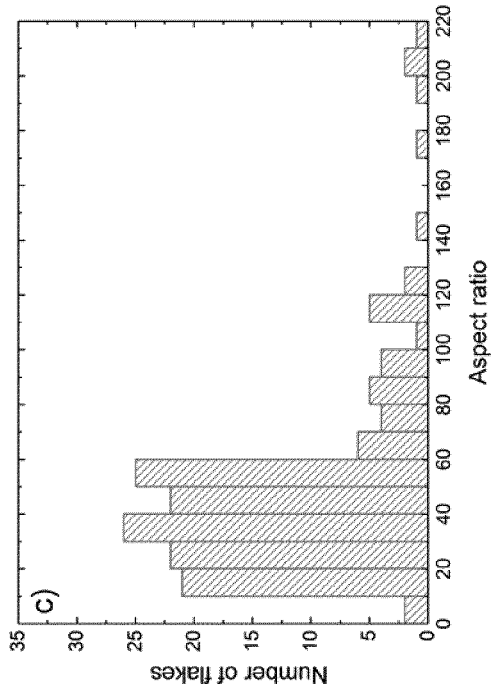
FIGS. 4(a) and 4(d) show histograms of the flake thickness for 20 and 100 processing cycles, respectively.
Figure 4D:
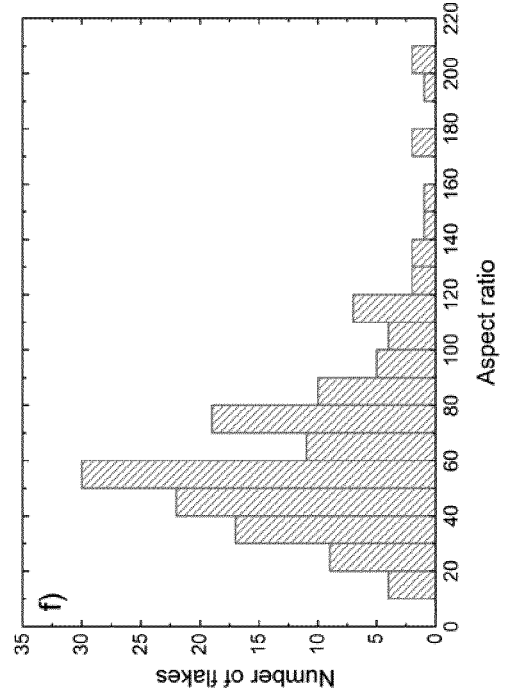
Figure 4C:
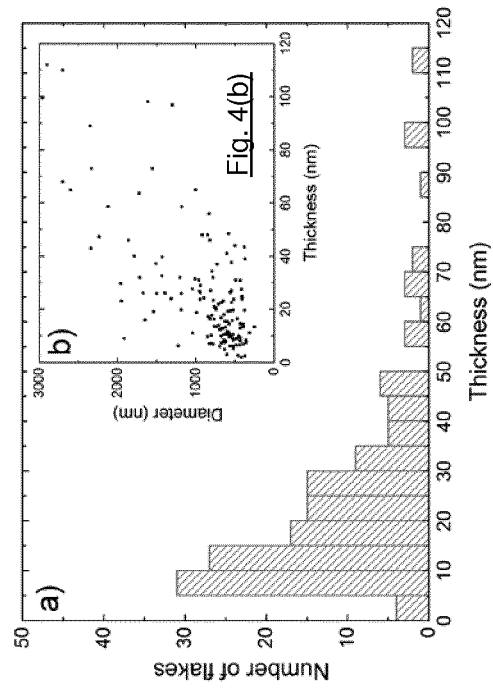
FIGS. 4(c) and 4(f) show aspect ratio for 20 and 100 processing cycles, respectively.
Figure 4F:
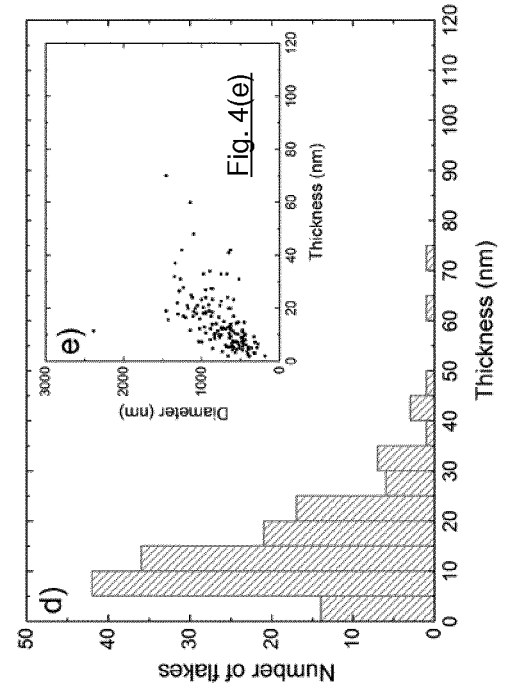

Centrifugation was used to sediment the larger graphite particles in the 100 cycles sample. The supernatant was collected and analyzed using optical absorption spectroscopy. Using the Beer-Lambert law [Torrisi et al (2012)], a final concentration of 1 mg/mL was estimated for a dispersion with 50 mg/mL of starting graphite, giving a yield of 2 wt %. Atomic force microscopy (FIGS. 3(*a*) and 3(*b*)) revealed flakes with about 1 nm thickness indicating the presence of single or double layer graphene. AFM of the dispersion prior to centrifugation (FIGS. 3(*c*) and 3(*d*)) showed larger flakes with a diameter of 1.9 nm and 1.7 nm and thickness of 8.5 (line C) and 25 nm (line B), respectively. This material represents 98% wt. Further AFM was performed to investigate the change in flake geometrical characteristics (lateral size and thickness, thus, aspect ratio) during the microfluidic processing (20 and 100 cycles). For statistics three samples, 60 µL each (taking a drop 3 times from the dispersion for statistics), were collected from each dispersion (20 and 100 cycles) and washed with five drops of a mixture of water and ethanol (50:50 in volume) to remove the surfactant. The flake geometrical characteristics were extracted over 300 flakes, which were counted from scan sizes of 20 µm×20 µm obtained from different samples. After 20 processing cycles the flakes presented a lognormal distribution peaked at about 10 nm of thickness (FIG. 4(*a*)) with a mean value about 19 nm with an extended tail to 110 nm. After 100 processing cycles (FIG. 4(d)) the distribution is shifted towards lower thickness with a maximum at about 7.4 nm, a mean thickness about 12 nm and with a more rapid decay to 75 nm (4% of the flakes are <4 nm and 96% are >4 nm up to 75 nm). Overall, the aspect ratios given in FIGS. 4(c) and 4(f) were found to increase with processing cycles although the overall flake lateral size decreases with further processing. The mean aspect ratio of the flakes increased from about 41 at 20 cycles to about 59 at 100 cycles. The produced flakes were henceforth referred to as graphite nanoplates (GNPs).

Figure 5:
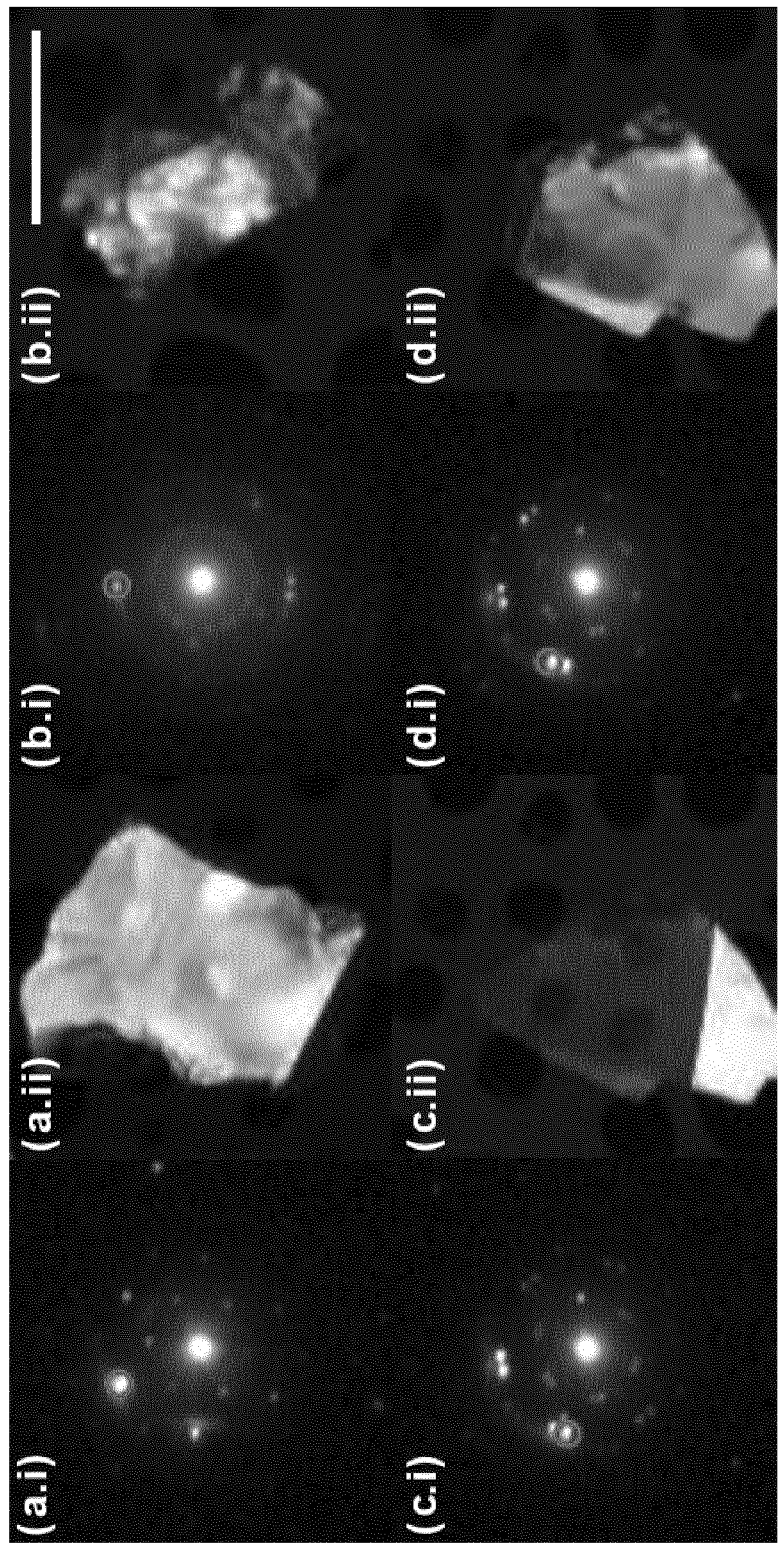

The crystalline structure of individual flakes was investigated, using SED, after 100 cycles (no statistical difference was observed between samples of different processing cycles). Local crystallographic variations are visualized by plotting the diffracted intensity in a selected sub-set of pixels in each diffraction pattern as a function of probe position to form so-called "virtual dark-field" images (FIG. 5). Three broad classes of flakes were observed, comprising single crystals (FIG. 5(a)), polycrystals with a small (<5) number of orientations (FIG. 5(b)) and many (>5) small crystals (FIGS. 5(c) and 5(d)). This shows that there is heterogeneity between individual flakes and that after 100 cycles a significant fraction (approximately 70% in this sample) are polycrystalline.

It is important to assess any chemical changes of the produced GNPs, for example, graphite oxidation or other covalent functionalisation that might occur during processing. The microfluidized GNPs (100 cycles) were washed using different procedures (see Experimental section) to remove the SDC surfactant prior to characterisation using thermogravimetric analysis (TGA), attenuated total reflectance Fourier transform infrared spectroscopy (ATR-FTIR) and X-ray photoelectron spectroscopy (XPS). Inert atmosphere (nitrogen) TGA (FIG. 6(a)) was performed in order to solely remove both adsorbed and covalently bonded functional groups on the graphitic structures. The as-received graphite showed about 2 wt % decomposition above 700° C. Microfluidized GNPs after centrifugal washing revealed a 2 wt % weight loss at 300-400° C. However, with Büchner filtration washing, this decomposition was completely removed, suggesting the weight loss was due to residual surfactant that begins to decompose at 400° C. (as shown in FIG. 6(a) inset). Therefore, this Büchner filtration washing procedure was used before characterising the GNP material with ATR-FTIR and XPS. Compared to the as received graphite, thermal decomposition of the GNPs occurred at a lower temperature (about 600° C.) with a weight loss of about 6 wt %, expected due to a smaller graphite crystallite size following liquid phase processing [Welham et al (1998), Benson et al (2014)]. ATRFTIR spectra (FIG. 6(b)) indicated the presence of O—H (3600 cm$^{-1}$), C—H (2960 cm$^{-1}$), C=O (1740 cm$^{-1}$), C=C (1588 cm$^{-1}$, aromatic), C—O (1230 cm$^{-1}$ and 1170 cm$^{-1}$) stretching modes [Williams (1963)] within both as-received and GNP samples. However, there was no increase in the intensity of these stretching modes between the as-received graphite and GNP material, confirming that there was no apparent functionalization during microfluidic processing; in fact the intensity of these peaks show a stark contrast to FTIR spectra of chemically modified graphites [Jeon et al (2012)]. Nevertheless, the presence of very few oxygen moieties is likely to contribute to the high temperature decomposition observed in TGA, due to the evolution of CO and $CO_2$ [Dreyer et al (2010)]. XPS was further used to confirm this observation, as well as elucidating the C:O atomic ratios [Yanga et al (2009)]. Survey scan spectra (FIG. 6(c)) of the as-received graphite and GNP material revealed only C 1s (about 284 eV) and O 1s (about 531-533 eV peaks), in line with ATR-FTIR observations. Na peaks (about 1071 eV) that might indicate residual surfactant were not present. Hi-resolution spectra (FIGS. 6(d) and 6(e)) showed that both C 1s spectra for the as received and GNPs could be fitted with 3 components: C=C (284 eV), C—O (about 285-286 eV) and π-π* transitions (about 290 eV), indicating the type of functional groups present do not change; overall C 1s:O 1s atomic ratios were also comparable (35.1 and 25.9, respectively). It was presumed that the existing functional groups were present mainly at the graphite edges, hence the increase in oxygen content for GNPs is likely to arise due to the increased ratio of edge to basal plane sites as the flake lateral size decreases following processing. However, even for GNPs, this C:O ratio is an order of magnitude larger than those observed for graphene oxide (GO) produced by the modified Hummer's method (about 3) [Yanga et al (2009)]. Moreover, Yanga et al (2009) showed that following reduction to reduced graphene oxide (rGO) using thermal and chemical treatments, the C:O ratio remains below 15; about half of the ratio measured for the GNPs produced by microfluidic processing, reaffirming that the GNPs are chemically unmodified. High resolution C1s scans (FIGS. 6(d) and 6(e)) of both the starting graphite and exfoliated flakes can be fitted with 3 components: an asymmetric $sp^2$ C—C (284.5 eV), C—O (about 285-286 eV) and π-π* transitions at about 290 eV. Only a slight increase in the relative area of the C—O peak from about 2% in the starting graphite to about 5.

Raman spectroscopy was used to assess the quality of the produced flakes. About 60 μL of aqueous dispersion was drop casted onto 1×1 cm $Si/SiO_2$ substrates. Then heated at 80-100° C. for 20 minutes, to ensure water evaporation and then washed with a mixture of water and ethanol (50:50 in volume). A statistical analysis was performed on the samples processed for 20, 50, 70 and 100 cycles. The Raman spectra were collected by using a motorised stage as follows: The substrate was divided in nine equally spaced regions of 200×200 cm². In each region 3 points were acquired. This procedure was repeated for the four samples processed respectively 20, 50, 70 and 100 cycles and for the 3 wavelengths (457, 514.5 and 633 nm). Among all the points collected for all the samples, 20 spectra are used for the statistical analysis.

Figure 7A:
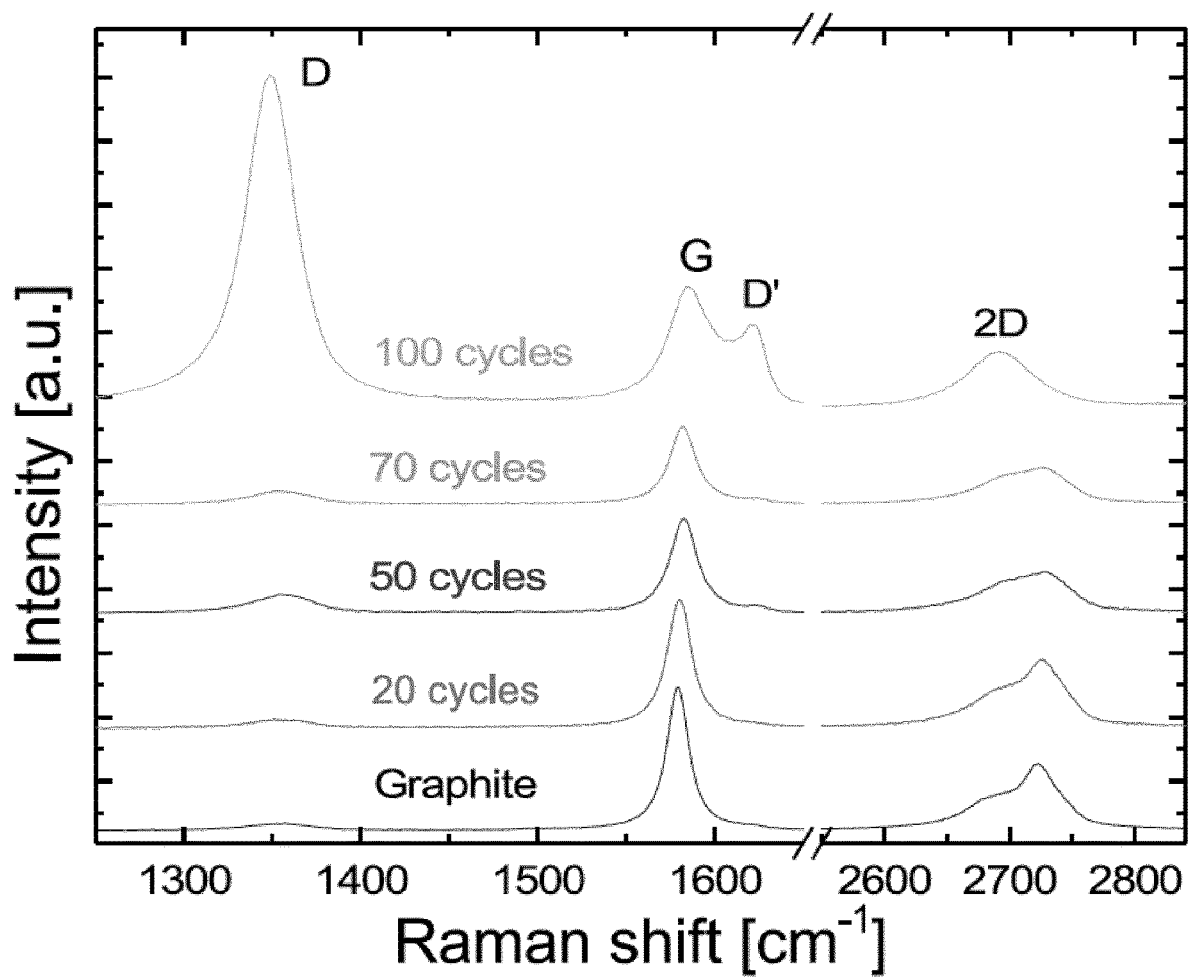
FIG. 7(a) shows Raman spectra at 514.5 nm for graphite (bottom curve) and representative flakes after 20 (second from bottom curve), 50 (third from bottom curve), 70 (fourth from bottom curve) and 100 (top curve) process cycles.

FIG. 7(a) plots representative spectra of the starting graphite and the processed flakes for 20 (second from bottom line), 50 (third from bottom line), 70 (fourth from bottom line) and 100 cycles (top line). The G peak corresponds to the high frequency E2g phonon at Γ. The D peak is due to the breathing modes of six-atom rings and requires a defect for its activation. It comes from transverse optical (TO) phonons around the Brillouin zone corner K. It is active by double resonance (DR) and is strongly dispersive with excitation energy due to a Kohn Anomaly (KA). DR can also happen as an intravalley process, i.e. connecting two points belonging to the same cone around K (or K'). This gives the so-called D' peak. The 2D peak is the D-peak overtone, and the 2D' peak is the D' overtone. Because the 2D and the 2D' peaks originate from a process where momentum conservation is satisfied by two phonons with opposite wave vectors, no defects are required for their activation, and are thus always present. The 2D peak is a single Lorentzian in SLG, whereas it splits in several components as the number of layers increases, reflecting the evolution of the electronic band structure. In bulk graphite it consists of two components, roughly ¼ and ½ the height of the G peak. In disordered carbons, the position of the G peak, Pos(G), increases with decreasing of the excitation wavelength $\lambda_L$. Therefore, the G peak dispersion, Disp (g)=$\Delta$Pos(G)/$\Delta\lambda_L$, indicating the rate of change of the Pos (G) as a function of varying $\Delta\lambda_L$, increases with disorder. Analogously to Disp(G), the full width at half maximum of the G peak, FWHM(G), increases with disorder. The analysis of the intensity ratio of the D and G peaks, I(D)/I(G), combined with that of FWHM(G) and Disp(G), thus allows one to discriminate between disorder localized at the edges and disorder in the bulk of the samples. In the latter case, a higher I(D)/I(G) would correspond to a higher FWHM(G) and Disp(G).

The Raman spectrum of a starting graphite flake measured at 514 nm is shown in FIG. 7(a) (bottom curve). In bulk graphite, the two most intense features are the G peak at 1580 cm$^{-1}$ and the 2D peak at 2700 cm$^{-1}$ref. The G peak corresponds to the $E_{2g}$ phonon at the Brillouin zone centre [Ferrari et al (2006)]. The 2D peak is the second order of the D peak [Ferrari et al (2013)]. The D peak is due to the breathing modes of sp2 rings and requires a defect for its activation by double resonance (DR) [Ferrari et al (2006), Ferrari et al (2013), Ferrari and Robertson (2000), Tuinstra and Koenig (1970)]. In the Raman spectrum of our starting graphite we observe a minor D peak (at 1350 cm$^{-1}$), with an intensity ratio of the D and G peaks, I(D)/I(G) about 0.05. We attribute this value to the initial presence of defects in synthetic graphite, corresponding to an average defect density of 1.2×10$^{10}$ cm$^{-2}$, [Cancado et al (2011]. The 2D peak is a single band in single layer graphene, whereas it splits into four components in bi-layer graphene, reflecting the evolution of the band structure [Ferrari et al (2006)]. In bulk graphite it consists of two components, roughly ¼ and ½ the height of the G peak, respectively. The 2D peak is always seen, even when no D peak is present, since no defects are required for the activation of two phonons with the same momentum, one backscattering from the other. DR can also happen intra-valley, i.e. connecting two points belonging to the same cone around K or K', giving rise to the D' peak. A representative Raman spectrum of the flakes obtained after 20 cycles of exfoliation is shown in FIG. 7 (a) (second curve from bottom). The 2D peak still resembles the two-component structure typical of graphite (FIG. 7 (a), bottom curve), indicating that the flakes did not undergo sufficient exfoliation. A D peak is also present (along with a D peak) with average I(D)/I(G) about 0.15, larger than that of the starting graphitic counterpart. This would correspond to an increased average defect density of 3.6×10$^{10}$ cm$^{-2}$ [Cancado et al (2011)]. The average value for Pos(G) is 1580.4 cm$^{-1}$ (FIG. 7b). The average FWHM(G) is 17.3 cm$^{-1}$ (FIG. 7c), larger than the average FWHM(G) 15.5 cm$^{-1}$ found in the starting graphite. FWHM(G) always increases with disorder [Ferrari et al (2003) and Cancado et al (2011)]. Also, in disordered carbons the G peak position, Pos(G), increases with decreasing excitation wavelength, from infrared (IR) to ultraviolet (UV). Thus, the G peak dispersion, Disp(G)=_$\Delta$Pos(G)/$\Delta\lambda_L$, where $\lambda_L$ is the laser excitation wavelength, increases with disorder. However, whilst 20 processing cycles does not effectively thin down the graphite flakes, it does reduce their lateral size, as seen from the histogram in FIG. 2(b). Therefore, besides the bulk of the flakes, the flake edges are also probed within our µm-sized laser spot. Thus, combining I(D)/I(G) with FWHM(G) and Disp(G), allows us to discriminate between disorder localized at the flake edges, and disorder in the bulk of the samples [Ferrari and Robertson (2001)]. In the latter case, a higher I(D)/I(G) would correspond to higher FWHM(G) and Disp(G). Disp(G)<0.01 cm$^{-1}$/nm (generated from multiwavelength Raman spectra measured at 457 nm, 514.5 nm and 633 nm) for the flakes processed over 20 cycles is much lower than in disordered carbons [Ferrari and Robertson (2001)]. Moreover, the distributions of Disp(G), I(D)/I(G) and FWHM(G) are not correlated [FIGS. 8(a) and 8(b)]. Such absence of correlation is an indication that the main contribution to the D peak arises from the sample edges [Casiraghi et al (2009)] and further confirmed the absence of additional defects introduced by the microfluidic process besides those already present in the starting material. Thus, the D and D' peaks are assigned to the edges of the micrometer-sized flakes [Casiraghi et al (2009)], rather than to the presence of a large amount of disorder within the flakes.

The analysis over 20 measurements on the material processed respectively for 50 and 70 cycles gives an average value of the Pos(G) of 1582.8 cm$^{-1}$ (FIG. 7(b)), for the 50 cycles and 1582.3 cm$^{-1}$ for the 70 cycles. The FWHM(G) (FIG. 7c), is 17.78 cm$^{-1}$ and 16.63 cm$^{-1}$ respectively. The I(D)/I(G) ratio (FIG. 7d), ranges from 0.01 to 1.35 in the case of the 50 cycles and from 0.24 to 0.3 for the 70 cycles. The 2D band shows still two components like in the case of graphite, but with a difference in the intensity ratio between the two. Indication that by increasing the number of cycles the flakes are coming thinner.

Figure 8B:
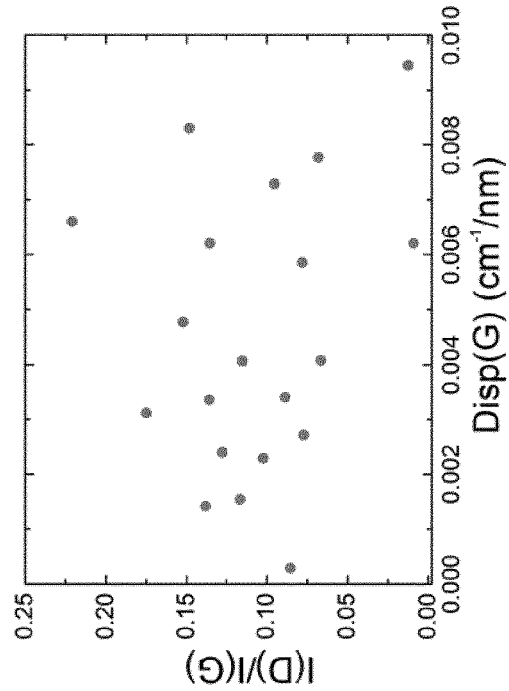
FIGS. 8(a) and (b) show plots of I(D)/I(G) as a function of FWHM(G) and Disp(G), respectively, for ink processed over 20 cycles.
FIGS. 8(c) and (d) show plots of I(D)/I(G) as a function of FWHM(G) and Disp(G), respectively, for ink processed over 100 cycles.
Figure 8D:
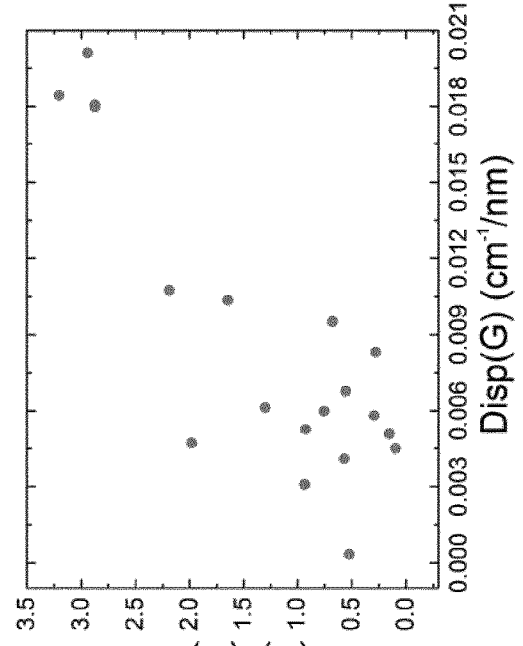
Figure 8A:
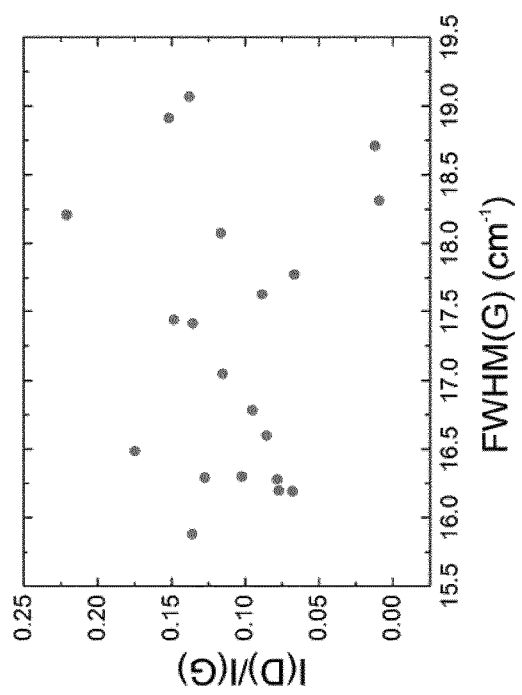
Figure 8C:
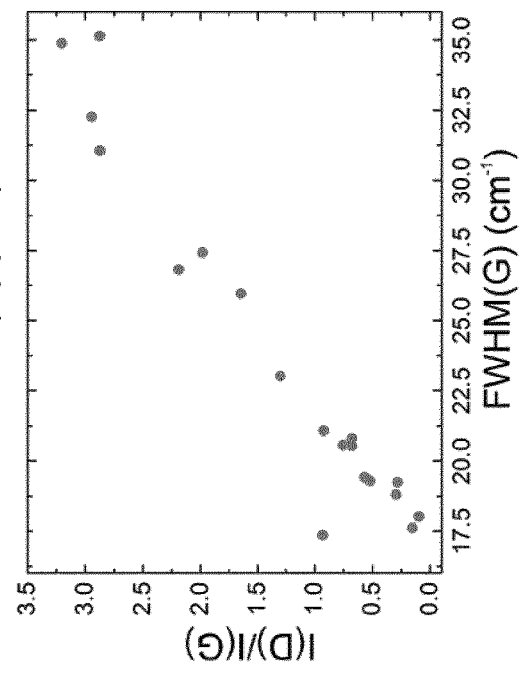

FIG. 7(a) (top curve) shows a representative Raman spectrum of the flakes after 100 cycles of processing. The average value for Pos(G) is 1582.8 cm$^{-1}$. The I(D)/I(G) intensity ratio FIG. 7(d), ranges from 0.07 to 3.3. We note that in this case the 2D peak is a single Lorentzian, with FWHM 30 cm$^{-1}$ larger than that of an individual graphene nanosheet. More recent data indicates that after 100 cycles of processing the 2D peak has FWHM 23.4 cm$^{-1}$. Thus, even if the flakes are multi-layers, to a first approximation they behave as a collection of single layers [Ferrari and Robertson (2000), Casiraghi et al (2009)]. By analysing I(D)/I(G), FWHM(G) and Disp(G) [FIGS. 8(c) and 8(d)], we note the onset of linear correlations between I(D)/I(G) and FWHM(G), and between I(D)/I(G) and Disp(G), which are both indicative of the presence of in-plane defects within the bulk of the flakes [Ferrari and Robertson (2001)]. However, Disp(G) remains lower (Disp(G)_≤0.02 cm$^{-1}$/nm) than that found in highly disordered carbons (0.1 cm$^{-1}$/nm) [Ferrari and Robertson (2001)]. Such correlations are compatible with the so-called "stage 1" of the amorphisation trajectory [Ferrari and Robertson (2000)]. In this early stage of amorphisation, corresponding to the transition between ordered graphite and nanocrystalline graphite, the G peak is not dispersive yet [Ferrari and Robertson (2001)], and the onset of the D peak is accompanied by a broadening of the G peak due to presence of disorder.

Figures 7E, 7F:
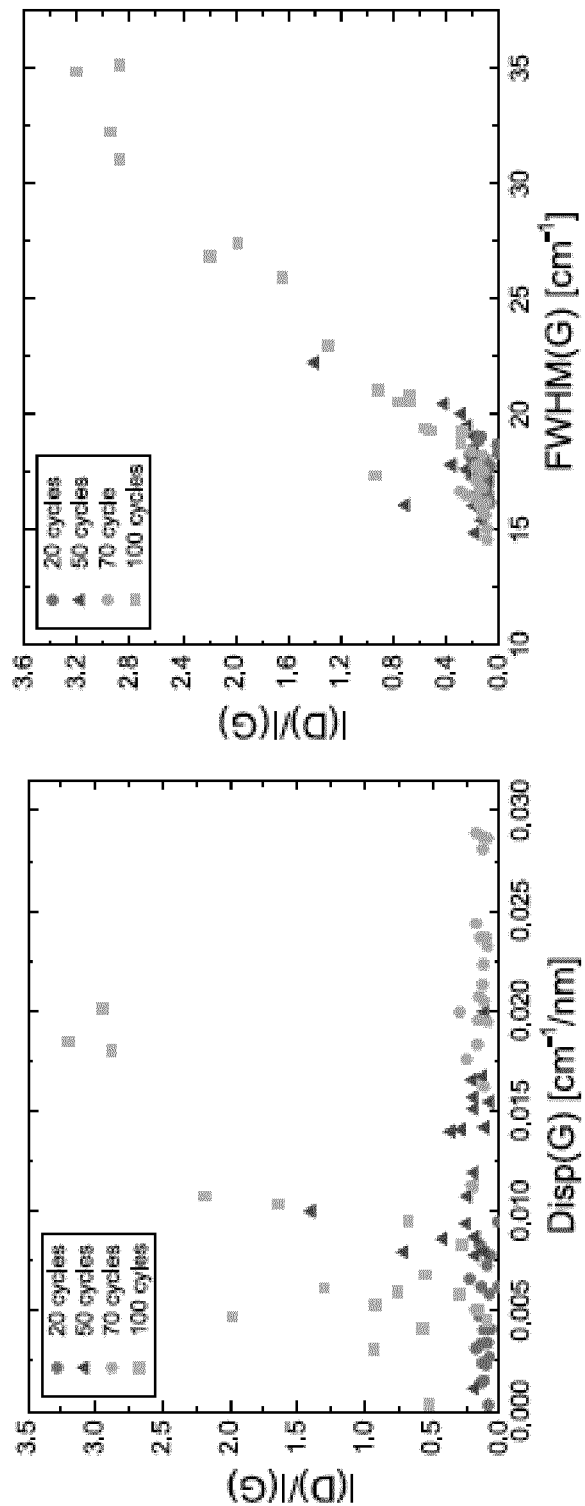

For the samples processed 20, 50 and 70 times there is no correlation between the I(D)/I(G), the Disp(G) and the FWHM(G) (FIGS. 7(e) and 7(f)). This indicates that the D peak comes from the edges of the flakes. In the case of the flakes processed 100 cycles the Disp(G) is 0.009 cm$^{-1}$/nm, still lower than 0.1 cm$^{-1}$/nm, but there is a clear correlation between I(D)/I(G) and Disp(G) and a trend is also present for the I(D)/I(G) as a function of FWHM(G). The highest value of I(D)/I(G) corresponds to the highest in FWHM(G), this indicates that the exfoliation by microfluidic process at 100 cycles is starting to over process the material, introducing plane defects in the flakes.

Mild microfluidization can produce defect free graphene flakes. Raman spectra were acquired at 457, 514, and 633 nm on flakes produced after processing for 30 cycles at 20 kpsi and centrifuged at 10 krpm for 1 h. FIG. 26 shows a typical Raman spectra of the resulting flakes. Besides the G and 2D peaks, significant D and D' peaks are also present, assigned to the sub-micrometer edges of the flakes, rather than to a large amount of disorder within the flakes. This is supported by the G peak dispersion Disp(G) <0.02 cm$^{-1}$ nm$^{-1}$, much lower than in disordered carbons. The 2D peak is single Lorentzian, but larger than that of the individual flakes. Thus, even if the flakes are multi-layers, they are electronically decoupled and, to a first approximation, behave as a collection of single layers.

B. Conductive Ink Formulation and Printing

Figure 9A:
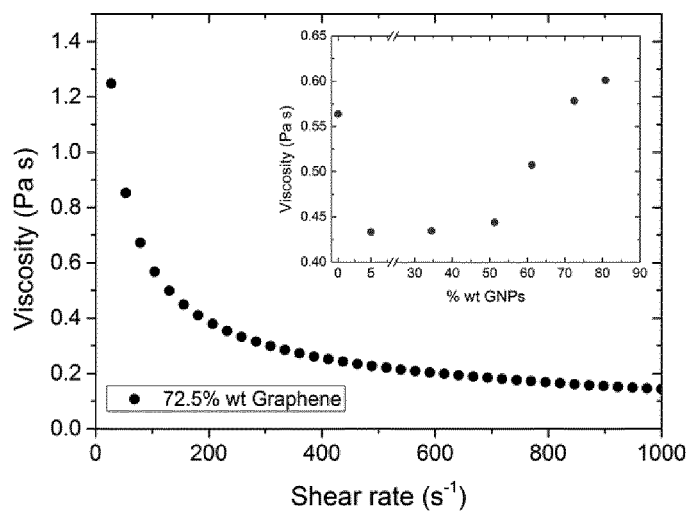
FIG. 9(a) shows the steady state viscosity of an ink according to a preferred embodiment of the invention as a function of shear rate, at a loading of 72.5 wt % GNPs. The inset shows the change in viscosity with wt % GNP concentration.
Figure 9B:
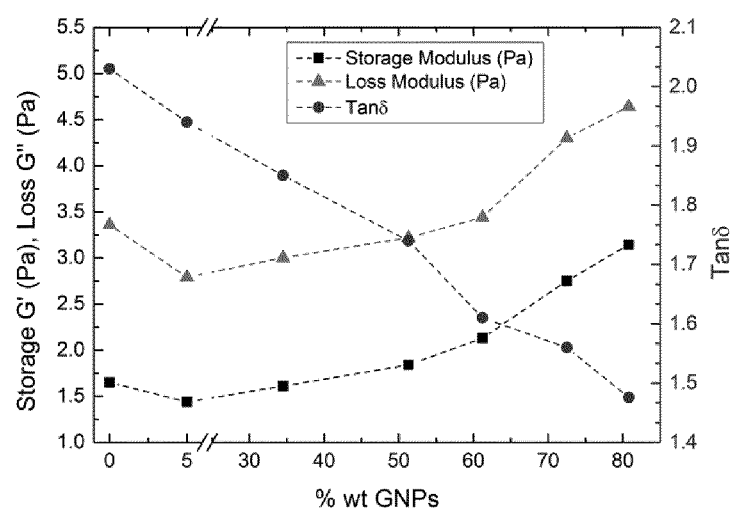
FIG. 9(b) shows G',G" and tan δ parameters for different numbers of processing cycles for inks according to preferred embodiments of the invention.
Figure 9C:
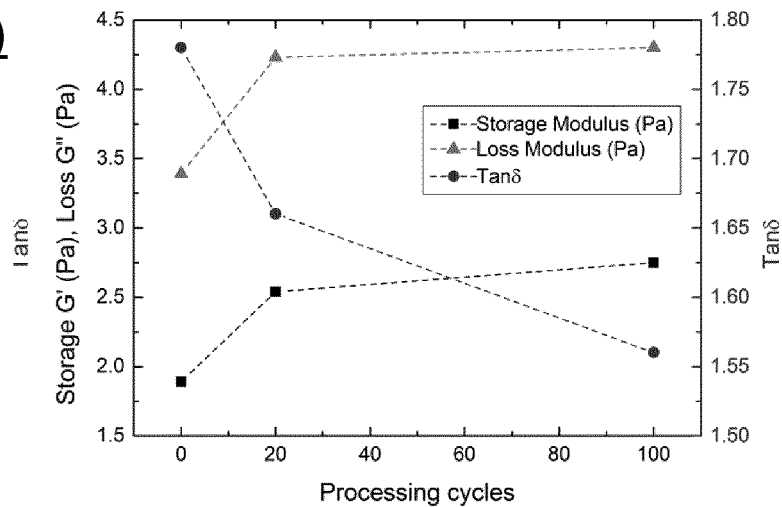
FIG. 9(c) shows G',G" and tan δ parameters for different wt % of GNPs for inks according to preferred embodiments of the invention.

Following the microfluidic exfoliation process, the rheology of the GNP-surfactant dispersions requires optimization for specific printing techniques. Here, the ink viscosity is tuned for screen printing by using carboxymethylcellulose sodium salt (CMC) (Weight Average Molecular Weight, Mw=700.000, Adrich No. 419338) which is a common biopolymer [Ummartyotin and Manuspiya (2015)] and an efficient rheology modifier [Di Risio et al (2007), Pavinatto et al (2015)]. CMC stabilizes the flakes against sedimentation. CMC is a water soluble cellulose derivative capable of tuning solution viscosity over a wide range (from a few mPa to tens of Pa). CMC is added at a concentration of 10 g/L over a period of 3 h at room temperature. This procedure is necessary because if all CMC is added at once, a "clump" of solid is produced that is very difficult to dissolve. Different ink formulations were prepared keeping the SDC (9 mg/mL) and CMC (10 mg/mL) constant and increasing the GNP content (1, 10, 20, 30, 50, 80, 100 mg/mL). Once printed, these GNP loadings correspond to 5, 34.5, 51.3, 61.2, 72.5, 80.8 and 84 wt % of the total solids content, respectively. Flow curves are measured by increasing the shear rate from 1 to 1000s$^{-1}$ at a gap of 0.5 mm, because these shear rates are those applied during screen printing. FIG. 9($a$) shows the steady state viscosity of an ink containing 72.5% wt of GNPs as a function of shear rate. CMC imparts a thixotropic behaviour to the ink [Benchabane and Bekkour (2008)]; viscosity drops when shear is applied from 570 mPa·s at 100 s$^{-1}$ shear rate to 140 mPa·s at 1000 s$^{-1}$. This non-Newtonian shear-thinning behaviour is caused by the disentanglement of the polymer coils in solution or increased orientation of the polymer coils in the direction of the flow [Benchabane and Bekkour (2008)]. As the applied shear stress is increased, the resistance to flow (viscosity) is decreased. Such a behaviour improves the shelf life stability of the ink as the viscosity is very high at storage conditions (shear rate <10$^{-3}$s$^{-1}$). During printing, shear is applied and the viscosity drops; after printing this viscosity recovers. This behaviour facilitates the use of the ink in techniques such as screen printing in which a maximum shear of 1000 s$^{-1}$ is reached when the ink is penetrating the screen mesh [Lin et al (2008)]. The inset in FIG. 9($a$) shows viscosity at 100s$^{-1}$ plotted as a function of the GNP loading (100 process cycles). It was observed that the viscosity of the polymer solution drops significantly from 0.56 to 0.43 Pa·s with the addition of 5 wt % GNPs and starts recovering above 50 wt % of GNPs, discussed below, and reaches 0.6 Pa s at 80.8 wt %. More information on the ink rheological behaviour, microstructure and stability, can be obtained by oscillatory rheology measurements [Clasen and Kulicke (2001)]. CMC provides a viscoelastic character to the ink described by the elastic or storage modulus (G') which is a measure of the energy that is stored in the material, and the viscous or loss modulus (G") which is used to describe the energy required for flow. The viscoelastic behaviour is evaluated in terms of the loss factor tan δ=G"/G', representing the ratio of viscous to elastic behaviour. The lower the value of this factor, the more solid-like (i.e., elastic) the material at a given strain or frequency. The linear viscoelastic region was defined in a strain sweep which was performed at a frequency of 1 rad/s (see FIG. 27). In FIG. 9($b$) the G', G" and tan δ obtained at 1% strain and 1 rad/s frequency are plotted against GNP loading. Addition of only 5 wt % GNPs decreased both the G' and G" due to the disruption of the hydrogen bonds of the cellulose structure. The moduli recovered above the values of the neat polymer for loadings above 30 wt % which can be related to increased particle network strength within the inks [Somalu et al (2013)]. The loss modulus G" was higher than G' which is required for flow after application allowing good levelling. Similarly, in screen printing the ink is able to pass through the mesh before G' starts to dominate during drying. Overall, the tan δ decreases with exfoliation leading to a more solid-like behaviour. The G', G" and tan δ values were also estimated for inks containing flakes that were processed at different cycles while keeping the loading of GNPs constant at 72.5% (FIG. 9($c$)). Both storage and loss modulus found to increase with further microfluidic processing cycles. Smaller particle size and higher degree of exfoliation benefit the formation of stronger interfacial bonding (more stiffened interface area) between the polymer and the GNP's as well as effective GNP networks, and correspondingly higher modulus [Li and Zhong (2011)].

Screen printing was performed using a commercial semi-automatic flatbed screen printer (Kippax kpx 2012) equipped with screens with 120 mesh count per inch. Striped patterns were printed onto rigid (glass microscope slides), flexible (PET, 125 μm thickness, PMX729 HiFi Industrial Film Ltd) substrates by pushing the ink through the opening in the screen using a polyurethane squeegee at a typical speed of about 0.1 m/s. The films were dried at 100° C. for 10 min to remove water. A Nikon optical microscope (Eclipse LV100) was used to check the printed patterns.

To assess the electrical performance of the formulated GNP inks, films were first developed by blade coating onto glass substrates (25×75 mm) using a spacer to define the film thickness. The dry film thickness depends on the wet film thickness and the total wt % solids content of the ink. We thus investigated the effects of processing cycles, flake content and post-deposition annealing on $R_S$. This was measured in 4 different locations per sample using a four point probe. A profilometer (DektakXT, Bruker) was used to determine h for each point. In order to test the effect of the processing cycles, films were prepared from inks containing 72.5 wt % GNPs processed for 0, 5, 10, 30, 50 and 100 cycles. The inks were blade coated using a spacer which defined a constant wet film thickness of 1 mm. FIG. 10($a$) shows the effect of processing cycles on the sheet resistance and the dried film thickness of the films. Without any processing, the graphite films exhibited a sheet resistance of 77 Ω/sq and a film thickness of 35.8 μm corresponding to a conductivity of 3.6×10$^2$ S/m. Processing of the material caused a quick drop in the sheet resistance and the thickness of the films; 10 processing cycles were sufficient to reach about 10 Ohm/sq and a thickness of 25.6 μm corresponding to a conductivity of 3.9×10$^3$ S/m. The sheet resistance did not exhibit any substantial change between 10-100 cycles although the film thickness decreased further from 25.6 μm to 22.3 μm. We get σ of about 4.5×10$^2$S/m above 30 cycles. The reduction of the film thickness indicates improved packing density, supported by FIG. 11 which shows SEM images obtained from the coatings for different processing cycles. GNP size reduction and platelet-like morphology is observed after microfluidic processing. The processed samples showed less voids providing higher interparticle contact area which is responsible for the conductivity improvement. Whilst the densification of the coatings results in more pathways for conduction, the smaller GNP size increases the number of inter-particle contacts. Subsequently, the sheet resistance remains relatively constant due to these two competing factors. The improved particle connectivity in the films can be related to the improved particle network strength and elastic properties in the inks at higher solids content and GNP loadings as revealed by the dynamic measurements [Somalu et al (2013)].

Figure 10A:
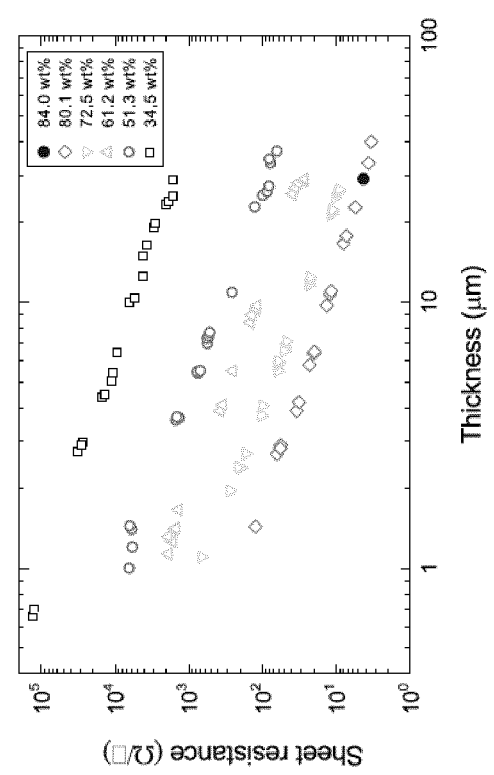
FIG. 10(a) shows sheet resistance and film thickness as a function of processing cycles for a formulation with 72.5% wt GNPs.
Figure 10C:
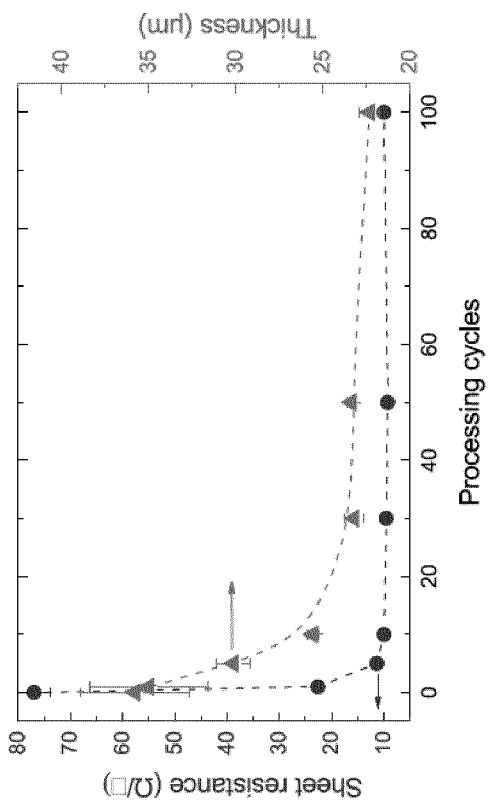
FIG. 10(c) shows conductivity as a function of thickness for different GNPs loadings.
Figure 10B:
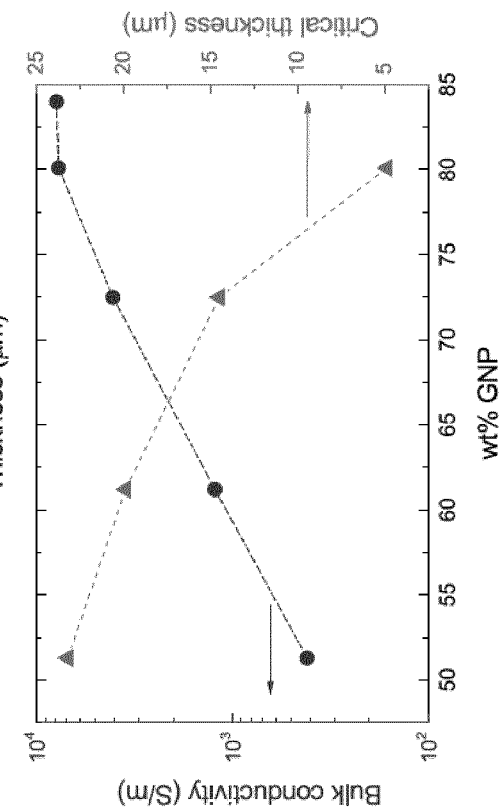
FIG. 10(b) shows sheet resistance as a function of thickness for different GNPs loadings.

The effect of the GNP loading at fixed processing cycles was investigated as follows. Dispersions with different GNPs content were prepared by increasing the GNP mass whilst keeping the SDC surfactant (9 mg/mL) and CMC polymer (10 mg/mL) mass constant. Films of different thickness were prepared by changing the spacer height during blade coating leading to different wet ink thickness and consequently dry film thickness. The sheet resistance and the conductivity of the films as a function of film thickness are shown in FIGS. 10(b) and 10(c) respectively. At a loading of 34.5 wt % the GNPs began to form a percolative network within the CMC polymer matrix (the conductivity of cellulose derivative films is $<10^{-8}$ S/m [Roff and Scott (1971)]), although the conductivity was rather low (about 15-20 S/m). For such composite systems the conductive filler needs to be sufficiently high to achieve high conductivity while at the same time, sufficient binder (in this case, CMC) is necessary to provide good film forming properties as well as enough adhesion with the substrate. Typically a metal loading in the range of 20-80 wt % is used [Kamyshny and Magdassi (2014)]. As shown in FIG. 10(c), for a given composition, there is a critical thickness below which conductivity is thickness dependent; above this thickness, the bulk conductivity value is reached (thickness independent conductivity). As shown in FIG. 10(c), for a loading of 80.1 wt % in GNPs we get a conductivity of $7.7 \times 10^3$ S/m for film thicknesses above 4.5 μm. Higher loadings (84% wt) do not increase the conductivity further.

FIG. 10(c) shows that the conductivity is thickness dependant up to a critical thickness. We model the flakes as ellipses of axes a and b and total thickness $h_f$. The total area covered by non-overlapping flakes is A=mπab, where m is the number of flakes. The fractional area covered by the flakes (overlapping), with respect to the total area S, can be evaluated as f=1−p with p=$e^{-A/S}$ (p is the fractional area not covered by the flakes and f coincides with A/S only when the flakes do not overlap). A formulation containing 72.5 wt % flakes corresponds to 61 vol % flakes. If h is the thickness of a film then $$Ah_f=0.61hS=-h_f\ln p \quad (1)$$

σ follows a power law behavior of the form of [Hu et al (2004)]:

$$\sigma \propto (p-p_c)^n \quad (2)$$

for p is close to $p_c$, where $p_c$ is the percolation threshold and n is the percolation exponent. The exponent n varies with particular composite system and can be estimated by a linear fit of the $\log_{10}$ plot of σ vs h in the percolation region [Torrisi et al (2012)]. Equations (1) and (2) give the following:

$$\sigma = \sigma_\infty \left[1 - e^{\frac{(h_c-h)0.61}{h_f}}\right]^n \quad (3)$$

σ as a function of h, is fitted with (3) in FIG. 12 for a formulation containing 72.5 wt % flakes. From the fit we get a maximum conductivity of about $4.3 \times 10^3$ S/m, a conductivity percolation threshold at a film thickness $h_c$=0.39 μm, $h_f$ of about $7.58 \times 10^{-6}$ μm and a conductivity critical exponent n=0.39.

Figure 10D:
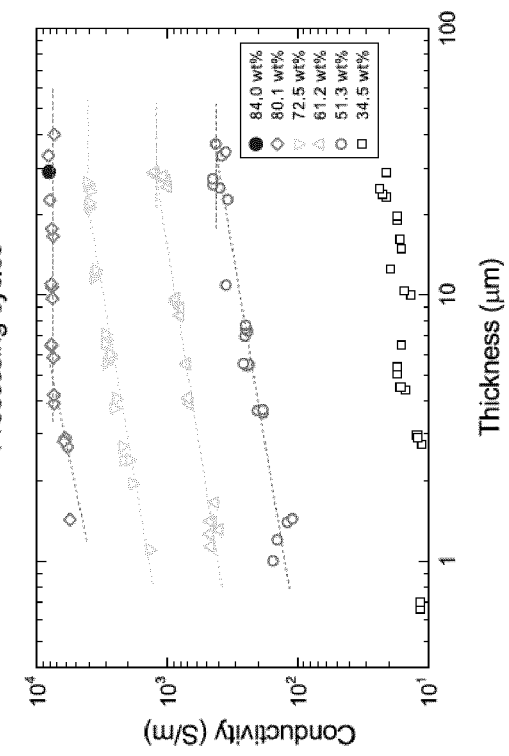
FIG. 10(d) shows bulk conductivity and critical thickness as a function of GNPs loading.

As shown in FIG. 10(d) the critical thickness drops from 20 μm for 51.3% of GNPs to 4.5 μm for the 80% GNPs formulation. A low critical thickness is crucial in high throughput printing techniques where bulk conductivity must be achieved with the minimum number of printing passes, ideally one.

The effect of the post deposition thermal annealing step was studied using blade coated films prepared using a formulation containing 80.8 wt % GNPs. After drying, films were subsequently annealed for 10 min at different temperatures (60-290° C.). FIG. 12(a) shows the conductivity as a function of annealing temperature from 100° C. up to 285° C. A three step regime can be observed. In the first regime (100-180° C.) the conductivity remained constant ($7.7 \times 10^3$ S/m), while above 180° C., the conductivity gradually increased, reaching $9 \times 10^3$ S/m at 260° C. A significant increase in conductivity was obtained at 285° C. ($1.5 \times 10^4$ S/m). FIG. 13(b) shows the conductivity enhancement with increased annealing time at 260° C., 285° C. or 300° C. It can be observed that either higher temperature annealing or longer annealing times are required to increase conductivity. TGA was utilized to elucidate the thermal stability of the films (FIG. 13(c)). The thermogram of bare CMC film reveals a 10% weight loss up to 200° C. which is due to water loss. FIG. 13 also reveals that 50% of the polymer binder is decomposed at 285° C. while the surfactant remains intact at this temperature. Annealing at 300° C. and 285° C. for 40 min leads to films with sheet resistance $R_S$ of about 2 Ω/sq and about 2.2 Ω/sq respectively corresponding to a conductivity of about $2 \times 10^4$ S/m and $1.8 \times 10^4$ respectively. The thickness of the coatings is 25 μm. This performance is remarkable given the absence of centrifugation or washing steps to remove the non-conductive polymer and surfactant materials.

The printability of the ink was tested using a commercial flatbed screen printer (Kippax kpx 2012) and a Natgraph screen printer, printing using a screen mesh of 55 and 120 lines. Printing line patterns of high uniformity were successfully printed onto rigid (glass), flexible PET substrates and paper substrates. Interdigitated electrodes with a line width of 200 μm were successfully printed onto PET substrate (FIG. 14). Repeatable, high quality features were also printed onto porous substrates such as paper or nitrocellulose membranes.

A passive UHF (865-868 MHz) RFID tag antenna was fabricated by screen printing and tested. The design chosen here was a meandered dipole antenna (FIG. 15(a)), which allowed the tag to be compact in size as well as providing an omnidirectional pattern in the plane perpendicular to the axis of the meander. The antenna was screen printed onto a 125 μm thick flexible PET substrate (HiFi PMX 729). The electrical permittivity of the substrate was measured with a Keysight 85072A split cylinder 10 GHz resonator and found to be around 2.8. Assuming that dispersion of PET in this low-GHz regime is minimal, the same value of permittivity was used in the simulation of the RFID antenna. The effective area of the tag was 85 mm×45 mm. A passive RFID tag system is comprised by the chip and the antenna (FIG. 15(a)). As it has no battery to power itself, typically, the reader emits electromagnetic waves that induce current in the tag's antenna, allowing the operation of the chip. The efficiency and read range of the tag strongly depends on the power delivered to the chip, including path loss and impedance mismatch between the chip and the antenna [Nikitin et al (2005)]. These are maximized when the complex input impedance of the antenna is matched with the complex conjugate impedance of the chip [Nikitin et al (2005)]. RFID antennas are highly inductive, therefore the chips are fabricated having a negative reactance. In this design, the Impinj EPC Gen2 Monza4 IC is being used with nominal impedance of $Z_{IC}=13-j151$ at 866 MHz and sensitivity of around −14 dBm. This is far from the characteristic impedance of the ports of the PNA-X which is fixed to 50, reducing the possibility of direct $S_{11}$ measurements. What can be observed instead, is the input impedance of the tag antenna over the desired frequency, before the attachment of the chip. FIG. 15(b) shows the measured impedance of the graphene printed tag antenna as a function of frequency, using the Keysight PNA-X N5245, exhibiting good matching with the impedance of the chip, ZIC, across the UHF band (865-868 MHz). Moreover, in FIG. 15(c), the simulated (CST Microwave Studio) reflection coefficient of the tag is plotted, assuming that ZIC is the input impedance of the tag. In order to estimate the maximum range of the device, a horn antenna was connected to a spectrum analyser (Keysight N9030A) and placed 1 m away from the RFID tag. The power received from the spectrum analyser is also plotted in FIG. 15(c), when the tag is fed with a continuous wave at 866 MHz. Considering that the maximum allowed transmission power in the EU is 2 W ERP88, the read range is about 145 cm.

FIG. 15(d) shows a 29 cm×29 cm print on paper with a line resolution of 100 μm (FIGS. 15(e) and 15(f). The printed pattern (FIG. 15(a)) can be used as a capacitive touch pad in a sound platform that translates touch into audio.

In summary, the preferred embodiments of the present invention provide a simple and scalable route to exfoliate graphite to form graphene and graphite nanoplates. The resulting flakes can be used without any centrifugation steps to formulate of highly conductive water-based inks with adjustable viscosity for high throughput printing techniques. Conductivity as high as $1.8 \times 10^4$ S/m and $2 \times 10^4$ S/m has been demonstrated. The approach enables the mass production of pristine graphene that can be used in inks, coatings and composites realizing a huge range of applications.

FIG. 16 illustrates that with increasing number of process cycles, the graphene concentration increases. For FIG. 16, the samples used a carrier liquid of water with 9 mg/mL SDC surfactant. The microfluidic processing was carried out as explained above, here at a pressure of 27 kpsi for different numbers of process cycles. Following this, the samples were centrifuged at 10 krpm for 1 hour, to isolate the contribution to light absorption by graphene. The concentration of graphite in the starting sample was about 0.25 g/L and identical for each sample. The graphite was natural graphite, from Technografit GmbH, Germany, with a D90 of less than 25 μm.

Figure 17A:
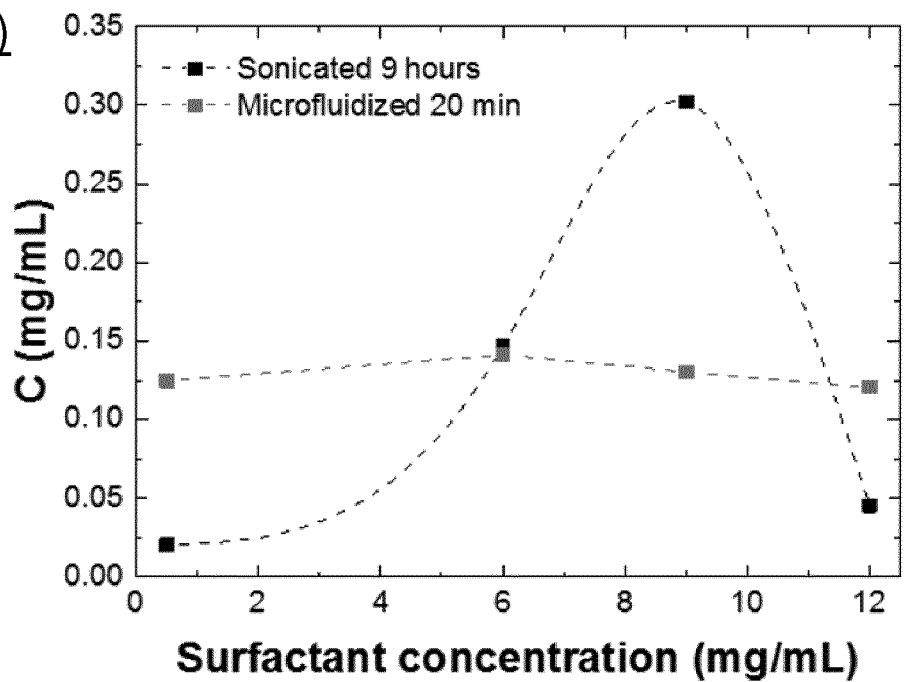
Figure 17B:
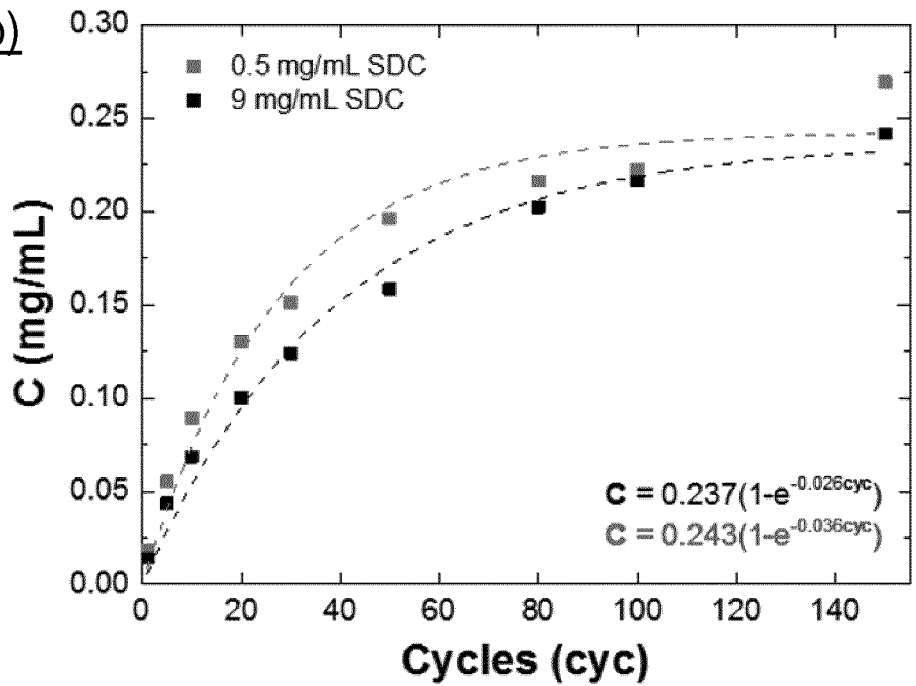
Figure 17C:
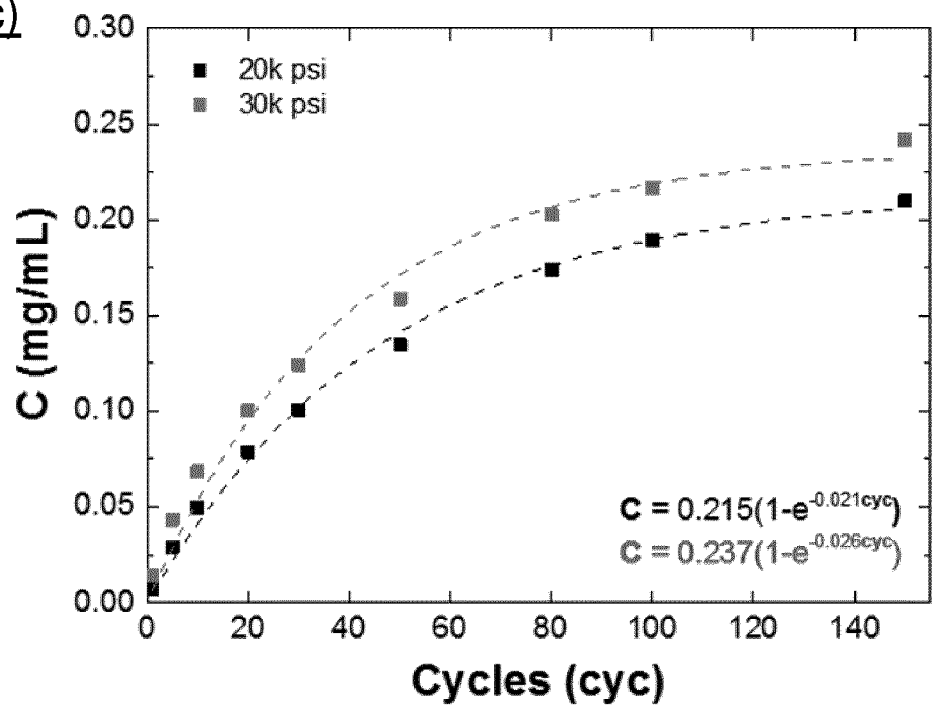
Figure 17D:
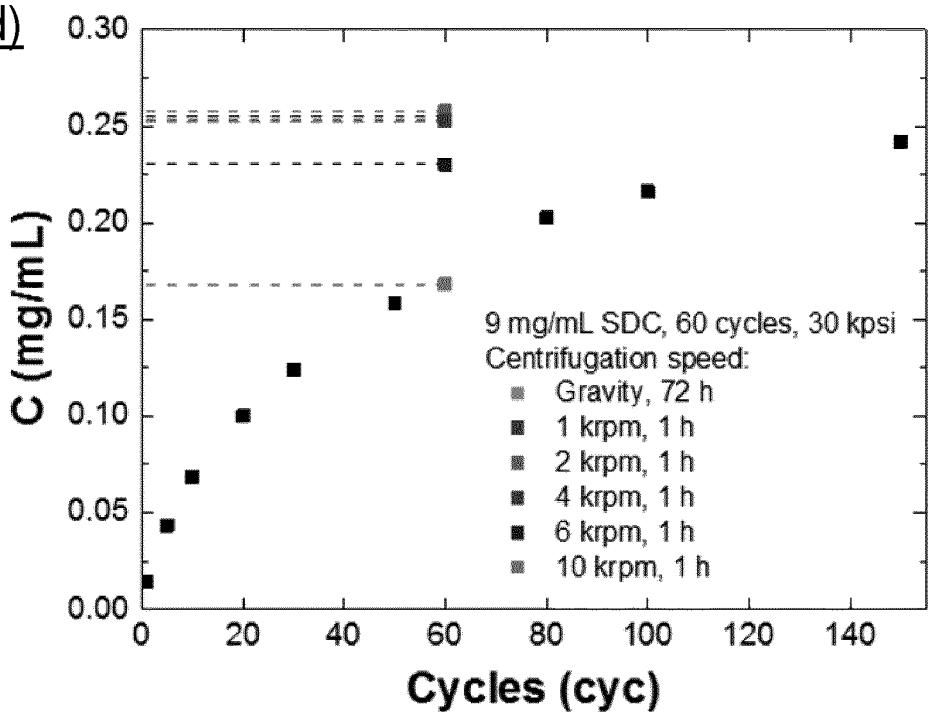
Figure 17E:
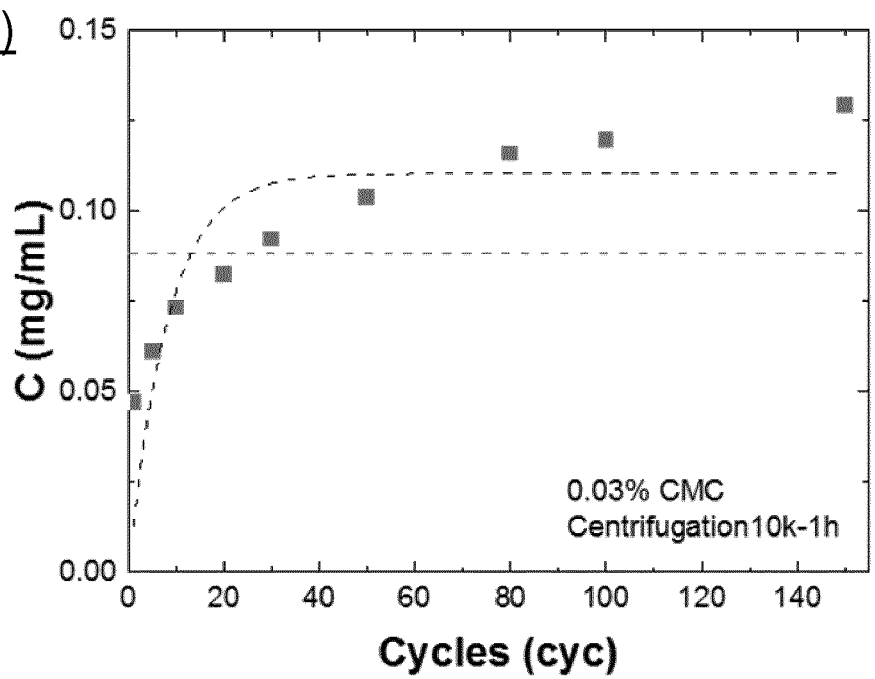
Figure 17F:
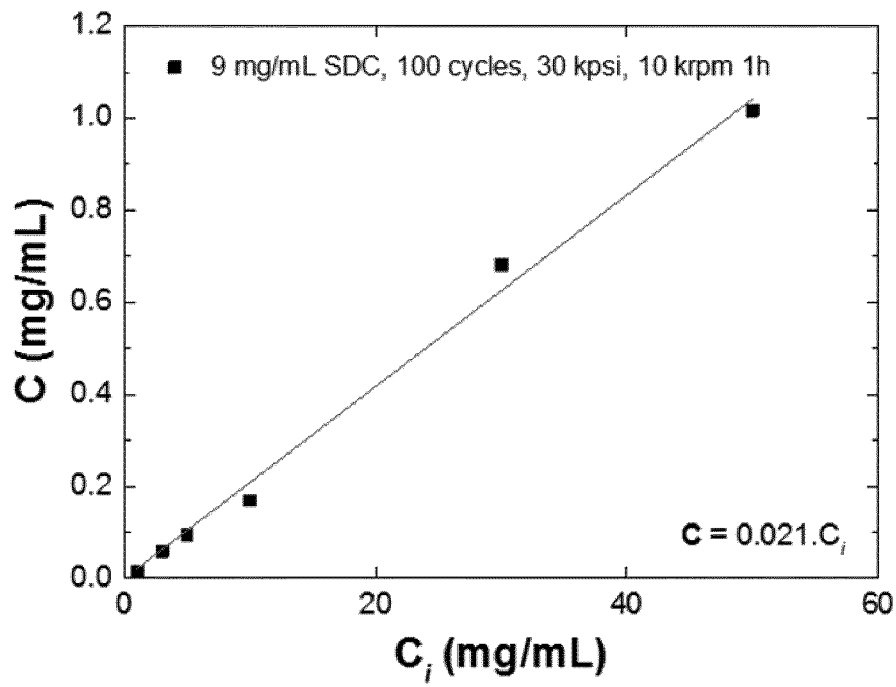

FIGS. 17(a)-(f) show the effect of process variables on graphene concentration. FIG. 17(a) shows the effect of SDC surfactant concentration at fixed processing cycles (about 60 cycles) compared to the complementary sonication processing (9 hours sonication, substantially as described in WO 2014/064432). FIG. 17(b) shows the effect of surfactant concentration and the number of process cycles. FIG. 17(c) shows the effect of process pressure and the number of process cycles. FIG. 17(d) shows the effect of centrifugation parameters and the number of process cycles. FIG. 17(e) shows the effect of using CMC as a stabiliser. The dashed red line in FIG. 17(e) represents the complementary sonication processing using the same CMC loading. FIG. 17(f) shows the effect of increased graphite loading $C_i$ on the graphene concentration based on microfluidic shear processing of a graphite dispersion in water with 9 mg/mL SDC, 100 cycles at 30 kpsi and a subsequent centrifugation at 10 krpm for 1 hour.

FIG. 18 shows an AFM image of flakes after microfluidic shear processing and centrifugation. The samples used 0.5 mg/mL SDC with 60 process cycles at 30 kpsi, followed by centrifugation at 10 krpm for 1 hour. Three groups of particles are indicated, having thickness 1-1.5 nm, 2-3 nm and 4-9 nm respectively, all with lengths up to about 500 nm.

FIG. 19 shows the results of particle size analysis of a graphene dispersion produced according to an embodiment of the invention (60 process cycles, at a pressure of 30 kpsi) and according to a sonication procedure substantially as described in WO 2014/064432 (9 h sonication). As can be seen, the microfluidization process results in a graphene size distribution which is more uniform, although the dimensions of the graphene particles are relatively small (about 100-200 nm).

Figure 20A:
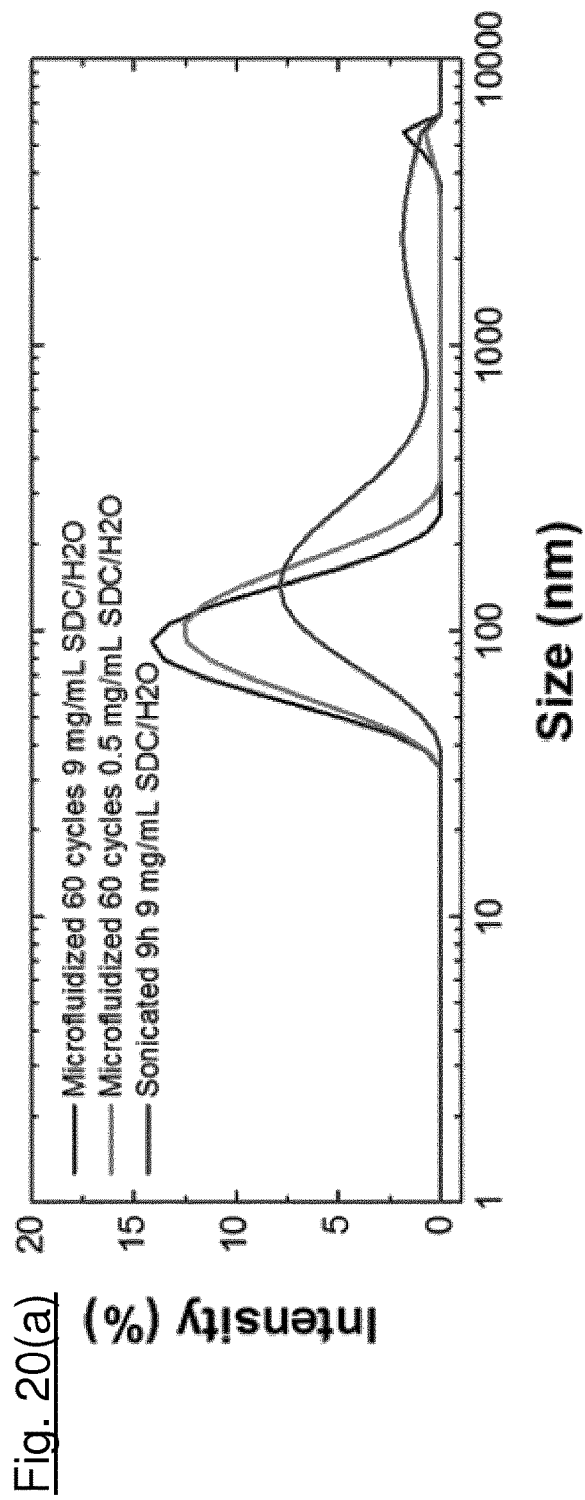
Figure 20B:
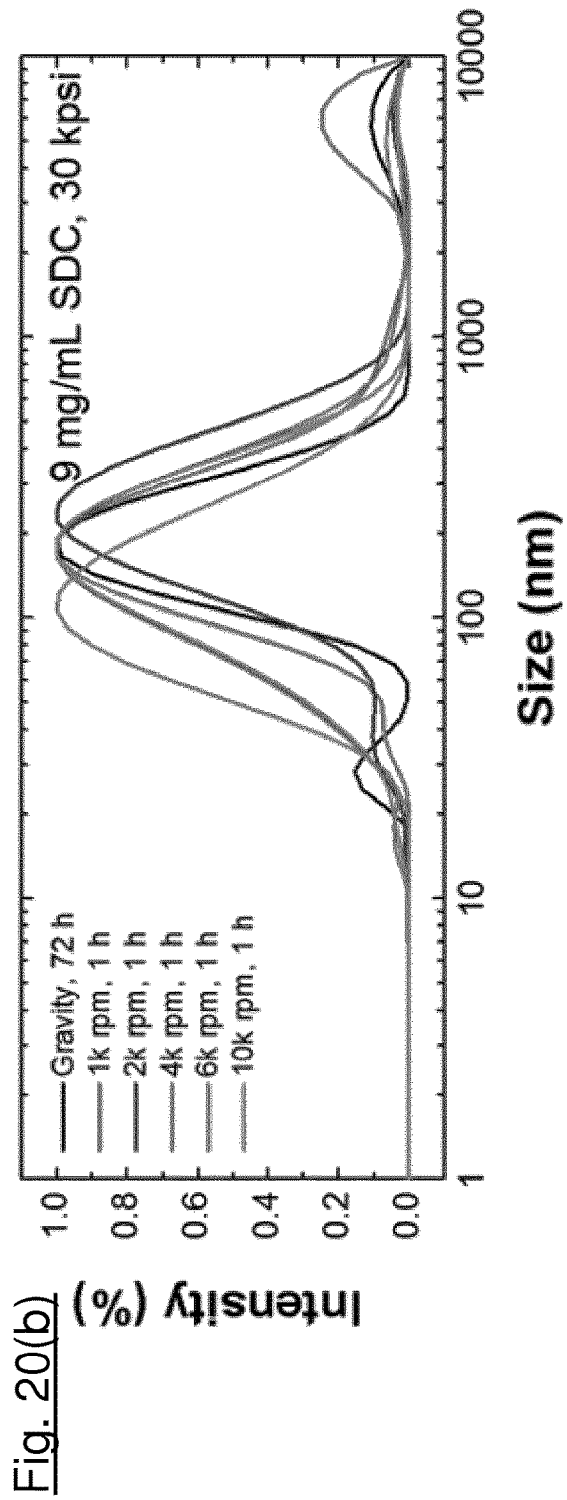
Figure 20C:
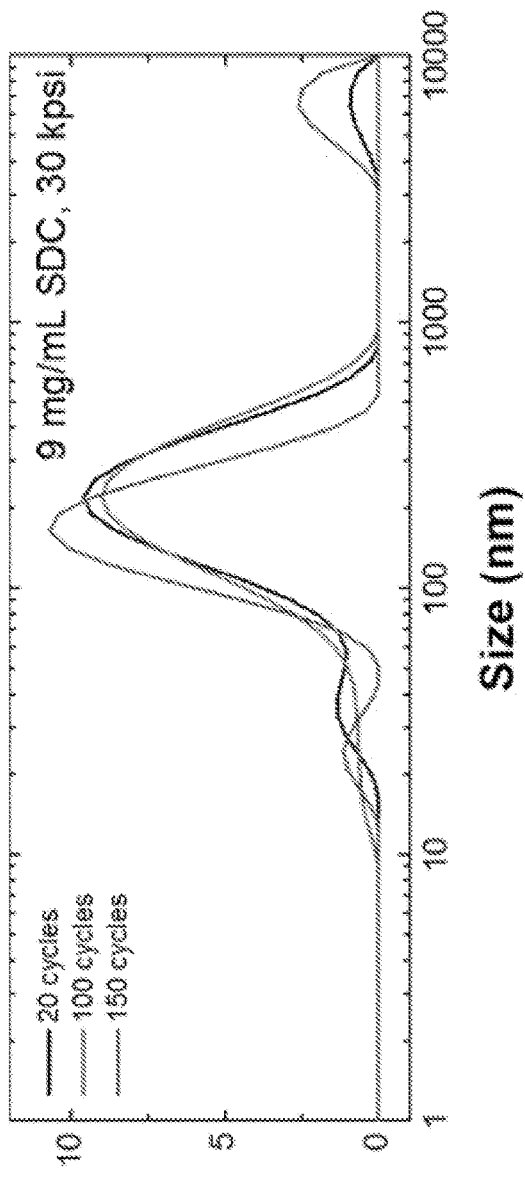
Figure 20D:
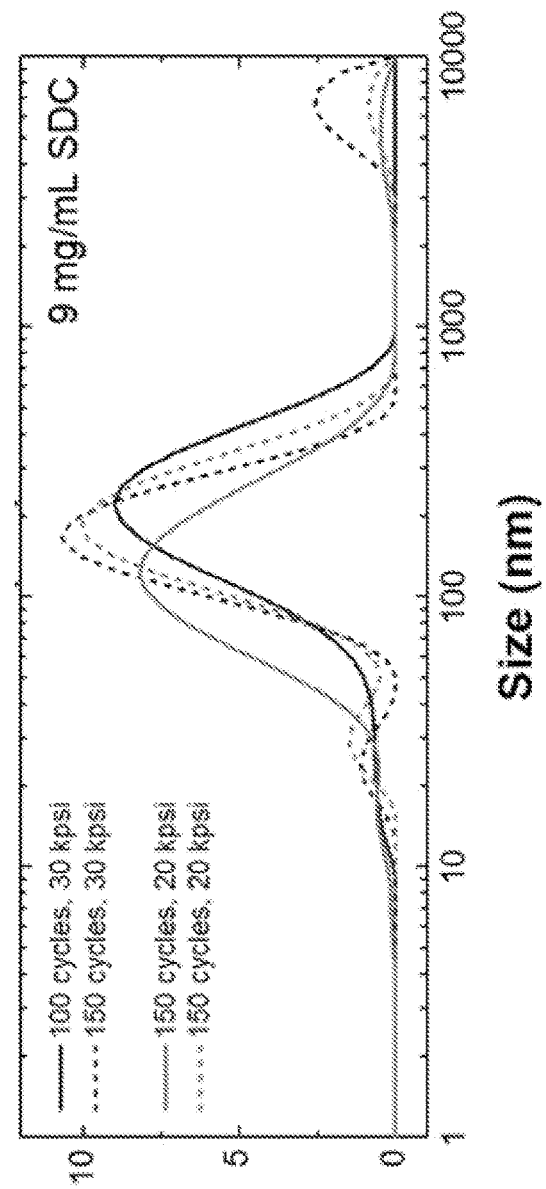

FIGS. 20(a)-(d) show particle size analysis in more detail. Specifically, these graphs show the effect of process variables on graphene lateral size determined by dynamic light scattering (DLS). FIG. 20(a) shows the effect of SDC surfactant concentration at fixed processing cycles (about 60 cycles) compared to a complementary sonication processing substantially as described in WO 2014/064432 (9 h sonication). FIG. 20(b) shows the effect of centrifugation parameters following the microfluidization processing. FIG. 20(c) shows the effect of the number of process cycles at 30 kpsi pressure. FIG. 20(d) shows the effect of the number of process cycles at different process pressures (30 and 20 kpsi).

The effect of the microfluidization processing compared with sonication processing is illustrated in FIG. 21, in which transparent conductive films (TCFs), formed via vacuum filtration, have a lower sheet resistance Rs per unit thickness than TCFs formed from sonicated inks. This appears to be due to the microfluidization processing being possible at lower surfactant content and providing a smoother surface due to uniform particle size.

The detailed discussion so far relates to the treatment of graphite and the production of graphene nanoplates and graphene. However, the present invention has wider applicability than this, and is considered to apply to other two dimensional materials. To illustrate this, additional experiments were performed on hexagonal boron nitride (h-BN). h-BN was treated by microfluidic processing as described above, in a carrier liquid formed from water with 0.4% CMC. FIG. 22 illustrates the lateral size of the resultant h-BN flakes, as determined by DLS. FIGS. 23 and 24 show scanning transmission electron microscopy (STEM) images of h-BN flakes formed according to an embodiment of the invention. An average lateral size of up to about 2 μm is achievable.

Absorbance of h-BN (carrier liquid water—CMC 0.4%) formed in a similar manner to the embodiment described above was determined based on a sample which was centrifuged at 10 krpm for 20 min. The result is shown in FIG. 25, for different numbers of microfluidization process cycles.

C. Functionalization of Layered Materials

It is desirable for the layered material to have a certain end-application e.g. solubility, structural matrix compatibility, fluorescence, catalytic activity etc. It is often desirable to introduce higher molecular weight or branched species that maximise the required property with minimal modification of the nanomaterial structure.

Graphene or other nanomaterials can be produced with specific chemical functional groups that offer a large toolkit for adapting nanomaterials to a desired function, for example the advantages listed above. The chemical modification process benefits greatly from the confinement and uniform mixing of nanomaterial and chemical functionalization reagent within the microfluidic processor interaction chamber. Also, the heat generated in the interaction chamber can be used to initiate reactions. Depending on the reaction of choice, the heat generated by such high energy processing can be used to perform harsh reactions that typically require boiling mixtures for several days. Alternatively, cooling to the interaction chamber can be provided if required for a particular reaction.

Among others, the benefits of chemical modification are the improved solubility of nanomaterials and compatibility with composite matrices, allowing the improvement of mechanical, thermal and electrical properties.

The desired nanoplate functionalization reagent is added to the dispersion, either before exfoliation is started, or after exfoliation is started but before a further cycle of steps (b) and (c).

For the production of some solvent based electrically conductive inks (based on isopropanol, ethylene glycol or glycol ethers such as cellosolve etc.), it is desirable to add a dispersing agent to the dispersion. For example, if a solvent such as isopropanol is used, a dispersing agent such as ethyl cellulose can be used.

Suitable covalent modifications may include, but are not limited to, diazonium salt additions, 1,3-dipolar cycloadditions, silylations, oxidations, radical based reactions, reductions, polymer grafting reactions, thiol/sulphur functionalizations, etc.

The microfluidizer apparatus can be adapted suitably as necessary in order to avoid unwanted corrosive interaction between the nanoplate functionalization reagent and the materials of the microfluidizer apparatus.

At the time of writing, to the best of the inventors' knowledge, there has been no disclosure in the art on the combined exfoliation and chemical functionalization of nanomaterials using a microfluidic processor.

D. Microfluidization Process

In order to compare the microfluidization process with sonication or high shear mixing, the fluid dynamics in the microfluidizer can be considered. This is beyond the scope of this disclosure but is set out in detail in:

"*Micro fluidization of graphite and formulation of graphene-based conductive inks*" P. G. Karagiannidis, S. A. Hodge, L. Lombardi, F. Tomarchio, N. Decorde, S. Milana, K. Nakanishi, I. Goykhman, Y. Su, S. V. Mesite, R. K. Leary, D. N. Johnstone, P. A. Midgley, N. M. Pugno, F. Torrisi and A. C. Ferrari—in press (2016) the contents of which, in particular the section entitled "Microfluidization process", are hereby incorporated by reference in their entirety.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above and listed below are hereby incorporated by reference.

NON-PATENT REFERENCES

Benchabane, K. Bekkour, Rheological properties of carboxymethyl cellulose (CMC) solutions, Colloid Polym Sci, 286 (2008) 1173-1180.

Benson, Q. Xu, P. Wang, Y. Shen, L. Sun, T. Wang, M. Li and Berger, C., et al., J. Phys. Chem. B (2004) 108, 19912.

Bianco, et al, All in the graphene family A recommended nomenclature for two-dimensional carbon materials, Carbon 65 (2013) 1-6.

Bonaccorso et al—Graphene Photonics and Optoelectronics. Nat. Photonics 2010, 4, 611-622.

Bracamonte et al, On the Nature of Defects in Liquid-Phase Exfoliated Graphene, J. Phys. Chem. C 118 (2014) 15455-15459.

Cancado, A. Jorio, E. H. M. Ferreira, F. Stavale, C. A. Achete, R. B. Capaz, M. V. O.

Moutinho, A. Lombardo, T. S. Kulmala and A. C. Ferrari. Quantifying Defects in Graphene via Raman Spectroscopy at Different Excitation Energies, Nano Letters, 11, 3190-3196, (2011).

Casiraghi, A. Hartschuh, H. Qian, S. Piscanec, C. Georgi, A. Fasoli, K. S. Novoselov, D. M. Basko and A. C. Ferrari, Nano Letters, 9, (2009), 1433-1441.

Chakraborty "Physics and modeling of turbulent transport", Chapter 18, pages 749-833, in MICROFLUIDICS AND NANOFLUIDICS HANDBOOK—CHEMISTRY, PHYSICS AND LIFE SCIENCE PRINCIPLES, edited by S. K. Mitra and S. Chakraborty, CRC Press, Taylor & Francis Group, (2012)

Chen, T.-Y. Dong, T.-C. Chang, M.-C. Chen, H.-L. Tsai and W.-S. Hwang, Solution-based-diketonate silver ink for direct printing of highly conductive features on a flexible substrate J. Mater. Chem. C, 1 (2013) 5161-5168.

Choi, T. Zhou, M. Singh, G. E. Jabbour, Recent developments and directions in printed nanomaterials, Nanoscale, 7 (2015) 3338.

Chung. Electromagnetic interference shielding effectiveness of carbon materials, Carbon, 39 (2001) 279-285.

Chung. Electromagnetic interference shielding effectiveness of carbon materials, Carbon, 39 (2001) 279-285.

Clasen, W.-M. Kulicke, Determination of viscoelastic and rheo-optical material functions of water-soluble cellulose derivatives, Progress in Polymer Science, 26 (2001) 1839-1919.

Coleman, Liquid-Phase Exfoliation of Nanotubes and Graphene, Adv. Funct. Mater., 19 (2009) 3680-3695.

De, P. J. King, P. E. Lyons, U. Khan and J. N. Coleman, Size Effects and the Problem with Percolation in Nanostructured Transparent Conductors, ACS Nano, 4 (2010) 7064-7072.

Dearden, P. J. Smith, D.-Y. Shin, N. Reis, B. Derby and P. O'Brien, A Low Curing Temperature Silver Ink for Use in Ink-Jet Printing and Subsequent Production of Conductive Tracks, Macromol. Rapid Commun., 26 (2005) 315-318.

Di Risio, N. Yan, Piezoelectric Ink-Jet Printing of Horseradish Peroxidase: Effect of Ink Viscosity Modifiers on Activity, Macromol. Rapid Commun., 28 (2007) 1934-1940.

dos Reis Benatto, B. Roth, M. V. Madsen, M. Hösel, R. R. Søndergaard, M. Jørgensen, F. C. Krebs, Carbon: The Ultimate Electrode Choice for Widely Distributed Polymer Solar Cells, Adv. Energy Mater. 4 (2014) 1400732.

Dreyer, S. Park, C. W. Bielawski, R. S. Ruo_, The chemistry of graphene oxide, Chem. Soc. Rev. 39 (2010) 228-240.

Dua, V.; Surwade, S.; Ammu, S.; Agnihotra, S.; Jain, S.; Roberts, K.; Park, S.; Ruoff, R.; Manohar, S. All-Organic Vapor Sensor Using Inkjet-Printed Reduced Graphene Oxide. Angew. Chem., Int. Ed. 2010, 49, 2154-2157.

Englert, C. Dotzer, G. Yang, M. Schmid, C. Papp, J. M. Gottfried, H.-P. Steinrück, E. Spiecker, F. Hauke and A. Hirsch, Nature Chemistry 3 (2011) 279-286.

Ferrari and D. M. Basko. Raman spectroscopy as a versatile tool for studying the properties of graphene, Nat Nano, 8, 235-246, (2013).

Ferrari and J. Robertson, Phys. Rev. B, 61, 14095-14107, (2000).

Ferrari and J. Robertson. Resonant Raman spectroscopy of disordered, amorphous, and diamondlike carbon, Phys. Rev. B, 64, 13 (2001) 075414.

Ferrari et al. Science and technology roadmap for graphene, related two dimensional crystals, and hybrid systems, Nanoscale, 7 (2015) 4598-4810.

Ferrari, J. C. Meyer, V. Scardaci, C. Casiraghi, M. Lazzeri, F. Mauri, S. Piscanec, D. Jiang, K. S. Novoselov, S. Roth and A. K. Geim, Phys. Rev. Lett., 97, (2006), 187401.

Ferrari, S. E. Rodil and J. Robertson. Interpretation of infrared and Raman spectra of amorphous carbon nitrides, Physical Review B, 67, 155306 (2003).

Finn, M. Lotya, G. Cunningham, R. J. Smith, D. McCloskey, J. F. Donegan and J. N.

Coleman, Inkjet deposition of liquid-exfoliated graphene and $MoS_2$ nanosheets for printed device applications, J. Mater. Chem. C, 2 (2014) 925.

Georgakilas et al. Chem. Rev., 2012, 112 (11), pp 6156-6214;

Gorton, Carbon paste electrodes modified with enzymes, tissues, and cells, Electroanalysis, 7 (1995) 23-45.

Green, A. A.; Hersam, M. C. Solution Phase Production of Graphene with Controlled Thickness via Density Differentiation. Nano Lett. 2009, 9, 4031-4036.

Grouchko, A. Kamyshny, C. F. Mihailescu, D. F. Anghel and S. Magdassi, Conductive Inks with a "Built-In" Mechanism That Enables Sintering at Room Temperature, ACS Nano, 5 (2011) 3354-3359.

Hasan, T.; Torrisi, F.; Nicolosi, V.; Privitera, G.; Bonaccorso, F.; Ferrari, A. C. Solution-Phase Exfoliation of Graphite for Ultrafast Photonics. Phys. Status Solidi B 2010, 247, 2953.

Hernandez, V. Nicolosi, M. Lotya, F. M. Blighe, Z. Sun, S. De, I. T. McGovern, B. Holland, M. Byrne, Y. K. Gun'Ko, J. J. Boland, P. Niraj, G. Duesberg, S. Krishnamurthy, R. Goodhue, Hutchison, V. Scardaci, A. C. Ferrari and J. N. Coleman, Nature Nanotechnology 3 (2008) 563-568.

Hernandez, Y.; Nicolosi, V.; Lotya, M.; Blighe, F. M.; Sun, Z.; De, S.; McGovern, I. T.; Holland, B.; Byrne, M.; Gun'Ko, Y. K.; et al. High-Yield Production of Graphene by Liquid-Phase Exfoliation of Graphite. Nat. Nanotechnol. 2008, 3, 563-568.

Hodge et al. Chem Soc Rev. 2012 Jun. 21; 41(12):4409-29 http://www.gwent.org/

Hu, D. S. Hecht, and G. Grüner, Percolation in Transparent and Conducting Carbon Nanotube Networks, Nano Lett., 4 (2004) 2513-2517.

Hummers, W. S.; Offeman, R. E. Preparation of Graphitic Oxide. J. Am. Chem. Soc. 1958, 80, 1339-1339.

Hyun, E. B. Secor, M. C. Hersam, C. D. Frisbie, and L. F. Francis, Adv. Mater. 27 (2015) 109-115.

Jafari, et al., Production of sub-micron emulsions by ultrasound and microuidization techniques, Journal of Food Engineering 82 (2007) 478-488.

Jeon, Y.-R. Shin, G.-J. Sohn, H.-J. Choi, S.-Y. Bae, J. Mahmood, S.-M. Jung, J.-M. Seo, M.-J. Kim, D. W. Chang, L. Dai, J.-B. Baeka, Edge-carboxylated graphene nanosheets via ball milling, Proc Natl Acad Sci USA. 109(15) (2012) 5588-5593.

Kamyshny, S. Magdassi, Conductive Nanomaterials for Printed Electronics, small 10 (2014) 3515-3535.

Kamyshny, S. Magdassi, Conductive Nanomaterials for Printed Electronics, small 10 (2014) 3515-3535.

Khan, L. Lorenzelli, R. S. Dahiya, Technologies for Printing Sensors and Electronics Over Large Flexible Substrates: A Review, 15 (2015) 3164-3185.

Knirsch et al. ACS Nano, 2015, 9 (6), pp 6018-6030).

Launder and Spalding, The numerical computation of turbulent flows, COMPUTER METHODS IN APPLIED MECHANICS ANR ENGINEERING 3 (1974) 269-289.

Li, W.-H. Zhong, Review on polymer/graphite nanoplatelet nanocomposites, J Mater Sci 46 (2011) 5595-5614.

Li, X., et al., Science (2009) 324, 1312.

Lin, C.-P. Chang, W.-H. Hwu, M.-D. Ger, The rheological behaviors of screen-printing pastes, Journal of Materials Processing Technology, 197 (2008) 284-291.

Lotya, M.; Hernandez, Y.; King, P. J.; Smith, R. J.; Nicolosi, V.; Karlsson, L. S.; Blighe, F. M.; De, S.; Wang, Z.; McGovern, I. T.; et al. Liquid Phase Production of Graphene by Exfoliation of Graphite in Surfactant/Water Solutions. J. Am. Chem. Soc. 2009, 131, 3611-3620.

Luechinger et al Graphene-Stabilized Copper Nanoparticles as an Air-Stable Substitute for Silver and Gold in Low-Cost Ink-Jet Prinatble Electronics. Nanotechnology 2008, 19, 445201.

Marago, O. M.; Bonaccorso, F.; Saija, R.; Privitera, G.; Gucciardi, P. G.; Lati, M. A.; Calogero, G.; Jones, P. H.; Borghese, F.; Denti, P.; et al. Brownian Motion of Graphene. ACS Nano 2010, 4, 7515-7523.

Nikitin, K. V. S. Rao, S. F. Lam, V. Pillai, R. Martinez, Harley Heinrich, IEEE Transactions on Microwave Theory and Techniques, 53 (2005) 2721-2725.

Nitta, F. Wu, J. T. Lee, G. Yushin, Li-ion battery materials: present and future, Materials Today, 18 (2015) 252-264.

Novoselov, K. S.; Jiang, D.; Schedin, F.; Booth, T. J.; Khotkevich, V. V.; Morozov, S. V.; Geim, A. K. Two-Dimensional Atomic Crystals. Proc. Natl. Acad. Sci. U.S.A 2005, 102, 10451-10453.

Papakonstantinou, ACS Appl. Mater. Interfaces, 6 (2014) 19726-19736.

Panagiotou, J. M. Bernard, S. V. Mesite, Deagglomeration and Dispersion of Carbon Nanotubes Using Microfluidizer™ High Shear Fluid Processors, ISBN:978-1-4200-8503-7 http://www.researchgate.net/publication/228907-753_Deagglomeration_and_Dispersion_of_Carbon_Nanotubes_Using_Microfluidizer_High_Shear_Fluid_Processors Paton, E. Varrla, C. Backes, R. J. Smith, U. Khan, A. O'Neill, C. Boland, M. Lotya, O. M. Istrate, P. King, T. Higgins, S. Barwich, P. May, P. Puczkarski, I. Ahmed, M. Moebius, H. Pettersson, E. Long, J. Coelho, S. E. O'Brien, E. K. McGuire, B. M. Sanchez, G. S. Duesberg, N. McEvoy, T. J. Pennycook, C. Downing, A. Crossley, V. Nicolosi & J. N. Coleman, Scalable production of large quantities of defect-free few-layer graphene by shear exfoliation in liquids, Nature Materials 13 (2014) 624-630.

Pavinatto et al, Printed and flexible biosensor for antioxidants using interdigitated ink-jetted electrodes and gravure-deposited active layer, Biosens Bioelectron. 2015 May 15; 67:553-9.

Polyakova (Stolyarova), et al., Scanning Tunneling Microscopy and X-ray Photoelectron Spectroscopy Studies of Graphene Films Prepared by Sonication-Assisted Dispersion, ACS Nano, 5 (2011) 6102-6108.

Presolski and Pumera Covalent functionalization of MoS2, Materials Today Volume 19, Issue 3, Page 140-145 (2016).

Randviir, D. A. C. Brownson, J. P. Metters, R. O. Kadara and C. E. Banks, Phys. Chem. Chem. Phys., 16 (2014) 4598-4611.

Roff, J. R. Scott, Fibres, Films, Plastics and Rubbers: A Handbook of Common Polymers, Butterworths, 1971

Secor, P. L. Prabhumirashi, K. Puntambekar, M. I L. Geier, and M. C. Hersam, Inkjet Printing of High Conductivity, Flexible Graphene Patterns, J. Phys. Chem. Lett. 4 (2013) 1347-1351.

Secor, S. L., H. Zhang, C. D. Frisbie, L. F. Francis and M. C. Hersam, Gravure Printing of Graphene for Large-Area Flexible Electronics, Adv. Mater. 26 (2014) 4533-4538.

Singh et al, Inkjet Printing—Process and its Applications, Adv. Mater. 2010, 22, 673-685.

Somalu, A. Muchtar, M. G. Baboli, V. Yufit, I. P. Shapiro, P. Xiao and N. P. Brandon, Understanding the Relationship between Ink Rheology and Film Properties for Screen-Printed Nickel/Scandia-Stabilized-Zirconia Anodes, ECS Transactions, 57 (2013) 1321-1330.

Somalu, A. Muchtar, M. G. Baboli, V. Yufit, I. P. Shapiro, P. Xiao and N. P. Brandon, Understanding the Relationship between Ink Rheology and Film Properties for Screen-Printed Nickel/Scandia-Stabilized-Zirconia Anodes, ECS Transactions, 57 (2013) 1321-1330.

Søndergaard, N. Espinosa, M. Jørgensen, F. C. Krebs, Efficient decommissioning and recycling of polymer solar cells: justification for use of silver, Energy Environ. Sci., 7 (2014) 1006-1012.

Tobjork and R. Osterbacka, Paper Electronics, Adv. Mater., 23 (2011) 1935-1961.

Torrisi, T. Hasan, W. Wu, Z. i Sun, A. Lombardo, T. S. Kulmala, G.-W. Hsieh, S. Jung, F. Bonaccorso, P. J. Paul, D. Chu, and A. C. Ferrari, ACS Nano, 6 (4), (2012) 2992-3006.

Tuinstra and J. L. Koenig, J. Chem. Phys., 53, (1970), 1126-1130.

Uher, R. L. Hockey, and E. Ben-Jacob, Pressure dependence of the c-axis resistivity of graphite, Phys. Rev. B, 35 (1987) 4483-4488.

Uher, R. L. Hockey, and E. Ben-Jacob, Pressure dependence of the c-axis resistivity of graphite, Phys. Rev. B, 35 (1987) 4483-4488.

Ummartyotin and H. Manuspiya. A critical review on cellulose: From fundamental to an approach on sensor technology. Renewable and Sustainable Energy Reviews 41 (2015), 402-412

Valles, C.; Drummond, C.; Saadaoui, H.; Furtado, C. A.; He, M.; Roubeau, O.; Ortolani, L.; Monthioux, M.; Penicaud, A. Solutions of Negatively Charged Graphene Sheets and Ribbons. J. Am. Chem. Soc. 2008, 130, 15802-15804.

Varrla et al, Turbulence-assisted shear exfoliation of graphene using household detergent and a kitchen blender, Nanoscale, 6 (2014) 11810-11819.

Wang, B. Tian, V. B. Nascimento and L. Angnes, Performance of screen-printed carbon electrodes fabricated from different carbon inks, Electrochimica Acta, 43 (1998) 3459-3465.

Wang, B. Tian, V. B. Nascimento and L. Angnes, Performance of screen-printed carbon electrodes fabricated from different carbon inks, Electrochimica Acta, 43 (1998) 3459-3465.

Welham, J. S. Williams, Extended milling of graphite and activated carbon, Carbon 36 (1998) 1309-1315.

Williams, Infrared absorption spectroscopy (Nakanishi, Koji), J. Chem. Educ., 40 (1963) 616.

Woo et al, Relationship between printability and rheological behavior of ink-jet conductive inks, Ceramics International, 39 (2013) 7015-7021.

Wu, D. D. L. Chung, Pastes for electromagnetic interference shielding, Journal of Electronic Materials, 34 (2005) 1255-1258.

Y. Gao, W. Shi, W. Wang, Y. Leng and Y. Zhao, Ind. Eng. Chem. Res. 53 (2014) 16777-16784.

Yanga, A. Velamakannia, G. Bozoklu, S. Park, M. Stoller, R. D. Piner, S. Stankovich, I. Jung, D. A. Field, C. A. Ventrice Jr., Rodney S. Ruoff, Carbon 47 (2009) 145-152.

Yi et al., Water can stably disperse liquid-exfoliated graphene, Chem. Commun., 49 (2013) 11059.

The invention claimed is:

1. A method for producing nanoplates derived from a layered material, comprising:
   (a) mixing particles of said layered material with a carrier liquid to form a dispersion of said particles in said carrier liquid;
   (b) pressurizing the dispersion to a pressure of at least 10 kpsi; and
   (c) forcing the dispersion along a microfluidic channel under said pressure, to apply a shear rate of at least $10^6$ $s^{-1}$ to said particles in the dispersion, thereby causing exfoliation of nanoplates from said particles; wherein the microfluidic channel comprises a tortuous flow path.

2. The method according to claim 1 wherein the dispersion is pressurised to a pressure of at least 20 kpsi.

3. The method according to claim 1 wherein the nanoplates are selected from one or more of elemental materials such as graphene (typically derived from pristine graphite), metals (e.g., $NiTe_2$, $VSe_2$), semi-metals (e.g., $WTe_2$, $TcS_2$), semiconductors (e.g., $WS_2$, $WSe_2$, $MoS_2$, $MoTe_2$, $TaS_2$, $RhTe_2$, $PdTe_2$), insulators (e.g., h-BN, $HfS_2$), superconductors (e.g., $NbS_2$, $NbSe_2$, $NbTe_2$, $TaSe_2$) and topological insulators and thermo-electrics (e.g., $Bi_2Se_3$, $Bi_2Te_3$).

4. The method according claim1 wherein the layered material is graphite and the nanoplates are graphite nanoplates.

5. The method according to claim 1 wherein the layered material is pristine graphite and the nanoplates are graphite nanoplates.

6. The method according to claim 1 wherein the layered material is present in the carrier liquid in an amount of at least 50 mg per ml of dispersion.

7. The method according to claim 1 wherein the method produces a concentration of single/few layer nanoplates in the dispersion of at least 0.1 mg per ml of dispersion.

8. The method according to claim 1 wherein the dispersion subjected to step (c) is subjected to steps (b) and (c) repeatedly, either via the same or different microfluidic channels, according to a number of cycles, wherein the number of cycles is at least 5.

9. The method according to claim 1 wherein the dispersion is subjected to step (c) for a time of up to 1 second, per cycle.

10. The method according to claim 1 wherein the microfluidic channel has a transverse dimension of at most 300 µm.

11. The method according to claim 1 wherein the microfluidic channel has a transverse dimension of at least 50 µm.

12. The method according to claim 1 wherein the shear rate applied to the particles in the dispersion is at least $10^7$ $s^{-1}$.

13. The method according to claim 1 wherein the microfluidic channel does not have flow splitting paths or flow recombination paths.

14. The method according to claim 1 wherein the carrier liquid is selected from one or more of: water, alcohol, N-methylpyrrolidone, chloroform, benzene, toluene, di-chlorobenzene, dimethyl formamide, iso-propyl alcohol, ethanol, ethylene glycol (or other glycols) or a glycol ether and/or other organic solvents, and wherein the carrier liquid optionally further includes polymer matrix such as epoxy or silicone oil.

15. The method according to claim 1 further including the step of adding a dispersing agent to the dispersion.

16. The method according to claim 1 including the step of adding a nanoplate functionalization reagent to the dispersion, the nanoplates being functionalized by reaction with the nanoplate functionalization reagent during step (c).

17. A method for producing nanoplates derived from a layered material, comprising:
   (a) mixing particles of said layered material with a carrier liquid to form a dispersion of said particles in said carrier liquid;
   (b) pressurizing the dispersion to a pressure of at least 8 kpsi; and
   (c) forcing the dispersion along a microfluidic channel under said pressure, to apply a shear rate of at least $10^5$ $s^{-1}$ to said particles in the dispersion, thereby causing exfoliation of nanoplates from said particles; wherein the microfluidic channel comprises a tortuous flow path;
wherein the dispersion subjected to step (c) is subjected to steps (b) and (c) repeatedly, either via the same or different microfluidic channels, according to a number of cycles, wherein the number of cycles is at least 10.

18. The method according to claim 17 wherein the dispersion is subjected to step (c) for a cumulative time of up to 200 seconds.

19. The method according to claim 17 including the step of adding a nanoplate functionalization reagent to the dispersion, the nanoplates being functionalized by reaction with the nanoplate functionalization reagent during step (c).

* * * * *